United States Patent
Kodama et al.

(10) Patent No.: US 11,332,671 B2
(45) Date of Patent: May 17, 2022

(54) LIQUID CRYSTAL COMPOSITION, METHOD FOR PRODUCING REFLECTIVE LAYER, REFLECTIVE LAYER, CURED PRODUCT, AND OPTICALLY ANISOTROPIC BODY

(71) Applicant: FUJIFILM Corporation, Tokyo (JP)

(72) Inventors: Keisuke Kodama, Kanagawa (JP); Shunya Katoh, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 107 days.

(21) Appl. No.: 16/701,107

(22) Filed: Dec. 2, 2019

(65) Prior Publication Data
US 2020/0102500 A1   Apr. 2, 2020

Related U.S. Application Data

(63) Continuation of application No. PCT/JP2018/026337, filed on Jul. 12, 2018.

(30) Foreign Application Priority Data

Jul. 12, 2017  (JP) .............................. JP2017-136144

(51) Int. Cl.
C09K 19/58   (2006.01)
C09K 19/38   (2006.01)
G03B 21/604  (2014.01)

(52) U.S. Cl.
CPC ........ C09K 19/3852 (2013.01); C09K 19/588 (2013.01); G03B 21/604 (2013.01)

(58) Field of Classification Search
CPC .. C09K 19/3852; C09K 19/588; C09K 19/56; C09K 19/586; C09K 19/58; C09K 2019/0448; G03B 21/604; G03B 21/60; G02B 5/26; G02B 5/30
See application file for complete search history.

(56) References Cited

U.S. PATENT DOCUMENTS

| | | | |
|---|---|---|---|
| 5,780,629 A | 7/1998 | Etzbach et al. | |
| 5,886,242 A | 3/1999 | Etzbach et al. | |
| 6,537,624 B1 | 3/2003 | Suzuki et al. | |
| 6,876,427 B2 | 4/2005 | Bowley et al. | |
| 6,953,611 B2 * | 10/2005 | Hammond-Smith | B42D 25/364 428/1.3 |
| 7,142,360 B2 | 11/2006 | Umeya | |
| 7,158,297 B2 | 1/2007 | Umeya | |
| 7,190,427 B2 | 3/2007 | Maeda et al. | |
| 7,298,442 B2 | 11/2007 | Bowley et al. | |
| 7,365,906 B2 | 4/2008 | Umeya | |
| 7,583,341 B2 | 9/2009 | Umeya | |
| 7,589,809 B2 | 9/2009 | Maeda et al. | |
| 7,746,430 B2 | 6/2010 | Kurosaki et al. | |
| 8,330,931 B2 | 12/2012 | Coles et al. | |
| 8,867,005 B2 | 10/2014 | Inoue et al. | |
| 10,139,533 B2 | 11/2018 | Ichihashi et al. | |
| 2003/0122105 A1 | 7/2003 | Ichihashi | |
| 2005/0030617 A1 | 2/2005 | Umeya | |
| 2005/0127326 A1 | 6/2005 | Ichihashi | |
| 2007/0109471 A1 | 5/2007 | Ting et al. | |
| 2008/0266500 A1 | 10/2008 | Nimura | |
| 2012/0088037 A1 | 4/2012 | Oki et al. | |
| 2015/0369983 A1 | 12/2015 | Oki et al. | |
| 2016/0170109 A1 | 6/2016 | Hsu et al. | |
| 2017/0010398 A1 | 1/2017 | Ishikawa et al. | |

FOREIGN PATENT DOCUMENTS

| | | |
|---|---|---|
| CN | 1283276 | 2/2001 |
| CN | 1435717 | 8/2003 |
| CN | 1573526 | 2/2005 |
| CN | 1578928 | 2/2005 |
| CN | 1862321 | 11/2006 |
| CN | 101023391 | 8/2007 |
| CN | 101140387 | 3/2008 |
| CN | 101223474 | 7/2008 |
| CN | 101382717 | 3/2009 |
| CN | 102220138 | 10/2011 |

(Continued)

OTHER PUBLICATIONS

Machine Translation of WO 2014097895 A1 (Year: 2014).*
"Office Action of Japan Counterpart Application", dated May 12, 2020, with English translation thereof, p. 1-p. 10.
"International Search Report (Form PCT/ISA/210) of PCT/JP2018/026337", dated Oct. 16, 2018, with English translation thereof, pp. 1-5.
"Written Opinion of the International Searching Authority (Form PCT/ISA/237) of PCT/JP2018/026337", dated Oct. 16, 2018, with English translation thereof, pp. 1-13.
"Office Action of Japan Counterpart Application", dated Dec. 8, 2020, with English translation thereof, p. 1-p. 8.
Office Action of China Counterpart Application, with English translation thereof, dated Aug. 31, 2021, pp. 1-15.

(Continued)

*Primary Examiner* — Geraldina Visconti
(74) *Attorney, Agent, or Firm* — JCIPRNET

(57) ABSTRACT

A first object of the present invention is to provide a liquid crystal composition capable of forming a reflective layer having excellent diffuse reflectivity. A second object of the present invention is to provide a method for producing a reflective layer having excellent diffuse reflectivity and a reflective layer having excellent diffuse reflectivity. A third object of the present invention is to provide a cured product and an optically anisotropic body, each of which is formed of the liquid crystal composition.
The present invention relates to a liquid crystal composition including a liquid crystal compound; a chiral agent A whose helical twisting power is reduced upon light irradiation; and a chiral agent B which induces a helix in a direction opposite to that of the chiral agent A, in which the liquid crystal compound is cholesterically aligned in the direction of the helix induced by the chiral agent B in a case where the liquid crystal compound is aligned into a cholesteric liquid crystalline phase state.

15 Claims, 3 Drawing Sheets

(56) References Cited

FOREIGN PATENT DOCUMENTS

| | | |
|---|---|---|
| CN | 102336115 | 2/2012 |
| CN | 102460241 | 5/2012 |
| CN | 104871046 | 8/2015 |
| CN | 105452915 | 3/2016 |
| CN | 105700218 | 6/2016 |
| EP | 1286188 | 2/2003 |
| EP | 1295929 | 3/2003 |
| EP | 1301823 | 4/2003 |
| GB | 2076554 | 6/1984 |
| JP | 2002080478 | 3/2002 |
| JP | 2002267830 | 9/2002 |
| JP | 2002338575 | 11/2002 |
| JP | 2003082352 | 3/2003 |
| JP | 2003313189 | 11/2003 |
| JP | 2004163523 | 6/2004 |
| JP | 2005049866 | 2/2005 |
| JP | 2007504484 | 3/2007 |
| JP | 2008250187 | 10/2008 |
| WO | 9516007 | 6/1995 |
| WO | 2005019379 | 3/2005 |
| WO | 2006132361 | 12/2006 |
| WO | 2010145211 | 12/2010 |
| WO | WO 2014097895 A1 * 6/2014 ........... G02B 5/3016 |
| WO | 2015141818 | 9/2015 |

OTHER PUBLICATIONS

Zou Peng-Fei et al., "Some progresses of photoalignment technique applied in liquid crystal nondisplay field", Chinese Journal of Liquid Crystals and Displays, vol. 32, Issue 6, Jun. 2017, with English abstract, pp. 411-423.

Xu Chao et al., "Influence of helical twisting power on electro-optical properties of normal-mode polymer-stabilized cholesteric texture", Chinese Journal of Liquid Crystals and Displays, vol. 31, Issue 4, Apr. 2016, with English abstract, pp. 358-362.

C.-R. Lee et al., "Spatially band-tunable color-cone lasing emission in a dye-doped cholesteric liquid crystal with a photoisomerizable chiral dopant", Optics Letters, vol. 35, Issue 9, May 2010, pp. 1398-1400.

"Office Action of Japan Counterpart Application" with English translation thereof, dated Aug. 17, 2021, p. 1-p. 10.

Office Action of China Counterpart Application, with English translation thereof, dated Mar. 30, 2021, pp. 1-17.

* cited by examiner

LIQUID CRYSTAL COMPOSITION, METHOD FOR PRODUCING REFLECTIVE LAYER, REFLECTIVE LAYER, CURED PRODUCT, AND OPTICALLY ANISOTROPIC BODY

CROSS-REFERENCE TO RELATED APPLICATIONS

This application is a Continuation of PCT International Application No. PCT/JP2018/026337 filed on Jul. 12, 2018, which claims priority under 35 U.S.C. § 119(a) to Japanese Patent Application No. 2017-136144 filed on Jul. 12, 2017. The above application is hereby expressly incorporated by reference, in its entirety, into the present application.

BACKGROUND OF THE INVENTION

1. Field of the Invention

The present invention relates to a liquid crystal composition, a method for producing a reflective layer, a reflective layer, a cured product, and an optically anisotropic body.

2. Description of the Related Art

A layer obtained by immobilizing a cholesteric liquid crystalline phase is known as a layer having properties of selectively reflecting either dextrorotatory circularly polarized light or levorotatory circularly polarized light in a specific wavelength range. For this reason, it has been developed for various purposes; for example, it is used as a phase difference layer (JP2005-049866A). In JP2005-049866A, the direction of an alignment regulating force of an alignment film is set in a random state, and therefore the direction of a director of a liquid crystal compound in contact with the alignment film is made random.

SUMMARY OF THE INVENTION

On the other hand, expansion of the viewing angle is required from the viewpoint of applying a layer obtained by immobilizing a cholesteric liquid crystalline phase to a projected image display member such as a projection screen.

More specifically, in a case where light is incident from the normal direction of the surface of the layer obtained by immobilizing a cholesteric liquid crystalline phase, either dextrorotatory circularly polarized light or levorotatory circularly polarized light is selectively reflected. At that time, in a case where the reflection is made not only in the normal direction but also in the oblique direction, it leads to an improvement in visibility from the oblique direction. In other words, the reflective layer is required to have excellent properties in which incident light is reflected in various directions (so-called diffuse reflectivity).

The present inventors have prepared a reflective layer using the alignment film described in JP2005-049866A without subjecting the reflective layer to a rubbing treatment and studied diffuse reflectivity of the thus-prepared reflective layer. As a result, the diffuse reflectivity did not satisfy the recently required level and therefore a further improvement was necessary.

In view of the above circumstances, an object of the present invention is to provide a liquid crystal composition capable of forming a reflective layer having excellent diffuse reflectivity.

Further, an object of the present invention is to provide a method for producing a reflective layer having excellent diffuse reflectivity and a reflective layer having excellent diffuse reflectivity.

Further, an object of the present invention is to provide a cured product and an optically anisotropic body, each of which is formed of the liquid crystal composition.

As a result of extensive studies to achieve the foregoing objects, the present inventors have found that a reflective layer having desired properties can be produced by using a chiral agent (chiral agent A) whose helical twisting power (HTP) is reduced upon light irradiation in combination with a chiral agent (chiral agent B) that induces a helix in the direction opposite to that of the chiral agent A.

That is, it has been found that the foregoing objects can be achieved by the following configuration.

[1] A liquid crystal composition, comprising:
a liquid crystal compound;
a chiral agent A whose helical twisting power is reduced upon light irradiation; and
a chiral agent B which induces a helix in a direction opposite to that of the chiral agent A,
in which the liquid crystal compound is cholesterically aligned in the direction of the helix induced by the chiral agent B in a case where the liquid crystal compound is aligned into a cholesteric liquid crystalline phase state.

[2] The liquid crystal composition according to [1], satisfying a relationship of Expression (1A),
in which each unit of the helical twisting power of the chiral agent A and the helical twisting power of the chiral agent B in Expression (1A) is $\mu m^{-1}$, and each unit of a content of the chiral agent A with respect to the liquid crystal compound and a content of the chiral agent B with respect to the liquid crystal compound in Expression (1A) is % by mass, Expression (1A): helical twisting power of chiral agent A×content of chiral agent A with respect to liquid crystal compound<helical twisting power of chiral agent B×content of chiral agent B with respect to liquid crystal compound.

[3] The liquid crystal composition according to [1] or [2], in which a content of the chiral agent A is 1.0% to 6.0% by mass with respect to a total mass of the liquid crystal compound, and a content of the chiral agent B is 1.0% to 10% by mass with respect to the total mass of the liquid crystal compound.

[4] The liquid crystal composition according to any one of [1] to [3], in which the helical twisting power of the chiral agent A is 10 to 100 $\mu m^{-1}$ and a helical twisting power of the chiral agent B is 30 to 200 $\mu m^{-1}$.

[5] The liquid crystal composition according to any one of [1] to [4], in which the liquid crystal compound has at least one or more polymerizable groups.

[6] A method for producing a reflective layer, comprising:
a step 1 of forming a composition layer using the liquid crystal composition according to any one of [1] to [4];
a step 2 of aligning the liquid crystal compound contained in the composition layer into a cholesteric liquid crystalline phase state; and
a step 3 of irradiating at least a partial region of the composition layer with light to reduce a helical twisting power of chiral agent A contained in the composition layer in a light irradiation region, such that a helical pitch of the cholesteric liquid crystalline phase is reduced by 5% or more.

[7] A method for producing a reflective layer, comprising:
a step 1 of forming a composition layer using the liquid crystal composition according to [5];

a step 2 of aligning the liquid crystal compound contained in the composition layer into a cholesteric liquid crystalline phase state; and a step 3 of irradiating at least a partial region of the composition layer with light to reduce a helical twisting power of chiral agent A contained in the composition layer in a light irradiation region, such that a helical pitch of the cholesteric liquid crystalline phase is reduced by 5% or more, and further comprising a step 4 of subjecting the composition layer to a curing treatment during the step 3 to immobilize the cholesteric liquid crystalline phase or subjecting the composition layer to a curing treatment after the step 3 to immobilize the cholesteric liquid crystalline phase.

[8] The method for producing a reflective layer according to [7], in which the cholesteric liquid crystalline phase is immobilized by a polymerization reaction upon light irradiation.

[9] The method for producing a reflective layer according to any one of [6] to [8], in which the light irradiation in the step 3 is a step of exposing the composition layer in a pattern-wise manner.

[10] A reflective layer obtained by immobilizing a cholesteric liquid crystalline phase, the reflective layer comprising:

a region A in which bright portions and dark portions derived from a cholesteric liquid crystalline phase observed in a cross section of the reflective layer with a scanning electron microscope are wave-like, and a region B in which bright portions and dark portions derived from a cholesteric liquid crystalline phase observed in a cross section of the reflective layer with a scanning electron microscope are linear and parallel to each other.

[11] The reflective layer according to [10], in which a helical pitch derived from the cholesteric liquid crystalline phase in the region A is smaller than a helical pitch derived from the cholesteric liquid crystalline phase in the region B.

[12] The reflective layer according to [10] or [11], in which the region A and the region B are present within a radius of 1 mm at any position in an in-plane direction of the reflective layer.

[13] The reflective layer according to any one of [10] to [12], in which the region A further includes a plurality of regions having central reflection wavelengths different from each other.

[14] A cured product obtained by curing the liquid crystal composition according to [5].

[15] An optically anisotropic body obtained by curing the liquid crystal composition according to [5].

According to this invention, it is possible to provide a liquid crystal composition capable of forming a reflective layer having excellent diffuse reflectivity.

Further, according to the present invention, it is possible to provide a method for producing a reflective layer having excellent diffuse reflectivity and a reflective layer having excellent diffuse reflectivity.

Further, according to the present invention, it is possible to provide a cured product and an optically anisotropic body, each of which is formed of the liquid crystal composition.

DESCRIPTION OF THE PREFERRED EMBODIMENTS

Hereinafter, the present invention will be described in detail. In the present specification, the numerical range expressed by using "to" means a range including numerical values described before and after "to" as a lower limit value and an upper limit value, respectively.

Further, in the present specification, the term "(meth)acrylate" is a notation expressing both acrylate and methacrylate, the term "(meth)acryloyl group" is a notation expressing both acryloyl group and methacryloyl group, and the term "(meth)acrylic" is a notation expressing both acrylic and methacrylic.

[Liquid Crystal Composition]

The liquid crystal composition according to the embodiment of the present invention includes:

a liquid crystal compound, a chiral agent A whose helical twisting power is reduced upon light irradiation, and a chiral agent B which induces a helix in the direction opposite to that of the chiral agent A.

Further, the liquid crystal compound of the present invention is cholesterically aligned in the direction of the helix induced by the chiral agent B in a case where the liquid crystal compound is aligned into a cholesteric liquid crystalline phase state.

The present inventors have found that, in a case where a reflective layer is produced using the liquid crystal composition described above and then in a case where the composition in a cholesteric liquid crystalline phase state is irradiated with light to reduce the helical twisting power of the chiral agent A, the helical pitch of the cholesteric liquid crystalline phase is reduced (the percentage reduction is preferably 5% or more), and as a result, a reflective layer having excellent diffuse reflectivity can be formed.

Although the reason that such a reflective layer having excellent diffuse reflectivity is obtained is not clear in detail, the present inventors speculate as follows.

Figure 1:
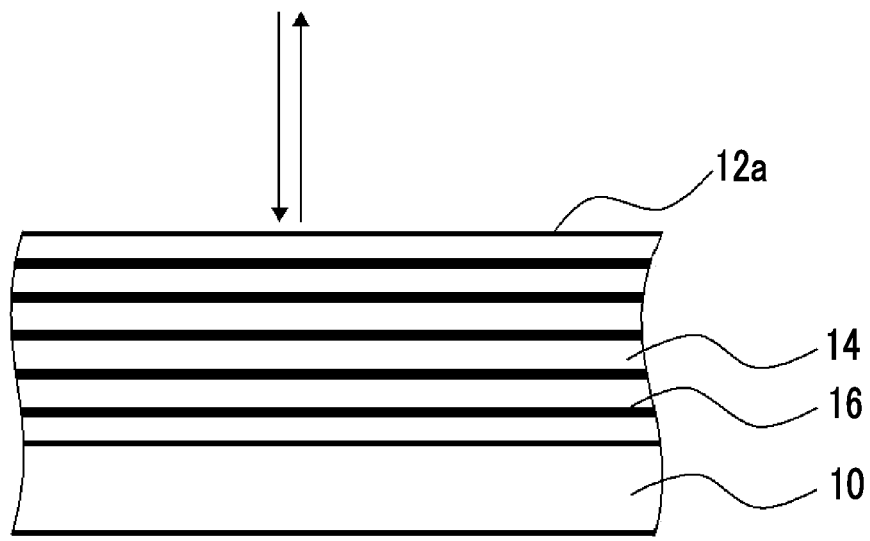
FIG. 1 is a schematic diagram in a case where a cross section of a layer in a general cholesteric liquid crystalline phase state is observed by a scanning electron microscope (SEM).

First, FIG. 1 shows a schematic cross-sectional view in a case where a layer of a composition in a general cholesteric liquid crystalline phase state is disposed on a substrate. As shown in FIG. 1, in a case where a cross section of a layer 12a of a composition in a cholesteric liquid crystalline phase state disposed on a substrate 10 is observed by a scanning electron microscope (SEM), a stripe pattern of bright portions 14 and dark portions 16 are usually observed. That is, a layered structure in which the bright portions 14 and the dark portions 16 are alternately laminated is observed in the cross section of the layer 12a of the composition in a cholesteric liquid crystalline phase state.

In FIG. 1, two repetitions of the bright portions 14 and the dark portions 16 (two bright portions and two dark portions) correspond to one helical pitch (one helical winding).

Generally, as shown in FIG. 1, the stripe pattern (layered structure) of the bright portions 14 and the dark portions 16 is formed to be parallel to the surface of the substrate 10 (that is, the bright portions 14 and the dark portions 16 are linear and are formed to be parallel to each other). In such an aspect, in a case where light is incident from the normal direction of the layer 12a of the composition in a cholesteric liquid crystalline phase state, the light is reflected in the normal direction, but the light is hardly reflected in the oblique direction, which results in poor diffuse reflectivity (see arrows in FIG. 1).

Figure 2:
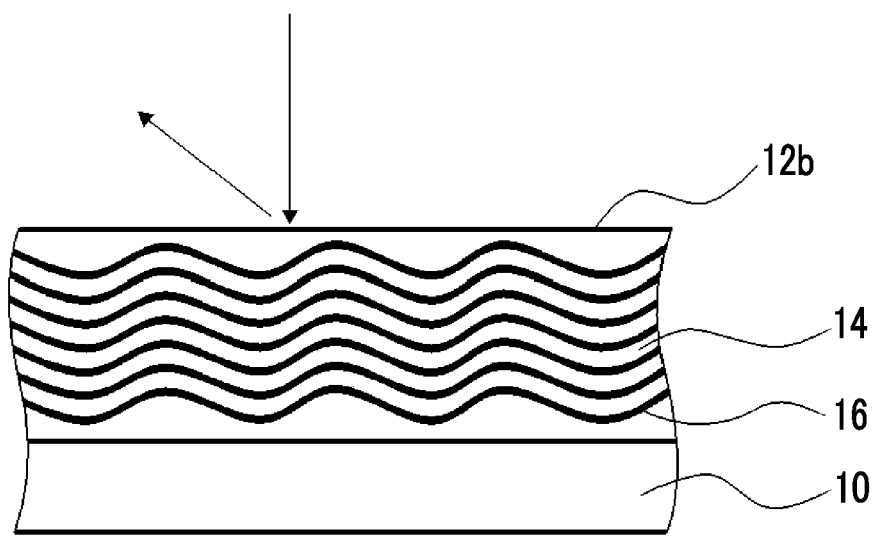
FIG. 2 is a schematic diagram in a case where a cross section of a reflective layer produced by a production method of the present invention is observed by SEM.

On the other hand, in a case where a reflective layer is produced using the liquid crystal composition according to the embodiment of the present invention, a step of irradiating the composition in a cholesteric liquid crystalline phase state with light so as to reduce the helical twisting power of the chiral agent A and reducing the helical pitch of the cholesteric liquid crystalline phase in the light irradiation region (in other words, making the twist of the cholesteric liquid crystalline phase stronger) is carried out. As a result, in the light irradiation region, the twist of the liquid crystal compound becomes stronger, and therefore the layer in a cholesteric liquid crystalline phase changes so as to be inclined. More specifically, by subjecting the layer 12a of the composition in a cholesteric liquid crystalline phase state shown in FIG. 1 to a predetermined treatment, as shown in FIG. 2, a layer 12b in which the bright portions 14 and the dark portions 16 have a wave-like structure (undulating structure) is obtained. In a case where light is incident on the layer 12b having such a wave-like structure (uneven structure) from the normal direction of the layer 12b having a wave-like structure, as shown in FIG. 2, a part of the incident light is reflected in an oblique direction since there is a region where the helical axis of the liquid crystal compound is inclined (see arrows in FIG. 2). That is, a reflective layer having excellent diffuse reflectivity (particularly wide-angle reflectivity) can be obtained by using the liquid crystal composition according to the embodiment of the present invention.

By the way, as described above, the liquid crystal composition according to the embodiment of the present invention contains, as chiral agents, a chiral agent (chiral agent A) whose helical twisting power (HTP) is reduced upon light irradiation and a chiral agent (chiral agent B) that induces a helix in the direction opposite to that of the chiral agent A. It is considered that, by adopting the above configuration, the helical pitch of the cholesteric liquid crystalline phase can be reduced in a case where the composition in a cholesteric liquid crystalline phase state is irradiated with light.

The helical twisting power (HTP) of the chiral agent is a factor indicating the helical alignment ability expressed by Expression (1B).

HTP=1/(length of helical pitch (unit: μm)×content of chiral agent with respect to liquid crystal compound (% by mass)) [μm$^{-1}$]   Expression (1B)

The length of the helical pitch refers to the length of the pitch P (=period of the helix) of the helical structure of the cholesteric liquid crystalline phase and can be measured by the method described on page 196 of the Liquid Crystal Handbook (published by Maruzen Co., Ltd.).

In addition, the value of HTP is influenced not only by the type of chiral agent but also by the type of liquid crystal compound contained in the composition. Therefore, for example, in a case where a composition containing a predetermined chiral agent X and a liquid crystal compound A and a composition containing a predetermined chiral agent X and a liquid crystal compound B different from the liquid crystal compound A are prepared, and the HTPs of both compositions are measured at the same temperature, the values of HTPs may be different therebetween.

In addition, the helical twisting power (HTP) of the chiral agent is also expressed as Expression (1D).

HTP=(average refractive index of liquid crystal compound)/{(content of chiral agent with respect to liquid crystal compound (% by mass))×(central reflection wavelength (nm))}[μm$^{-1}$]   Expression (1D):

Hereinafter, the action mechanism of the chiral agent A and the chiral agent B will be schematically described.

Figure 3:
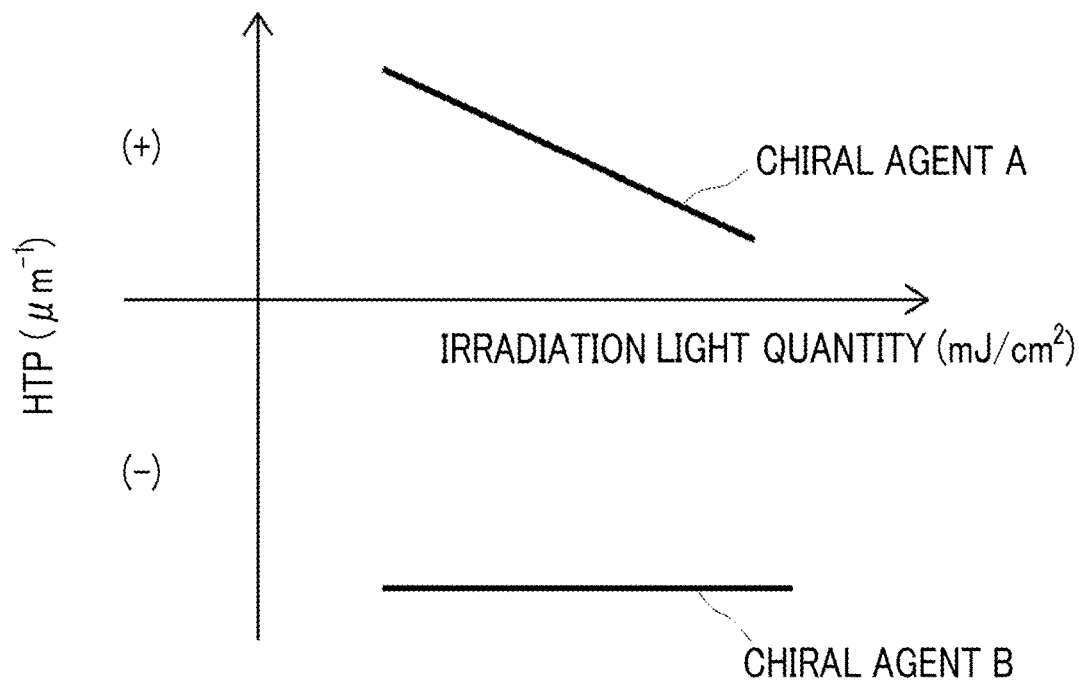
FIG. 3 is a schematic diagram of a graph plotting a relationship between HTP ($\mu m^{-1}$) and irradiation light quantity ($mJ/cm^2$) for each of chiral agent A and chiral agent B.

FIG. 3 is a schematic diagram showing an example of a graph plotted with a vertical axis as HTP (μm$^{-1}$) and a lateral axis as irradiation light quantity (mJ/cm$^2$) for each of the chiral agent A and chiral agent B.

The chiral agent A has a property of inducing a right-handed ((+)) helix and being reduced in HTP upon light irradiation. On the other hand, the chiral agent B induces a left-handed ((−)) helix that is opposite to the chiral agent A. In addition, FIG. 3 shows an aspect in which a chiral agent having substantially no dependency on the irradiation light quantity is used as the chiral agent B. In addition, in FIG. 3, as to the chiral agent A, a graph in which HTP is reduced linearly depending on the irradiation light quantity is shown as an example, but the chiral agent A is not particularly limited as long as HTP is reduced upon light irradiation. For example, the chiral agent A may be one whose HTP is reduced stepwise upon light irradiation.

Figure 4:
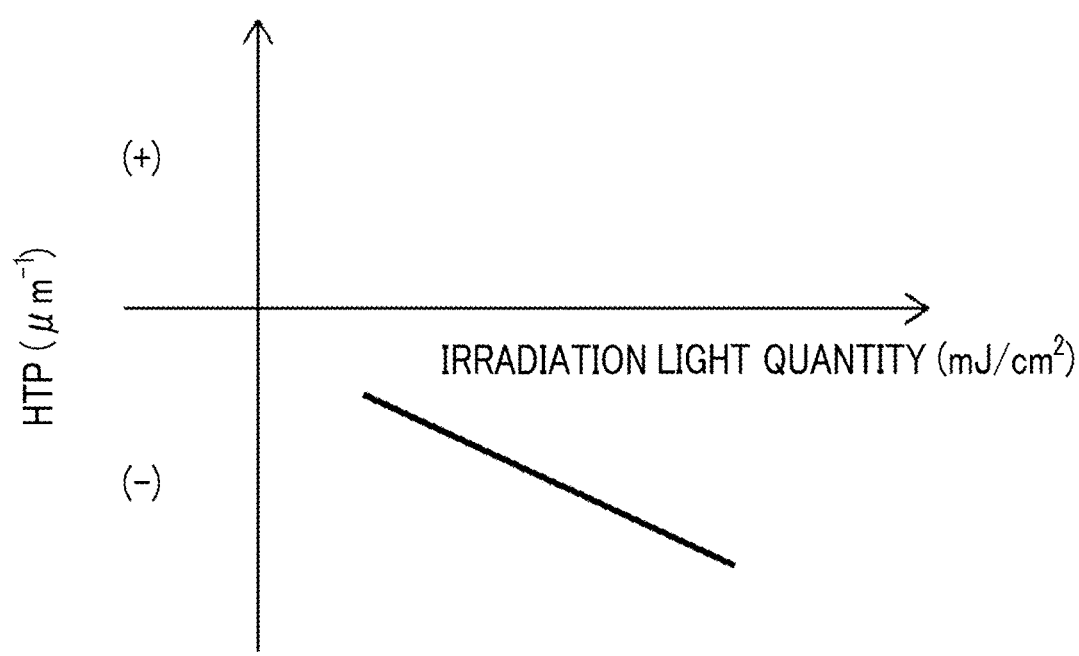
FIG. 4 is a schematic diagram of a graph plotting the relationship between HTP ($\mu m^{-1}$) and irradiation light quantity ($mJ/cm^2$) in a system in which chiral agent A and chiral agent B are used in combination.

In a case where the liquid crystal compound is aligned into a cholesteric liquid crystalline phase state, the helical twisting power that induces the helix of the liquid crystal compound is considered to roughly correspond to the sum of the helical twisting power of the chiral agent A and the helical twisting power of the chiral agent B. That is, in the system using the chiral agent A and the chiral agent B in combination, as shown in FIG. 4, it is considered that a larger irradiation light quantity leads to higher helical twisting power in the direction (−) of the helix induced by the chiral agent B (note that the HTP on the vertical axis is increased with increasing distance from 0 in both the right-handed direction (+) and the left-handed direction (−)).

In a case where the composition in a cholesteric liquid crystalline phase state is irradiated with light by the above mechanism, the helical twisting power of the chiral agent A is reduced, and as a result, the twist becomes stronger in the direction of the helix induced by the chiral agent B and therefore reduction of the helical pitch of the cholesteric liquid crystalline phase occurs. Note that the percentage reduction of the helical pitch of the cholesteric liquid crystalline phase can be adjusted by the irradiation light quantity, the content of chiral agent A with respect to chiral agent B, and the like.

The term "light" in the present specification means actinic rays or radiation, which refers to, for example, an emission line spectrum of a mercury lamp, far ultraviolet rays represented by an excimer laser, extreme ultraviolet rays (EUV light), X-rays, ultraviolet rays, and electron beams (EB). Of these, ultraviolet rays are preferable.

Hereinafter, individual components contained in the liquid crystal composition will be described.

<Chiral Agent A>

The chiral agent A is a compound that induces a helix of a liquid crystal compound, and is not particularly limited as long as it is a chiral agent whose helical twisting power (HTP) is reduced upon light irradiation.

The chiral agent A may be liquid crystalline or non-liquid crystalline. The chiral agent A generally contains an asymmetric carbon atom; however, an axial asymmetric compound or planar asymmetric compound not containing an asymmetric carbon atom may also be used as the chiral agent A. The chiral agent A may have a polymerizable group.

The chiral agent whose HTP is reduced upon light irradiation may be, for example, a so-called photoreactive chiral agent. The photoreactive chiral agent is a compound which has a chiral moiety and a photoreactive moiety that undergoes a structural change upon light irradiation, and greatly changes the twisting power of the liquid crystal compound in accordance with the irradiation light quantity, for example.

Examples of the photoreactive moiety that undergoes a structural change upon light irradiation include photochromic compounds (written by Kingo Uchida and Masahiro Irie, Chemical Industry, Vol. 64, p. 640, 1999, and written by Kingo Uchida and Masahiro Irie, Fine Chemical, Vol. 28(9), p. 15, 1999). The structural change means decomposition, addition, isomerization, dimerization, or the like caused upon light irradiation to the photoreactive moiety, and the structural change may be irreversible. Furthermore, the chiral moiety corresponds to an asymmetric carbon described in Chemistry of Liquid Crystal, No. 22, Hiroyuki Nohira, Chemistry Review, p. 73, 1994.

Examples of the photoreactive chiral agent include photoreactive chiral agents described in paragraphs [0044] to [0047] of JP2001-159709A, optically active compounds described in paragraphs [0019] to [0043] of JP2002-179669A, optically active compounds described in paragraphs [0020] to [0044] of JP2002-179633A, optically active compounds described in paragraphs [0016] to [0040] of JP2002-179670A, optically active compounds described in paragraphs [0017] to [0050] of JP2002-179668A, optically active compounds described in paragraphs [0018] to [0044] of JP2002-180051A, optically active compounds described in paragraphs [0016] to [0055] of JP2002-338575A, and optically active compounds in paragraphs [0020] to [0049] of JP2002-179682A.

Above all, a compound having at least one photoisomerization moiety is preferable as the chiral agent A. From the viewpoint that absorption of visible light is small, photoisomerization easily occurs, and the HTP difference before and after light irradiation is large, the photoisomerization moiety is preferably a cinnamoyl moiety, a chalcone moiety, an azobenzene moiety, a stilbene moiety, or a coumarin moiety, and more preferably a cinnamoyl moiety or a chalcone moiety. In addition, the photoisomerization moiety corresponds to the above-mentioned photoreactive moiety that undergoes a structural change upon light irradiation.

In addition, from the viewpoint that the HTP difference before and after light irradiation is large, the chiral agent A is preferably an isosorbide-based optically active compound, an isomannide-based optically active compound, or a binaphthol-based optically active compound. That is, the chiral agent A preferably has an isosorbide skeleton, an isomannide skeleton, or a binaphthol skeleton as the chiral moiety. Above all, from the viewpoint of a larger HTP difference before and after light irradiation, the chiral agent A is more preferably an isosorbide-based optically active compound or a binaphthol-based optically active compound, and still more preferably an isosorbide-based optically active compound.

The HTP of the chiral agent A before light irradiation (before the helical twisting power is reduced) is preferably 10 to 100 $\mu m^{-1}$, more preferably 10 to 80 $\mu m^{-1}$, and still more preferably 20 to 50 $\mu m^{-1}$. In addition, the HTP of the chiral agent A after light irradiation (after the helical twisting power is reduced) is preferably 0 to 30 $\mu m^{-1}$ and more preferably 0 to 22 $\mu m^{-1}$.

The content of the chiral agent A in the liquid crystal composition is preferably 1.0% to 6.0% by mass, more preferably 1.0% to 5.0% by mass, still more preferably 1.0% to 4.0% by mass, and particularly preferably 1.2% to 4.0% by mass with respect to the total mass of the liquid crystal compound.

In addition, the chiral agent A may be used alone or in combination of two or more thereof. In a case where two or more types of the chiral agent A are used in combination, the total content thereof is preferably in the above range.

<Chiral Agent B>

The chiral agent B is not particularly limited as long as it is a chiral agent that induces a helix in the direction opposite to that of the chiral agent A. That is, for example, in a case where the helix induced by the chiral agent A is right-handed, the helix induced by the chiral agent B is left-handed.

The chiral agent B may be liquid crystalline or non-liquid crystalline. The chiral agent B generally contains an asymmetric carbon atom; however, an axial asymmetric compound or planar asymmetric compound not containing an asymmetric carbon atom may also be used as the chiral agent. The chiral agent B may have a polymerizable group.

The chiral agent B may be selected from chiral agents described in, for example, Liquid Crystal Device Handbook, Chap. 3, Item 4-3, Chiral Agents for Twisted Nematic (TN) and Super Twisted Nematic (STN), p. 199, edited by the 142$^{nd}$ Committee of the Japan Society for the Promotion of Science, 1989). In addition, the chiral agent B is preferably not the above-mentioned photoreactive chiral agent.

The content of the chiral agent B in the liquid crystal composition is preferably as small as possible from the viewpoint that the influence on liquid crystallinity can be further reduced and haze can be further reduced. Accordingly, the chiral agent B is preferably a compound having a strong twisting power in order that the compound could achieve twisted alignment of a desired helical pitch even in a case where the amount thereof used is small.

Examples of such a chiral agent exhibiting a strong twisting power include optically active compounds described in paragraphs [0017] to [0050] of JP2002-179668A, optically active compounds described in paragraphs of [0016] to [0044] of JP2002-180051A, optically active compounds described in JP2011-241215A, and chiral agents described in JP2014-034581A.

From the viewpoint of high HTP, the chiral agent B is preferably an isosorbide-based optically active compound, an isomannide-based optically active compound, or a binaphthol-based optically active compound, more preferably an isosorbide-based optically active compound or a binaphthol-based optically active compound, and still more preferably a binaphthol-based optically active compound.

The helical twisting power of the chiral agent B is preferably 30 to 200 $\mu m^{-1}$, more preferably 40 to 200 $\mu m^{-1}$, and still more preferably 50 to 100 $\mu m^{-1}$.

The content of the chiral agent B in the liquid crystal composition is preferably 1.0% to 10% by mass, more preferably 2.0% to 10% by mass, and still more preferably 2.0% to 8.0% by mass with respect to the total mass of the liquid crystal compound.

In addition, the chiral agent B may be used alone or in combination of two or more thereof. In a case where two or more types of the chiral agent B are used in combination, the total content thereof is preferably in the above range.

The chiral agent A and the chiral agent B in the liquid crystal composition preferably satisfy Expression (1A) from the viewpoint that the percentage reduction of the helical pitch of the cholesteric liquid crystalline phase after light irradiation is excellent.

Helical twisting power of chiral agent A×content of chiral agent A with respect to liquid crystal compound<helical twisting power of chiral agent B×content of chiral agent B with respect to liquid crystal compound        Expression (1A):

Note that each unit of the helical twisting power of the chiral agent A and the helical twisting power of the chiral agent B is $\mu m^{-1}$. In addition, each unit of the content of the chiral agent A with respect to the liquid crystal compound and the content of the chiral agent B with respect to the liquid crystal compound is % by mass.

<Liquid Crystal Compound>

The type of the liquid crystal compound is not particularly limited.

Generally, liquid crystal compounds can be classified into a rod type (rod-like liquid crystal compound) and a disc type (discotic liquid crystal compound, disk-like liquid crystal compound) depending on the shape thereof. Further, the rod type and the disk type each have a low molecular weight type and a high molecular weight type. The high molecular weight generally refers to having a degree of polymerization of 100 or more (Polymer Physics-Phase Transition Dynamics, Masao Doi, page 2, Iwanami Shoten, 1992). Any liquid crystal compound can be used in the present invention. Two or more liquid crystal compounds may be used in combination.

The liquid crystal compound may have a polymerizable group. The type of the polymerizable group is not particularly limited, and a functional group capable of addition polymerization reaction is preferable, and a polymerizable ethylenically unsaturated group or a cyclic polymerizable group is more preferable. More specifically, the polymerizable group is preferably a (meth)acryloyl group, a vinyl group, a styryl group, an allyl group, an epoxy group, or an oxetane group, and more preferably a (meth)acryloyl group.

The liquid crystal compound is preferably a liquid crystal compound represented by Formula (I) from the viewpoint that the reflective layer has superior diffuse reflectivity.

Among these, from the viewpoint of superior diffuse reflectivity of the reflective layer, in a case where the number obtained by dividing the number of trans-1,4-cyclohexylene groups which may have a substituent represented by A by m is defined as mc, a liquid crystal compound satisfying mc>0.1 is preferable, and a liquid crystal compound satisfying 0.4≤mc≤0.8 is more preferable.

Note that mc is a number represented by the following calculating expression.

mc=(the number of trans-1,4-cyclohexylene groups which may have a substituent represented by A)/m

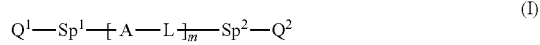         (I)

In the formula,

A represents a phenylene group which may have a substituent or a trans-1,4-cyclohexylene group which may have a substituent, at least one of A's represents a trans-1,4-cyclohexylene group which may have a substituent, L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=N—N=CH—, —CH=CH—, —CC—, —NHC(=O)—, —C(=O)NH—, —CH=N—, —N=CH—, —CH=CH—C(=O)O—, and —OC(=O)—CH=CH—, m represents an integer of 3 to 12, Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—, and Q$^1$ and Q$^2$ each independently represent a hydrogen atom or a polymerizable group selected from the group consisting of groups represented by Formulae (Q-1) to (Q-5), provided that one of Q$^1$ and Q$^2$ represents a polymerizable group.

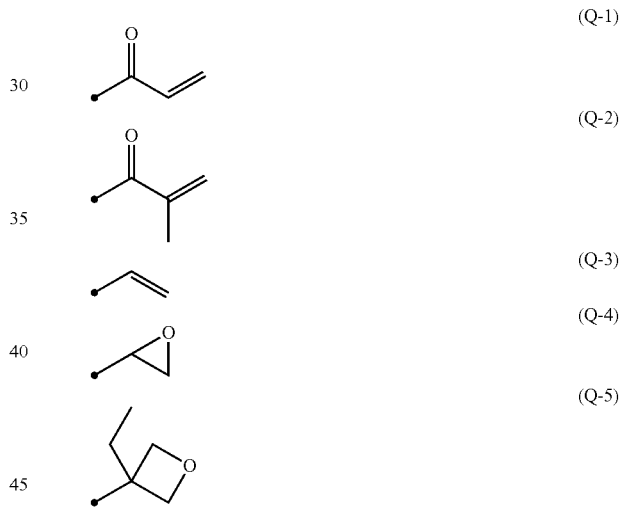

A is a phenylene group which may have a substituent or a trans-1,4-cyclohexylene group which may have a substituent. In the present specification, the phenylene group is preferably a 1,4-phenylene group.

At least one of A's is a trans-1,4-cyclohexylene group which may have a substituent.

m pieces of A's may be the same as or different from each other.

m represents an integer of 3 to 12, preferably an integer of 3 to 9, more preferably an integer of 3 to 7, and still more preferably an integer of 3 to 5.

The substituent which the phenylene group and the trans-1,4-cyclohexylene group in Formula (I) may have is not particularly limited, and examples thereof include substituents selected from the group consisting of an alkyl group, a cycloalkyl group, an alkoxy group, an alkyl ether group, an amide group, an amino group, a halogen atom, and a group formed by combining two or more of these substituents. Examples of the substituent include substituents represented by —C(=O)—X$^3$-Sp$^3$-Q$^3$ which will be described later.

The phenylene group and the trans-1,4-cyclohexylene group may have 1 to 4 substituents. In a case of having two or more substituents, the two or more substituents may be the same as or different from each other.

In the present specification, the alkyl group may be either linear or branched. The number of carbon atoms in the alkyl group is preferably 1 to 30, more preferably 1 to 10, and still more preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethylpropyl group, an n-hexyl group, an isohexyl group, a heptyl group, an octyl group, a nonyl group, a decyl group, an undecyl group, and a dodecyl group. The explanation of the alkyl group in the alkoxy group is also the same as the explanation on the foregoing alkyl group. Further, in the present specification, specific examples of the alkylene group in a case of being referred to as an alkylene group include divalent groups obtained by removing one hydrogen atom from each of the foregoing examples of the alkyl group. Examples of the halogen atom include a fluorine atom, a chlorine atom, a bromine atom, and an iodine atom.

In the present specification, the number of carbon atoms in the cycloalkyl group is preferably 3 or more and more preferably 5 or more and is preferably 20 or less, more preferably 10 or less, still more preferably 8 or less, and particularly preferably 6 or less. Examples of the cycloalkyl group include a cyclopropyl group, a cyclobutyl group, a cyclopentyl group, a cyclohexyl group, a cycloheptyl group, and a cyclooctyl group.

The substituent which the phenylene group and the trans-1,4-cyclohexylene group may have is preferably a substituent selected from the group consisting of an alkyl group, an alkoxy group, and —C(=O)—X$^3$-Sp$^3$-Q$^3$. Here, X$^3$ represents a single bond, —O—, —S—, or —N(Sp$^4$-Q$^4$)- or represents a nitrogen atom forming a ring structure together with Q$^3$ and Sp$^3$. Sp$^3$ and Sp$^4$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—.

Q$^3$ and Q$^4$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any polymerizable group selected from the group consisting of groups represented by Formulae (Q-1) to (Q-5).

Specific examples of the group where one or two or more —CH$_2$— in a cycloalkyl group is substituted with —O—, —S—, —NH—, —N(CH$_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, and a morpholinyl group. Among them, a tetrahydrofuranyl group is preferable, and a 2-tetrahydrofuranyl group is more preferable.

In Formula (I), L represents a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—.

L is preferably —C(=O)O— or —OC(=O)—. m pieces of L's may be the same as or different from each other.

Sp$^1$ and Sp$^2$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or —C(=O)O—. Sp$^1$ and Sp$^2$ are each independently preferably a linking group formed by combining one or two or more groups selected from the group consisting of a linear alkylene group having 1 to 10 carbon atoms to which a linking group selected from the group consisting of —O—, —OC(=O)—, and —C(=O)O— is bonded to both terminals thereof, —OC(=O)—, —C(=O)O—, —O—, and a linear alkylene group having 1 to 10 carbon atoms, and more preferably a linear alkylene group having 1 to 10 carbon atoms to which —O— is bonded to both terminals thereof.

Q$^1$ and Q$^2$ each independently represent a hydrogen atom or a polymerizable group selected from the group consisting of groups represented by Formulae (Q-1) to (Q-5), provided that either one of Q$^1$ and Q$^2$ represents a polymerizable group.

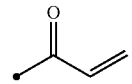

(Q-1)

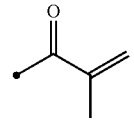

(Q-2)

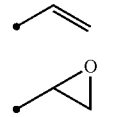

(Q-3)

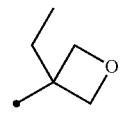

(Q-4)

(Q-5)

The polymerizable group is preferably an acryloyl group (Formula (Q-1)) or a methacryloyl group (Formula (Q-2)).

Specific examples of the liquid crystal compound include a liquid crystal compound represented by Formula (I-11), a liquid crystal compound represented by Formula (I-21), and a liquid crystal compound represented by Formula (I-31). In addition to the foregoing compounds, known compounds such as a compound represented by Formula (I) in JP2013-112631A, a compound represented by Formula (I) in JP2010-070543A, a compound represented by Formula (I) in JP2008-291218A, a compound represented by Formula (I) in JP4725516B, a compound represented by Formula (II) in JP2013-087109A, a compound described in paragraph [0043] of JP2007-176927A, a compound represented by Formula (1-1) in JP2009-286885A, a compound represented by Formula (I) in WO2014/010325A, a compound represented by Formula (1) in JP2016-081035A, and a compound represented by Formulae (2-1) and (2-2) in JP2016-121339A can be mentioned.

A liquid crystal compound represented by Formula (I-11)

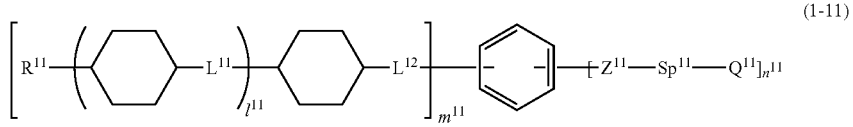

(1-11)

In the formula, $R^{11}$ represents a hydrogen atom, a linear or branched alkyl group having 1 to 12 carbon atoms, or $-Z_{12}-Sp^{12}-Q^{12}$, $L^{11}$ represents a single bond, $-C(=O)O-$, or $-O(C=O)-$, $L^{12}$ represents $-C(=O)O-$, $-OC(=O)-$, or $-CONR^2-$ $R^2$ represents a hydrogen atom or an alkyl group having 1 to 3 carbon atoms, $Z^{11}$ and $Z^{12}$ each independently represent a single bond, $-O-$, $-NH-$, $-N(CH_3)-$, $-S-$, $-C(=O)O-$, $-OC(=O)-$, $-OC(=O)O-$, or $-C(=O)NR^{12}-$, $R^{12}$ represents a hydrogen atom or $Sp^{12}-Q^{12}$, $Sp^{11}$ and $Sp^{12}$ each independently represent a single bond, a linear or branched alkylene group having 1 to 12 carbon atoms which may be substituted with $Q^{11}$, or a linking group obtained by substituting one or more $-CH_2-$ in a linear or branched alkylene group having 1 to 12 carbon atoms which may be substituted with $Q^{11}$ with $-O-$, $-S-$, $-NH-$, $-N(Q^{11})-$, or $-C(=O)-$, $Q^{11}$ represents a hydrogen atom, a cycloalkyl group, a group where one or more $-CH_2-$ in a cycloalkyl group is substituted with $-O-$, $-S-$, $-NH-$, $-N(CH_3)-$, $-C(=O)-$, $-OC(=O)-$, or $-C(=O)O-$, or a polymerizable group selected from the group consisting of groups represented by Formulae (Q-1) to (Q-5), $Q^{12}$ represents a hydrogen atom or a polymerizable group selected from the group consisting of groups represented by Formulae (Q-1) to (Q-5), $l^{11}$ represents an integer of 0 to 2, $m^{11}$ represents an integer of 1 or 2, $n^{11}$ represents an integer of 1 to 3, and a plurality of $R^{11}$'s, a plurality of $L^{11}$'s, a plurality of $L^{12}$'s, a plurality of $l^{11}$'s, a plurality of $Z^{11}$'s, a plurality of $Sp^{11}$'s, and a plurality of $Q^{11}$'s may be respectively the same as or different from each other.

The liquid crystal compound represented by Formula (I-11) contains at least one $-Z^{12}-Sp^{12}-Q^{12}$ in which $Q^{12}$ is a polymerizable group selected from the group consisting of groups represented by Formulae (Q-1) to (Q-5), as $R^{11}$.

In addition, in the liquid crystal compound represented by Formula (I-11), preferred is $-Z^{11}-Sp^{11}-Q^{11}$ in which $Z^{11}$ is $-C(=O)O-$ or $C(=O)NR^{12}-$ and $Q^{11}$ is a polymerizable group selected from the group consisting of groups represented by Formulae (Q-1) to (Q-5). In addition, in the liquid crystal compound represented by Formula (I-11), $R^{11}$ is preferably $-Z^{12}-Sp^{12}-Q^{12}$ in which $Z^{12}$ is $-C(=O)O-$ or $C(=O)NR^{12}-$, and $Q^{12}$ is a polymerizable group selected from the group consisting of groups represented by Formulae (Q-1) to (Q-5).

Any 1,4-cyclohexylene group contained in the liquid crystal compound represented by Formula (I-11) is a trans-1,4-cyclohexylene group.

A suitable aspect of the liquid crystal compound represented by Formula (I-11) may be, for example, a compound in which L" is a single bond, $l^{11}$ is 1-(a dicyclohexyl group), and $Q^{11}$ is a polymerizable group selected from the group consisting of groups represented by Formulae (Q-1) to (Q-5).

Another suitable aspect of the liquid crystal compound represented by Formula (I-11) may be, for example, a compound in which $m^{11}$ is 2, $l^{11}$ is 0, and two $R^{11}$'s each represent $-Z^{12}-Sp^{12}-Q^{12}$, and $Q^{12}$ is a polymerizable group selected from the group consisting of groups represented by Formulae (Q-1) to (Q-5).

The liquid crystal compound represented by Formula (I-21)

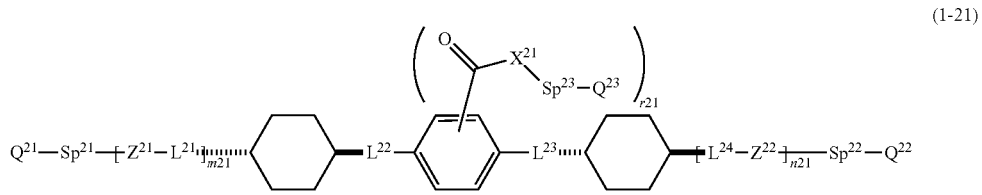

(1-21)

In the formula, $Z^{21}$ and $Z^{22}$ each independently represent a trans-1,4-cyclohexylene group which may have a substituent or a phenylene group which may have a substituent, the above substituents are each independently 1 to 4 substituents selected from the group consisting of $-CO-X^{21}-Sp^{23}-Q^{23}$, an alkyl group, and an alkoxy group, m21 represents an integer of 1 or 2, and n21 represents an integer of 0 or 1, in a case where m21 represents 2, n21 represents 0, in a case where m21 represents 2, two $Z^{21}$'s may be the same or different, at least one of $Z^{21}$ or $Z^{22}$ is a phenylene group which may have a substituent, $L^{21}$, $L^{22}$, $L^{23}$, and $L^{24}$ each independently represent a single bond or a linking group selected from the group consisting of $-CH_2O-$, $-OCH_2-$, $-(CH_2)_2OC(=O)-$, $-C(=O)O(CH_2)_2-$, $-C(=O)O-$, $-OC(=O)-$, $-OC(=O)O-$, $-CH=CH-C(=O)O-$, and $-OC(=O)-CH=CH-$, $X^{21}$ represents $-O-$, $-S-$, or $-N(Sp^{25}-Q^{25})-$ or represents a nitrogen atom forming a ring structure together with $Q^{23}$ and $Sp^{23}$, $r^{21}$ represents an integer of 1 to 4, $Sp^{21}$, $Sp^{22}$, $Sp^{23}$, and $Sp^{25}$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or C(=O)O—, $Q^{21}$ and $Q^{22}$ each independently represent a polymerizable group selected from the group consisting of groups represented by Formulae (Q-1) to (Q-5), $Q^{23}$ represents a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, any one polymerizable group selected from the group consisting of groups represented by Formulae (Q-1) to (Q-5), or a single bond in a case where $X^{21}$ is a nitrogen atom forming a ring structure together with $Q^{23}$ and $Sp^{23}$, and $Q^{25}$ represents a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, or any one polymerizable group selected from the group consisting of groups represented by Formulae (Q-1) to (Q-5), provided that in a case where $Sp^{25}$ is a single bond, $Q^{25}$ is not a hydrogen atom.

It is also preferred that the liquid crystal compound represented by Formula (I-21) has a structure in which a 1,4-phenylene group and a trans-1,4-cyclohexylene group are alternately present. For example, preferred is a structure in which m21 is 2, n21 is 0, and $Z^{21}$ is a trans-1,4-cyclohexylene group which may have a substituent or an arylene group which may have a substituent, each of which from the $Q^{21}$ side, or a structure in which m21 is 1, n21 is 1, $Z^{21}$ is an arylene group which may have a substituent, and $Z^{22}$ is an arylene group which may have a substituent.

A liquid crystal compound represented by Formula (I-31);

in a case where m31 and m32 represent 2, two $Z^{31}$'s and $Z^{32}$'s may be the same or different, $L^{31}$ and $L^{32}$ each independently represent a single bond or a linking group selected from the group consisting of —$CH_2O$—, —$OCH_2$—, —$(CH_2)_2OC(=O)$—, —$C(=O)O(CH_2)_2$—, —$C(=O)O$—, —$OC(=O)$—, —CH=CH—C(=O)O—, and —OC(=O)—CH=CH—, $Sp^{31}$, $Sp^{32}$, $Sp^{33}$, and $Sp^{34}$ each independently represent a single bond or a linking group selected from the group consisting of a linear or branched alkylene group having 1 to 20 carbon atoms and a group where one or two or more —$CH_2$— in a linear or branched alkylene group having 1 to 20 carbon atoms is substituted with —O—, —S—, —NH—, —N($CH_3$)—, —C(=O)—, —OC(=O)—, or —C(=O)O—, $Q^{31}$ and $Q^{32}$ each independently represent a polymerizable group selected from the group consisting of groups represented by Formulae (Q-1) to (Q-5), and $Q^{33}$ and $Q^{34}$ each independently represent a hydrogen atom, a cycloalkyl group, a group where one or two or more —$CH_2$— in a cycloalkyl group is substituted with —O—, —S—, —NH—, —N($CH_3$)—, —C(=O)—, —OC(=O)—, or —C(=O)O—, or any one polymerizable group selected from the group consisting of groups represented by Formulae (Q-1) to (Q-5), provided that $Q^{33}$ may represent a single bond in a case of forming a ring structure together with $X^{31}$ and $Sp^{33}$, and $Q^{34}$ is not a hydrogen atom in a case where $Sp^{34}$ is a single bond.

As the liquid crystal compound represented by Formula (I-31), particularly preferable compounds include a compound in which $Z^{32}$ is a phenylene group and a compound in which m32 is 0.

It is also preferred that the compound represented by Formula (I) has a partial structure represented by Formula (II).

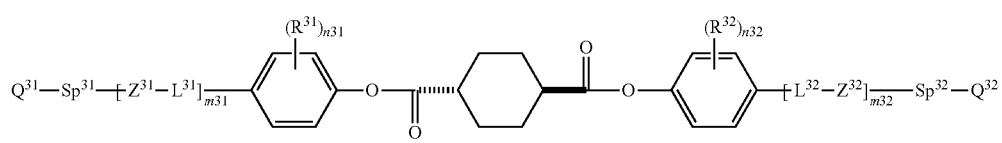

(I-31)

In the formula, $R^{31}$ and $R^{32}$ each independently represent an alkyl group, an alkoxy group, and a group selected from the group consisting of —C(=O)—$X^{31}$-$Sp^{33}$-$Q^{33}$, n31 and n32 each independently represent an integer of 0 to 4, $X^{31}$ represents a single bond, —O—, —S—, or —N($Sp^{34}$-$Q^{34}$)- or represents a nitrogen atom forming a ring structure together with $Q^{33}$ and $Sp^{33}$, $Z^{31}$ represents a phenylene group which may have a substituent, $Z^{32}$ represents a trans-1,4-cyclohexylene group which may have a substituent or a phenylene group which may have a substituent, the above substituents are each independently 1 to 4 substituents selected from the group consisting of an alkyl group, an alkoxy group, and —C(=O)—$X^{31}$-$Sp^{33}$-$Q^{33}$, m31 represents an integer of 1 or 2, and m32 represents an integer of 0 to 2,

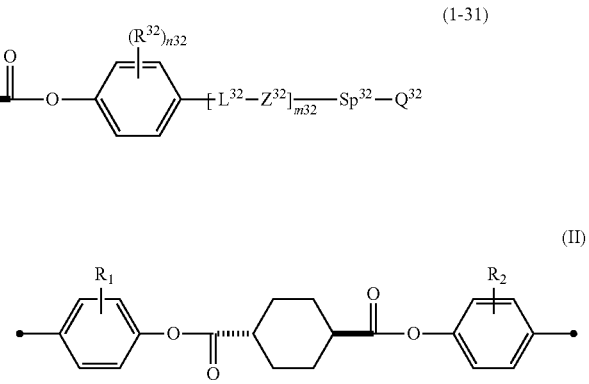

(II)

In Formula (II), black circles indicate the bonding positions with other moieties of Formula (I). It is sufficient that the partial structure represented by Formula (II) is included as a part of the partial structure represented by Formula (III) in Formula (I).

$$-\!\!+\!\!A-\!\!L\!\!+_{\!m}\!\!-$$ (III)

In the formula, $R^1$ and $R^2$ are each independently a group selected from the group consisting of a hydrogen atom, an alkyl group, an alkoxy group, and a group represented by —C(=O)—$X^3$-$Sp^3$-$Q^3$. Here, $X^3$ represents a single bond, —O—, —S—, or —N($Sp^4$-$Q^4$)- or represents a nitrogen atom forming a ring structure together with $Q^3$ and $Sp^3$. $X^3$ is preferably a single bond or —O—. $R^1$ and $R^2$ are preferably —C(=O)—$X^3$-$Sp^3$-$Q^3$. It is also preferred that $R^1$ and $R^2$ are the same. The bonding position of each of $R^1$ and $R^2$ to the phenylene group is not particularly limited.

$Sp^3$ and $Sp^4$ each independently represent a single bond or a linking group selected from the group consisting of a linear or branched alkylene group having 1 to 20 carbon atoms and a group where one or two or more —CH$_2$— in a linear or branched alkylene group having 1 to 20 carbon atoms is substituted with —O—, —S—, —NH—, —N(CH$_3$)—, —C(=O)—, —OC(=O)—, or C(=O)O—. $Sp^3$ and $Sp^4$ are each independently preferably a linear or branched alkylene group having 1 to 10 carbon atoms, more preferably a linear alkylene group having 1 to 5 carbon atoms, and still more preferably a linear chain alkylene group having 1 to 3 carbon atoms.

$Q^3$ and $Q^4$ each independently represent a hydrogen atom, a cycloalkyl group, a group where one or two or more —CH$_2$— in a cycloalkyl group is substituted with —O—, —S—, —NH—, —N(CH$_3$)—, —C(=O)—, —OC(=O)—, or —C(=O)O—, or any one polymerizable group selected from the group consisting of groups represented by Formulae (Q-1) to (Q-5).

It is also preferred that the compound represented by Formula (I) has, for example, a structure represented by Formula (II-2).

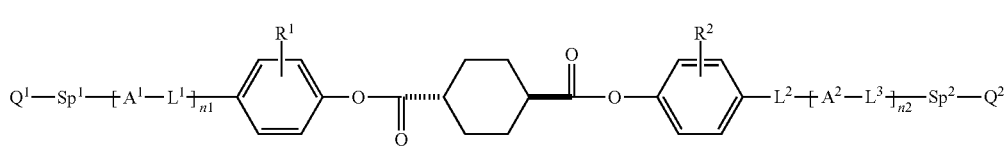

(II-2)

In the formula, $A^1$ and $A^2$ each independently represent a phenylene group which may have a substituent or a trans-1,4-cyclohexylene group which may have a substituent, and the above substituents are each independently 1 to 4 substituents selected from the group consisting of an alkyl group, an alkoxy group, and —C(=O)—$X^3$-$Sp^3$-$Q^3$, $L^1$, $L^2$, and $L^3$ each represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, and n1 and n2 each independently represent an integer of 0 to 9, and n1+n2 is 9 or less.

Each of $Q^1$, $Q^2$, $Sp^1$, and $Sp^2$ has the same definition as that of each group in Formula (I). Each of $X^3$, $Sp^3$, $Q^3$, $R^1$, and $R^2$ has the same definition as that of each group in Formula (II).

The following compounds are exemplified as the liquid crystal compound which is a liquid crystal compound represented by Formula (I) and satisfies 0.4≤mc≤0.8.

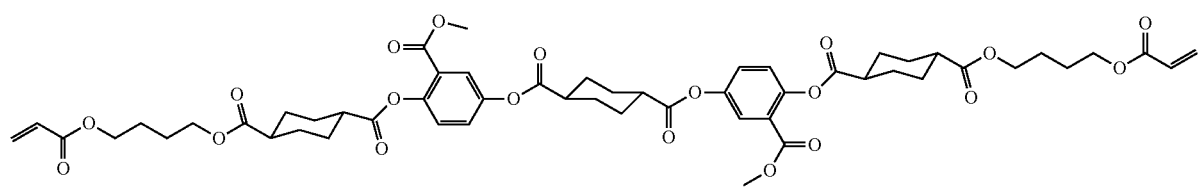

1-1

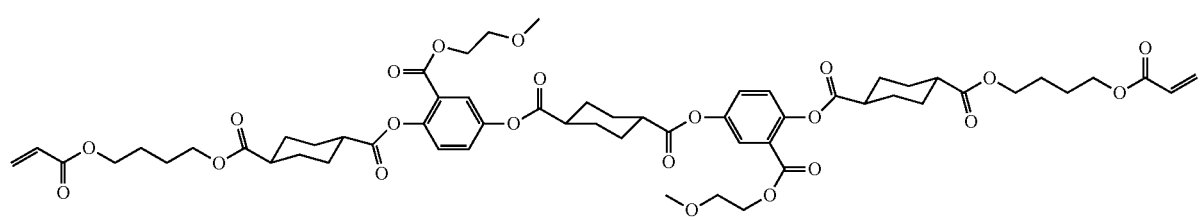

1-2

-continued
1-3
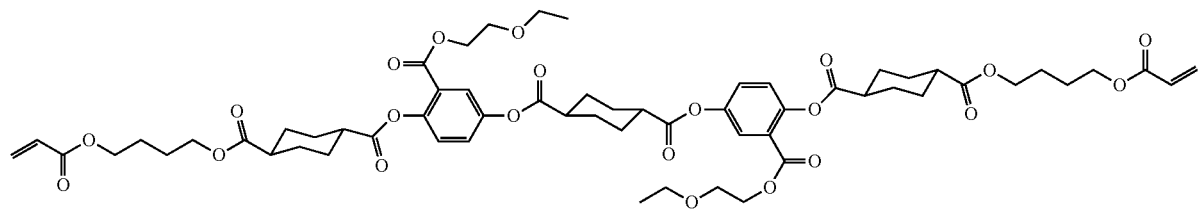
1-4
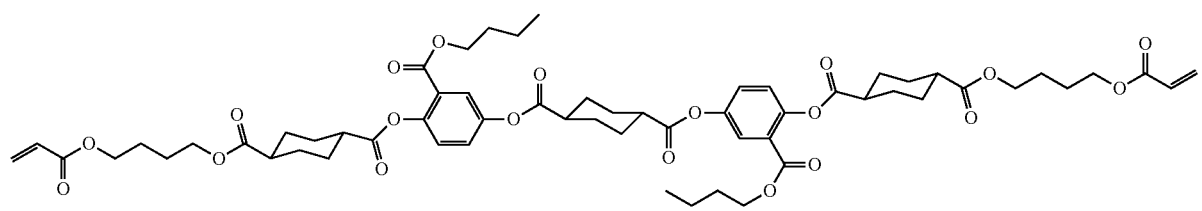
1-5
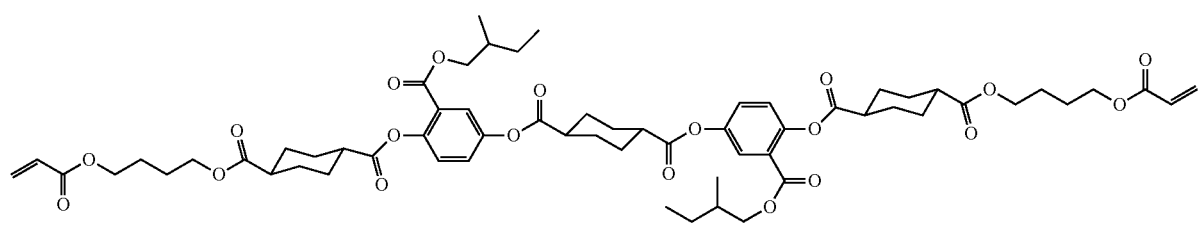
1-6
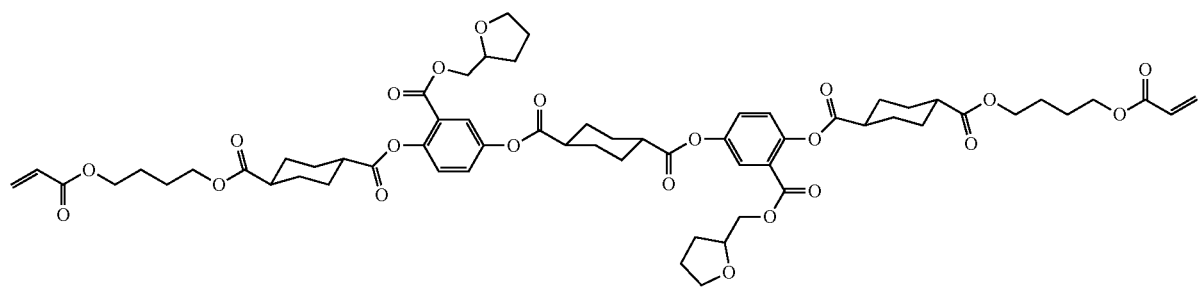
1-7
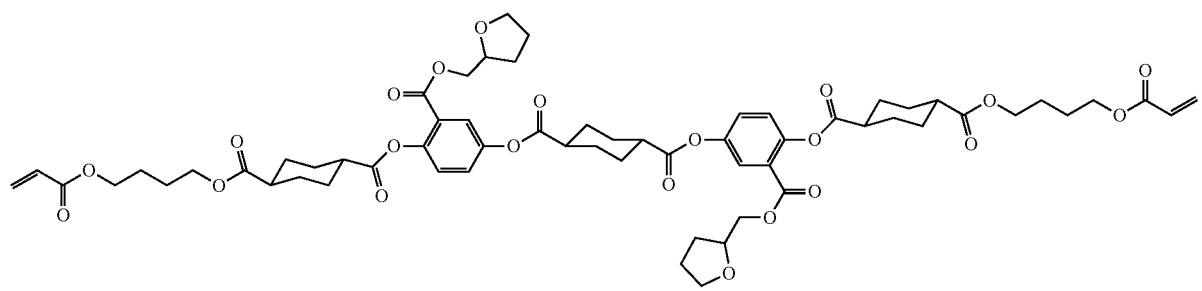
1-8
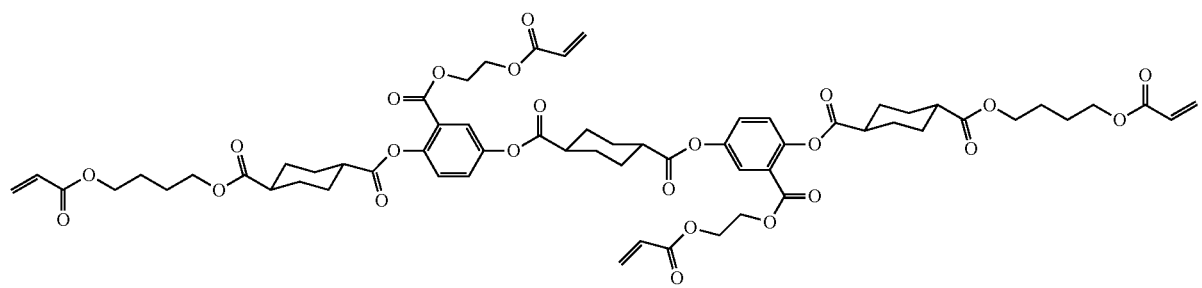

-continued
1-9
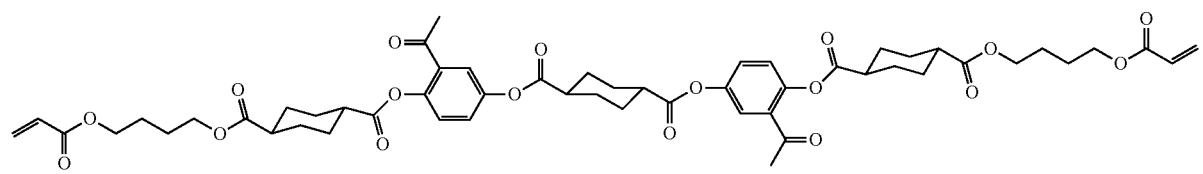
1-10
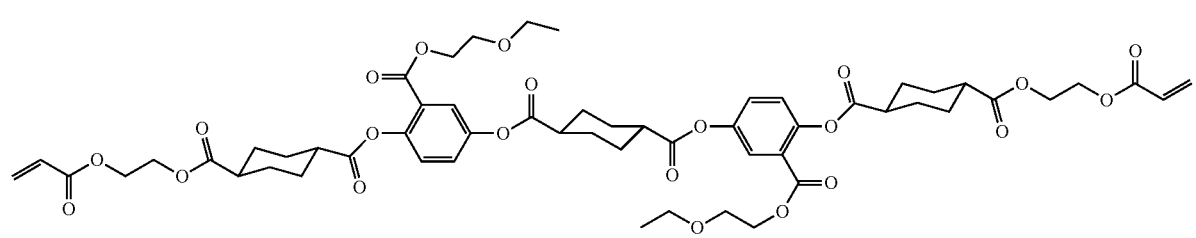
1-11
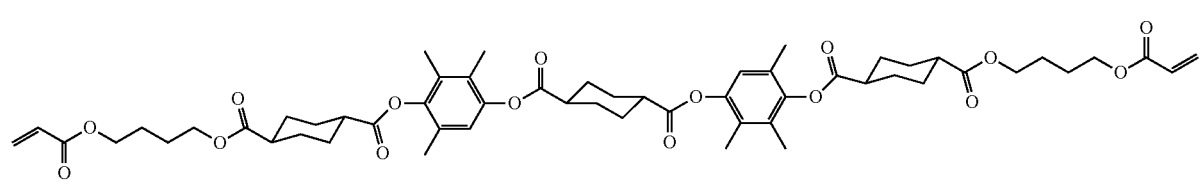
1-12
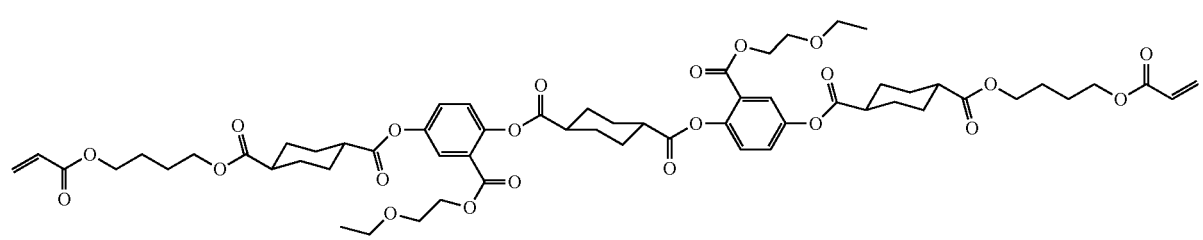
1-13
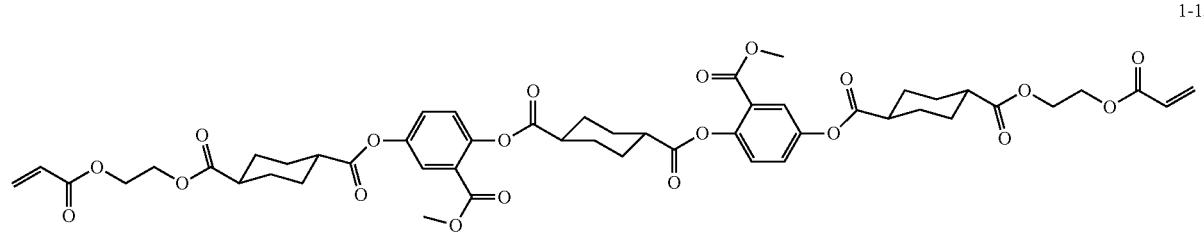
1-14
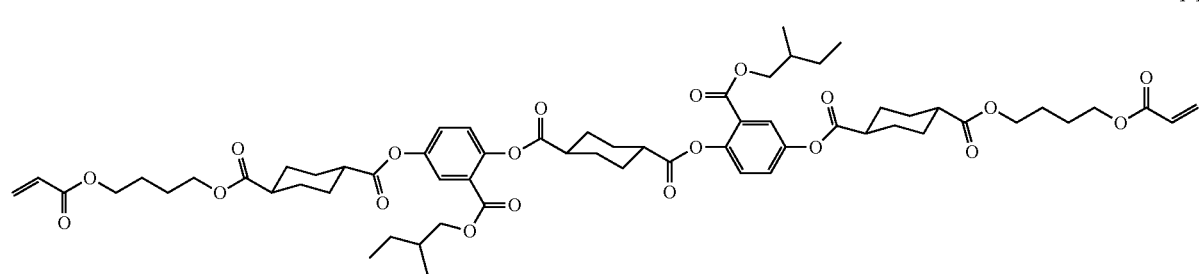
1-15
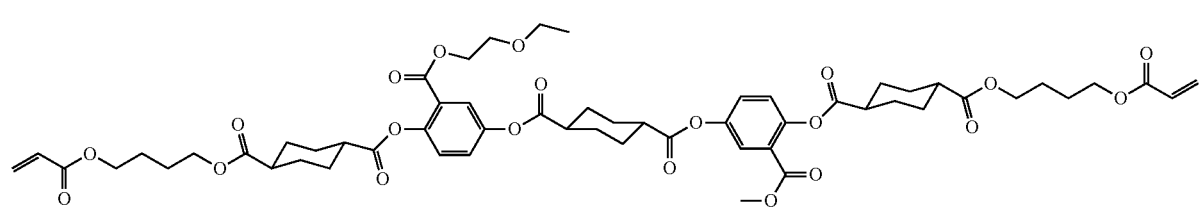

1-16
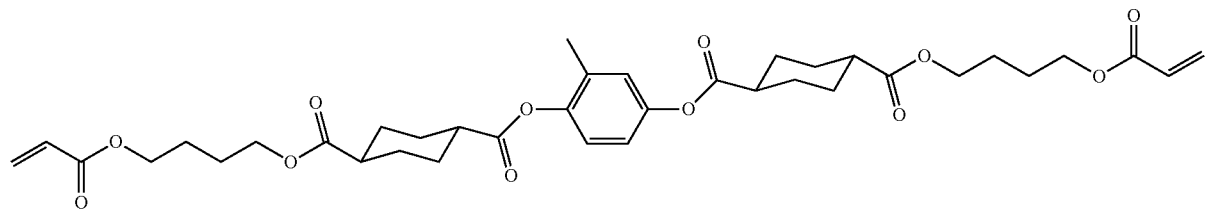
1-17
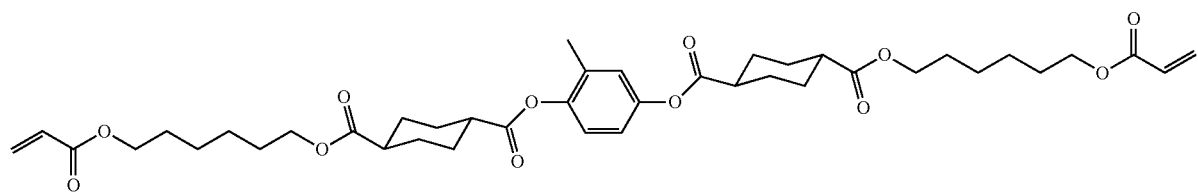
1-18
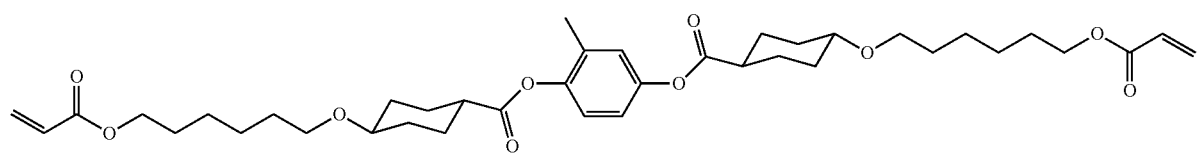
1-19
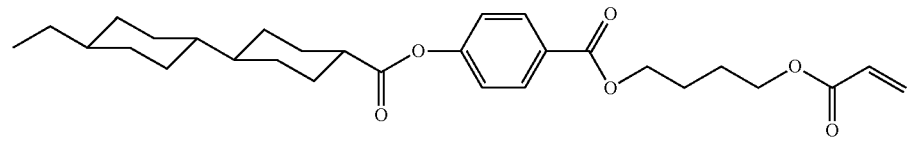
1-20
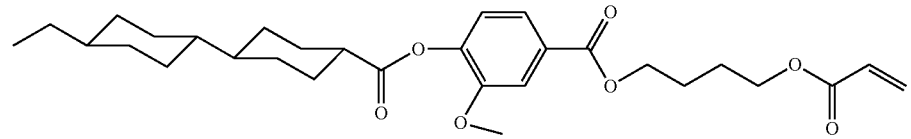
1-21
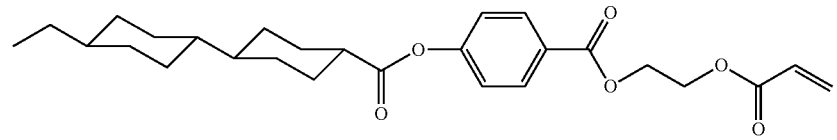
1-22
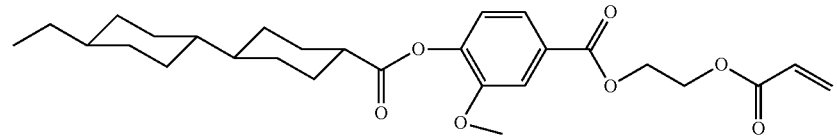
1-23
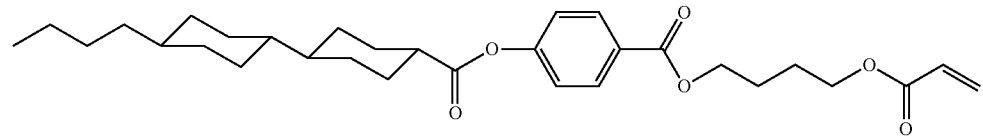
1-24
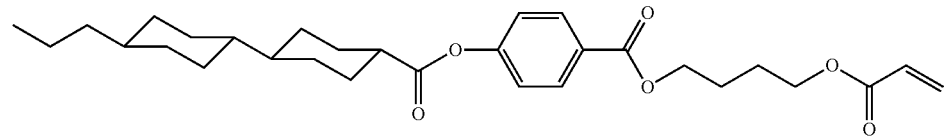

-continued
1-25
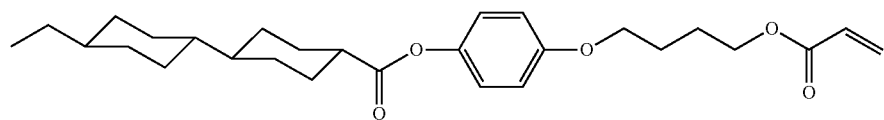
1-26
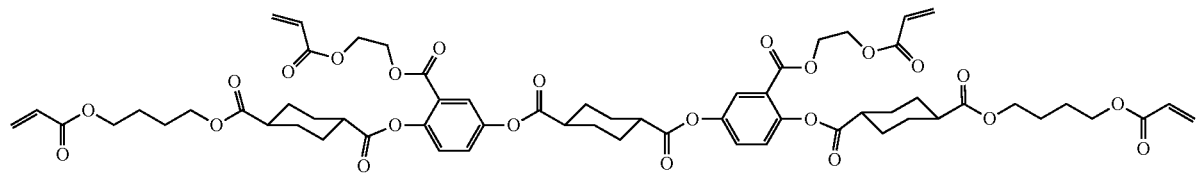
1-27
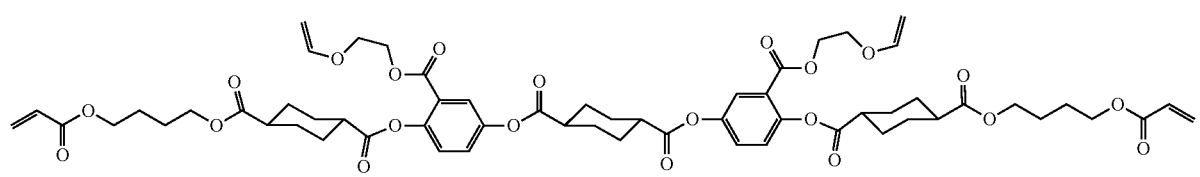
1-28
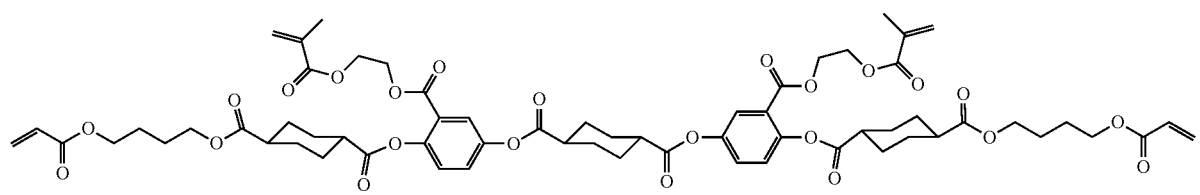
1-29
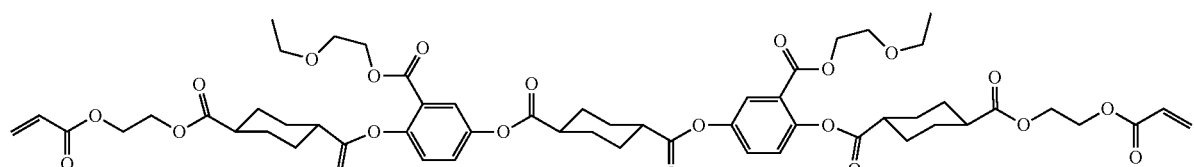
1-30
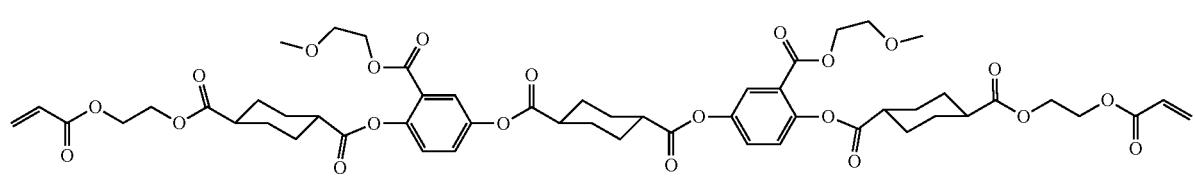
1-31
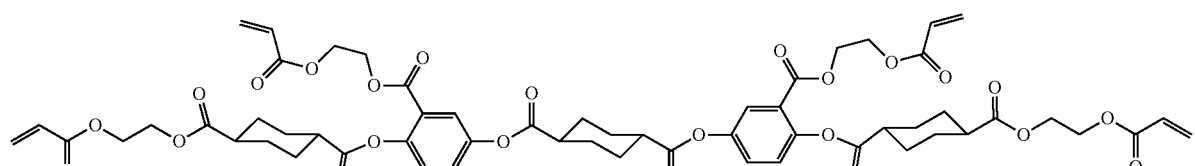
1-32
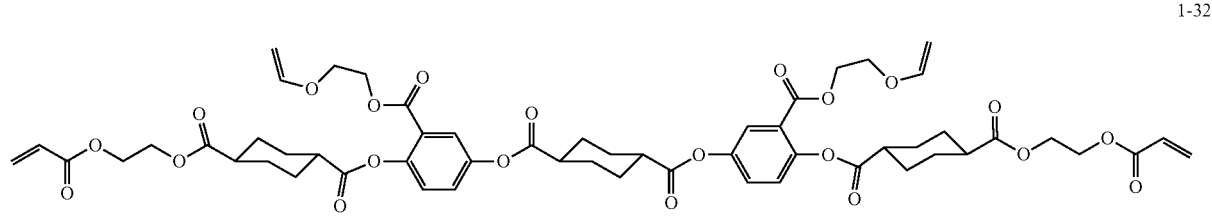

1-33
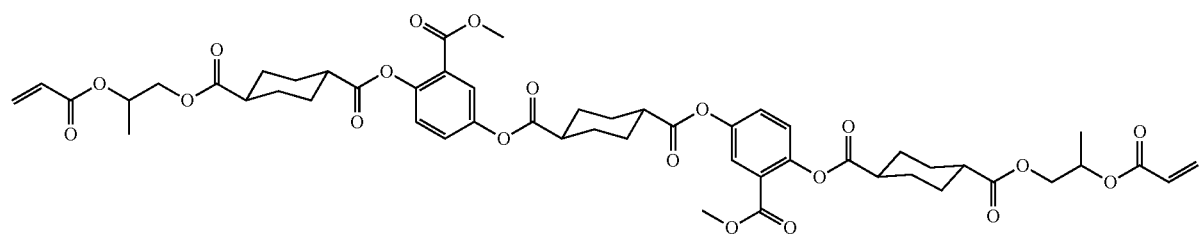
1-34
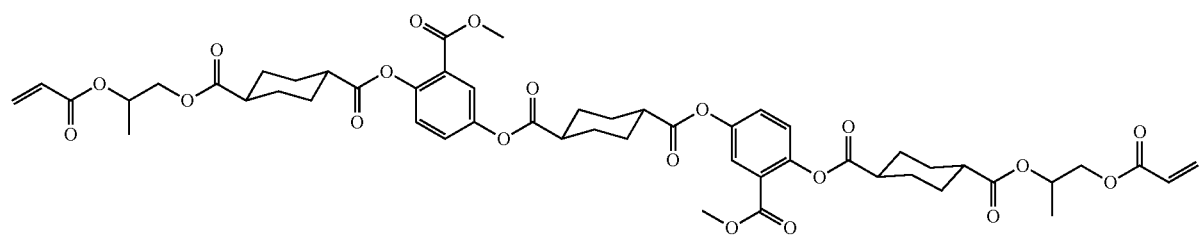
1-35
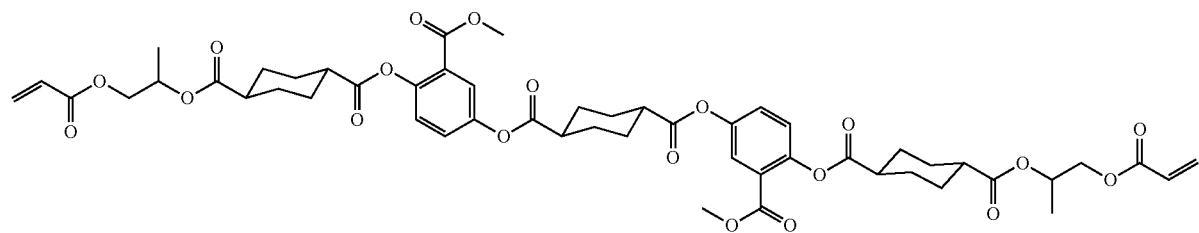
1
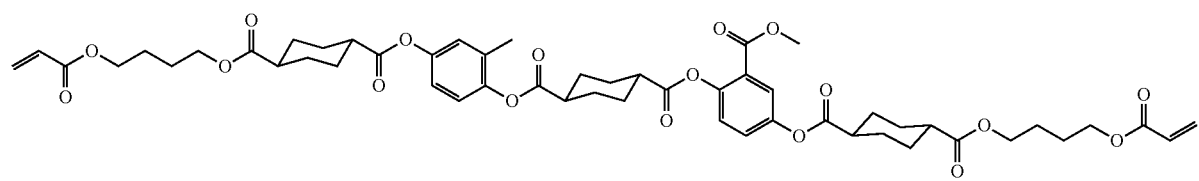
2
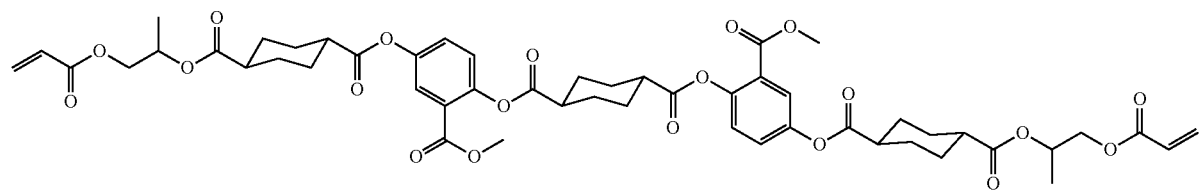
3
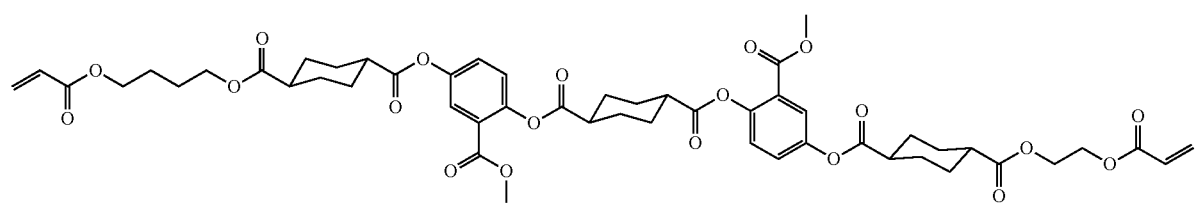
4
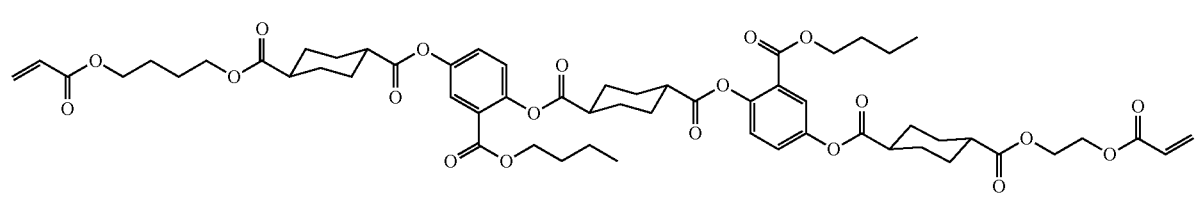

5
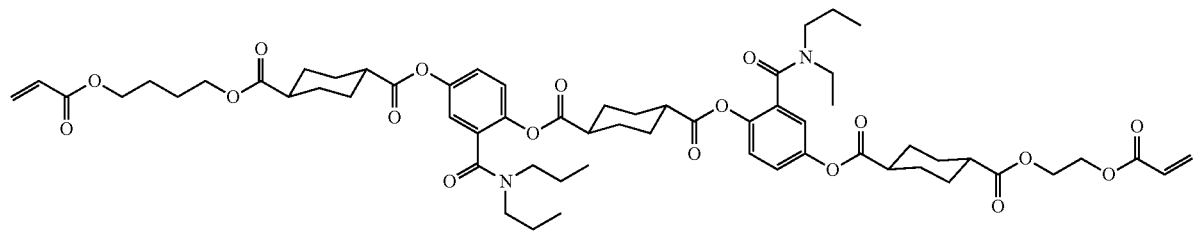
6
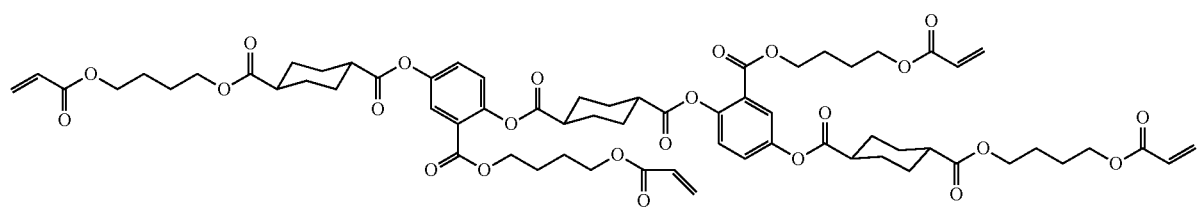
7
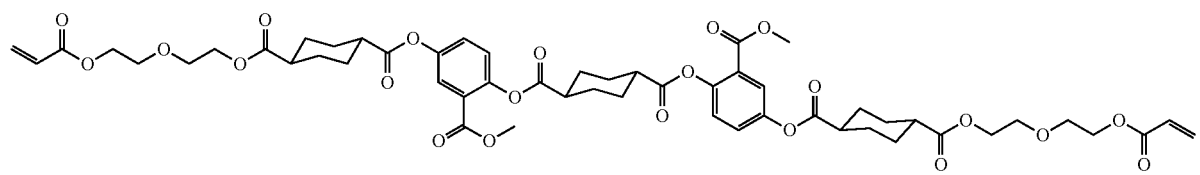
8
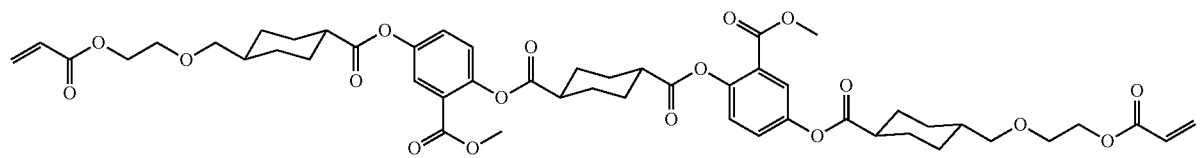
9
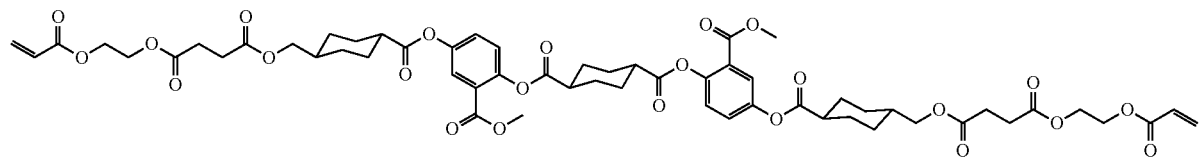
10
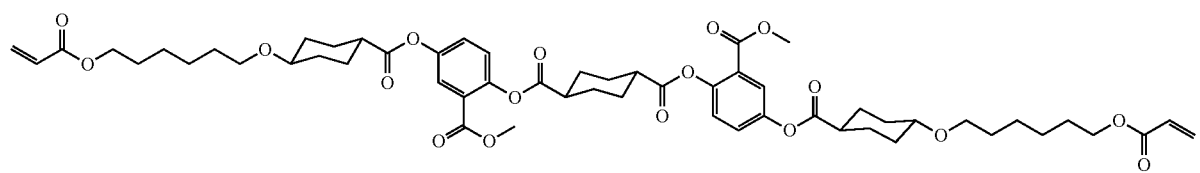
11
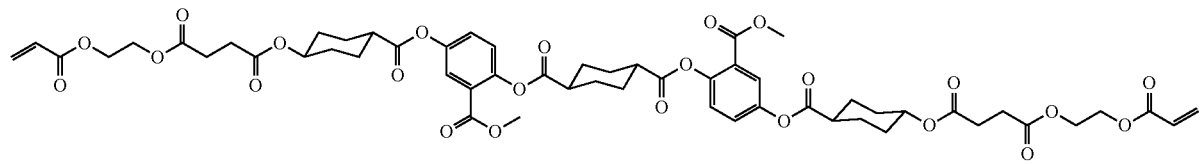

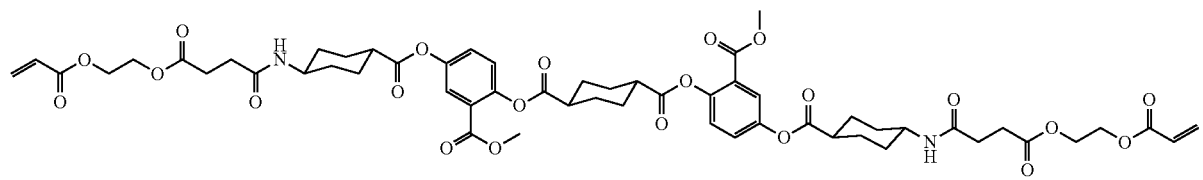
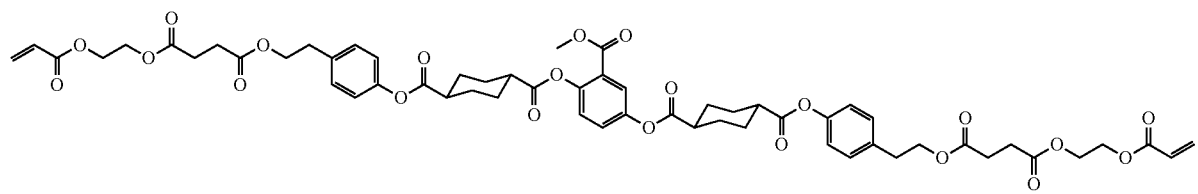
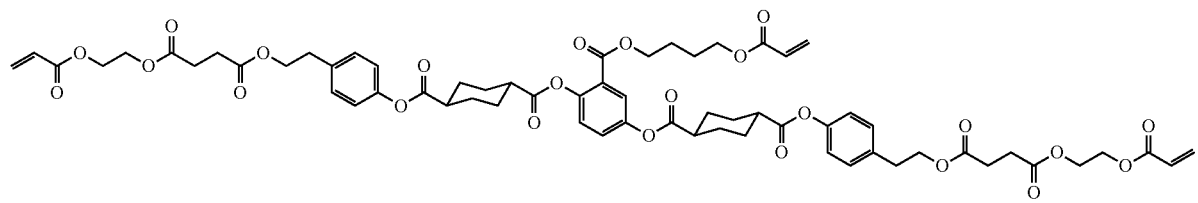
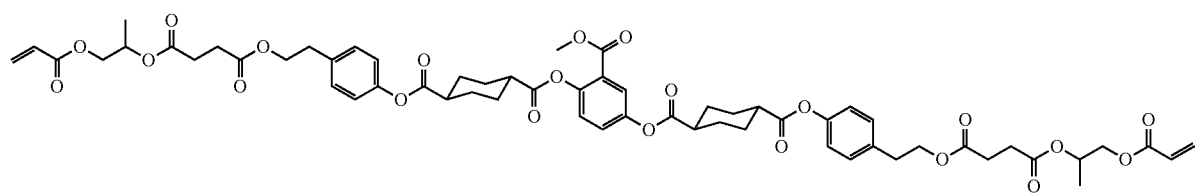
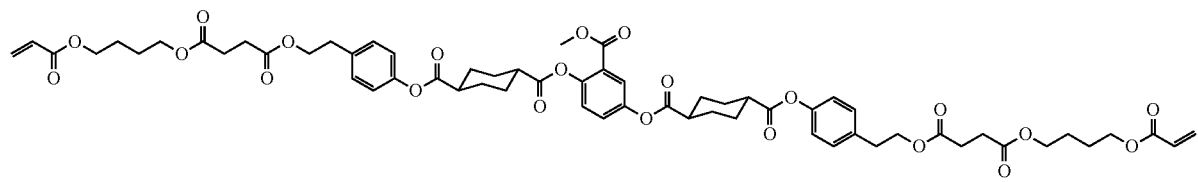
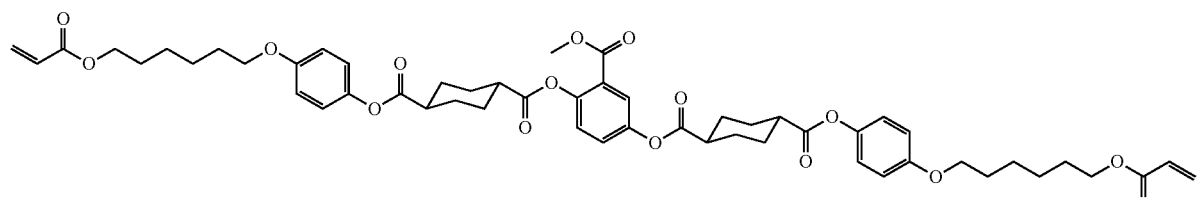
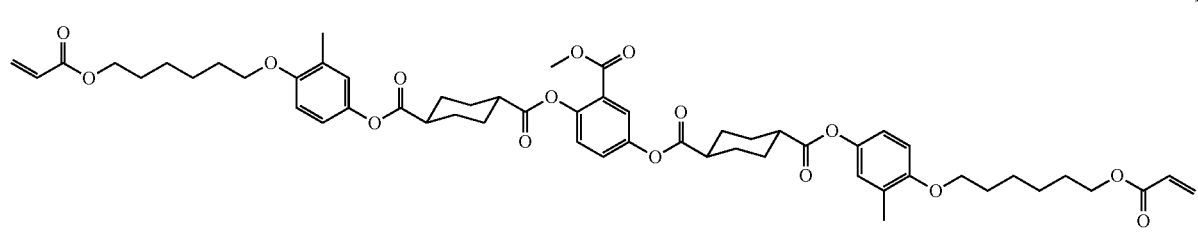

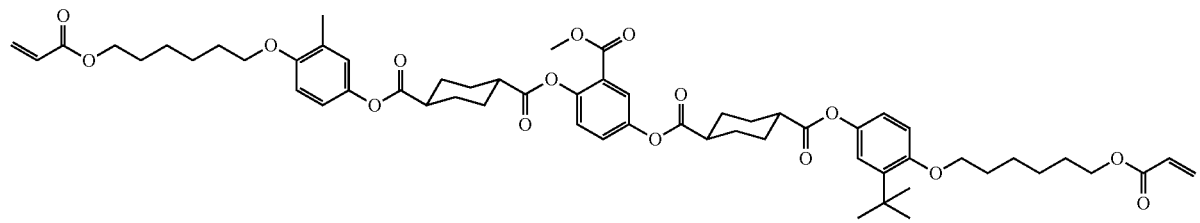
19
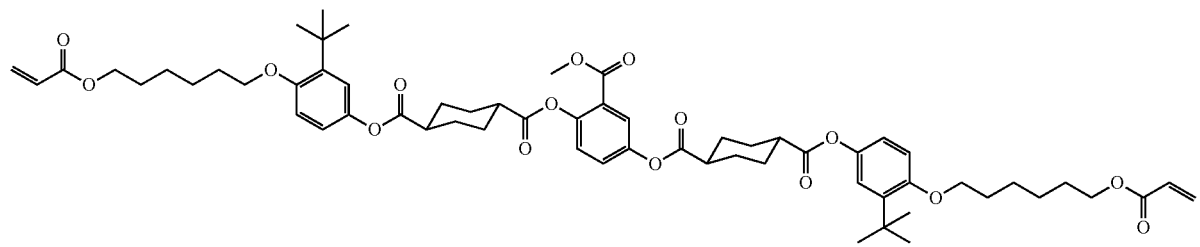
20
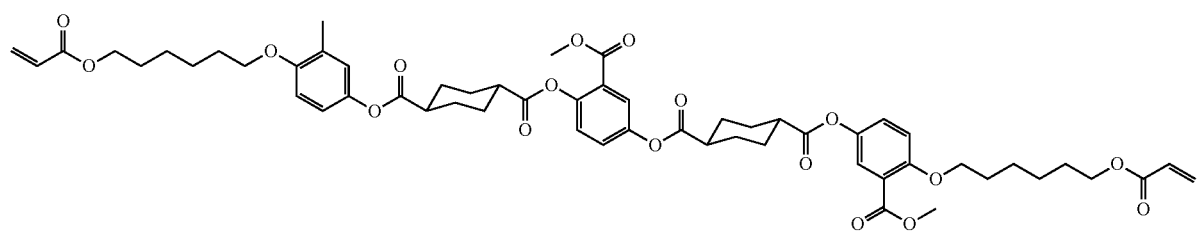
21
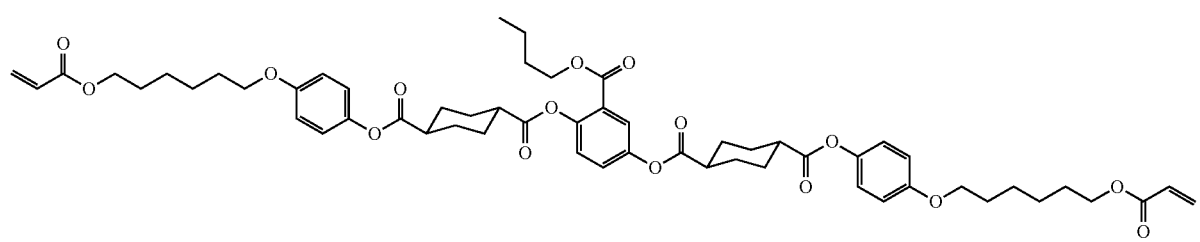
22
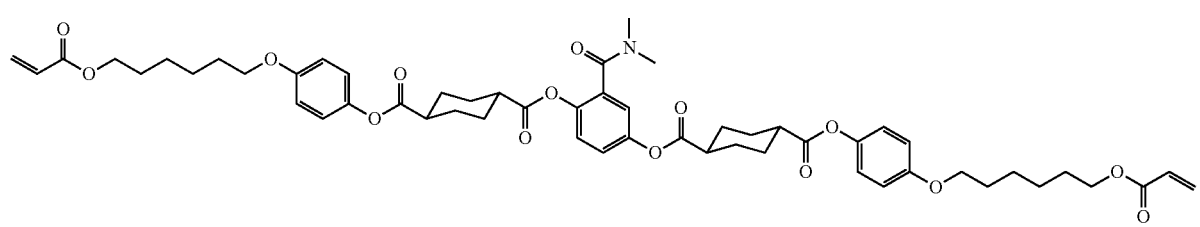
23
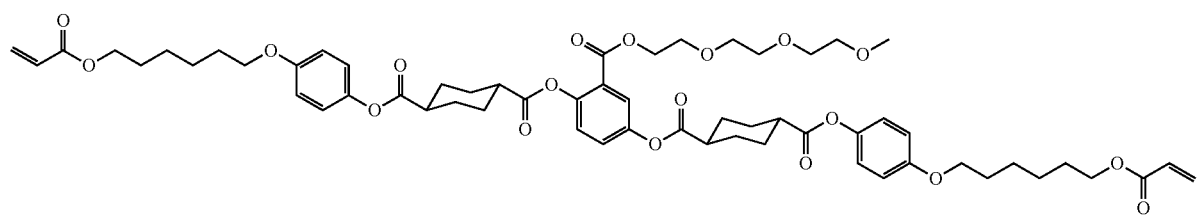
24

-continued
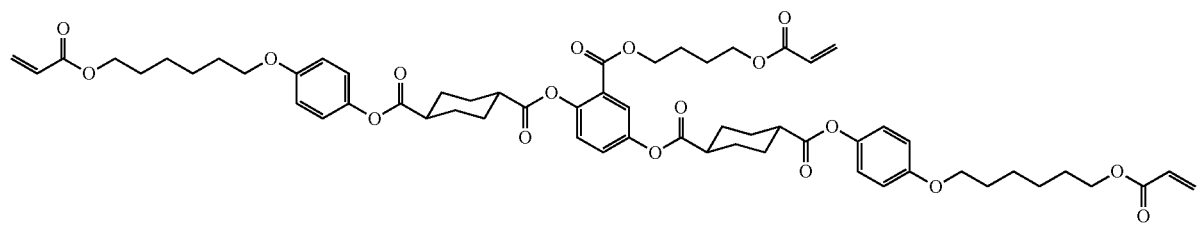
25
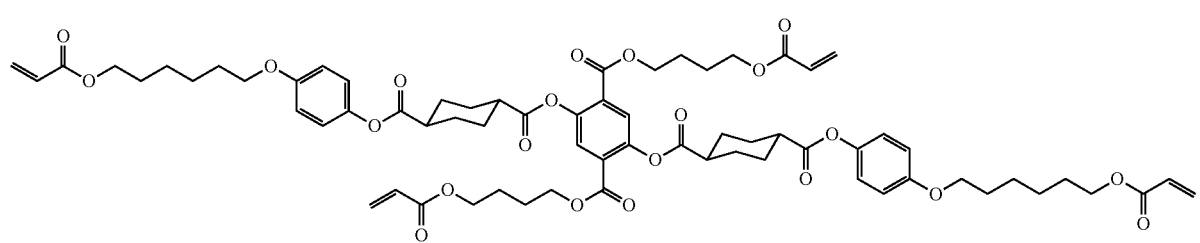
26
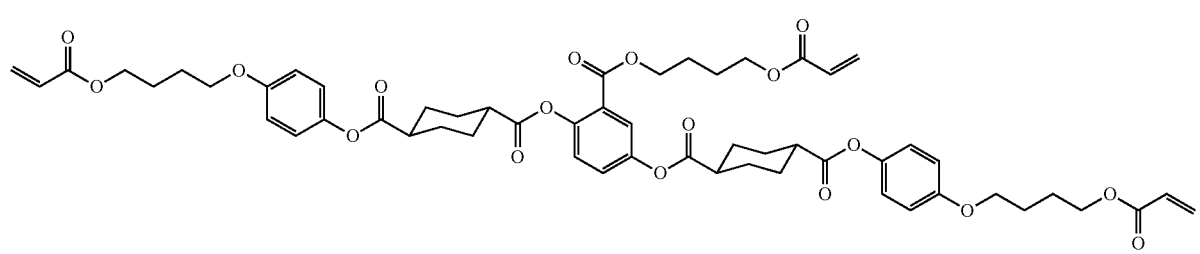
27
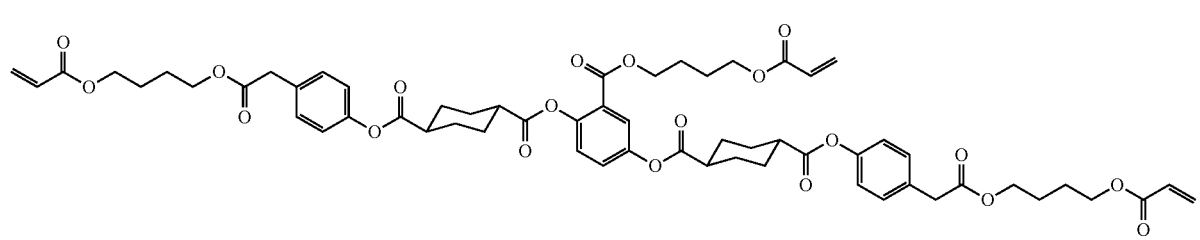
28
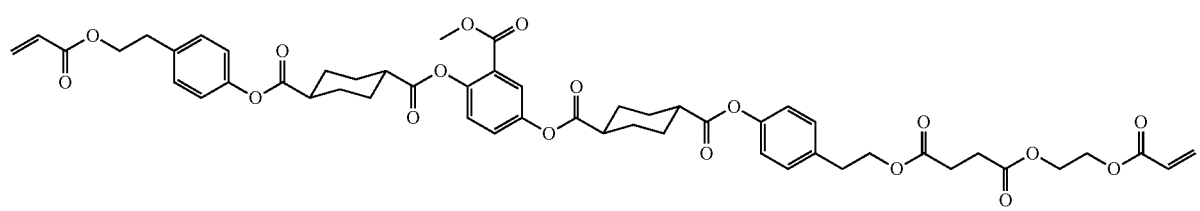
29
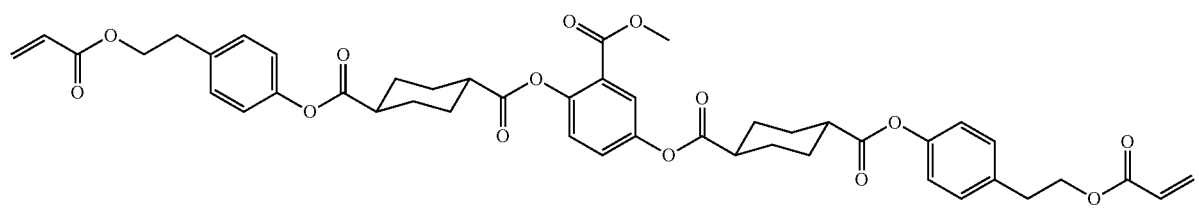
30

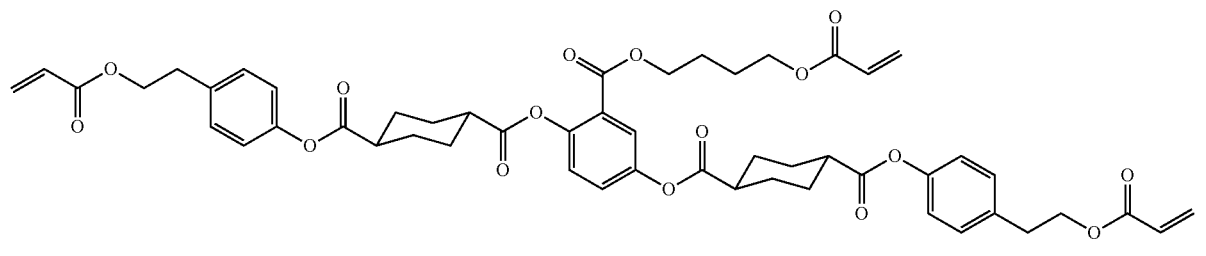
31
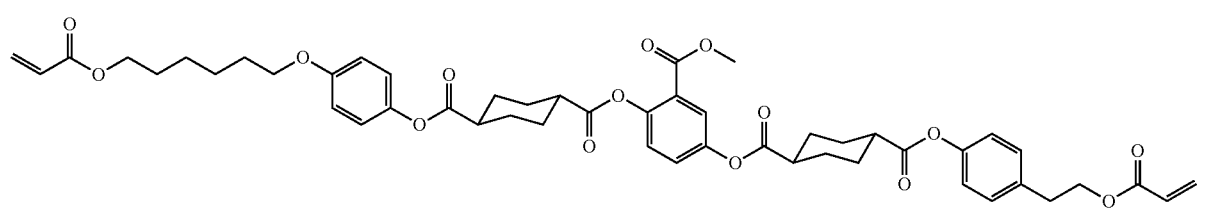
32
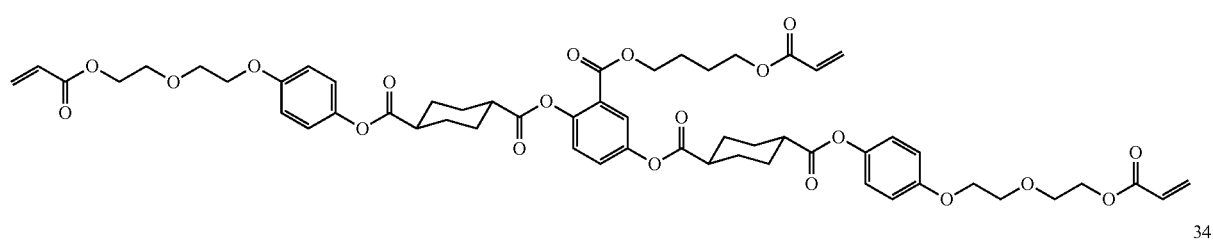
33
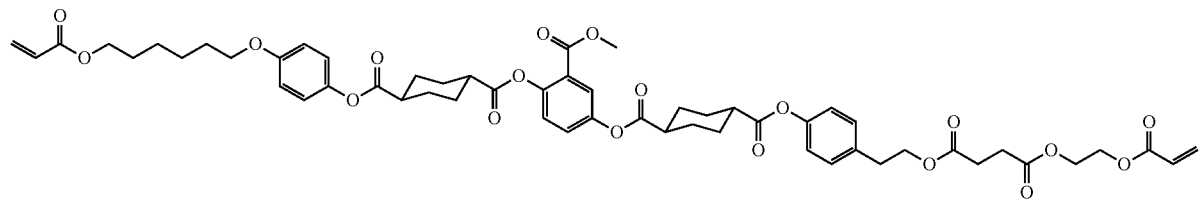
34
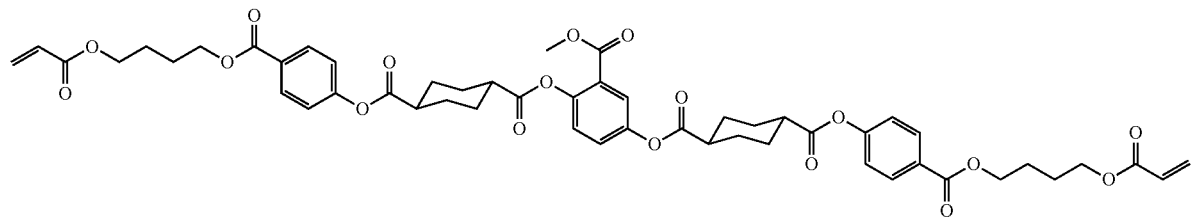
35
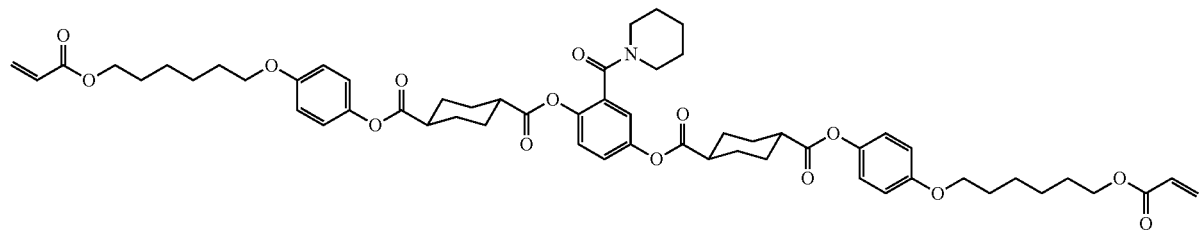
36

I-1-56

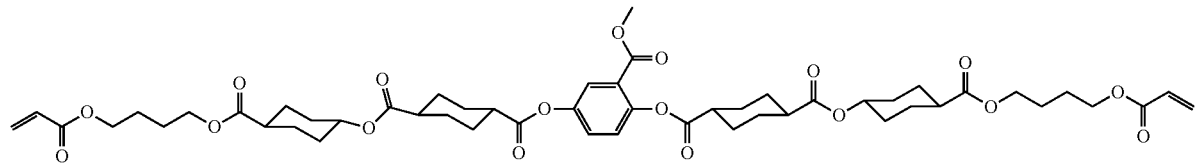

I-1-57

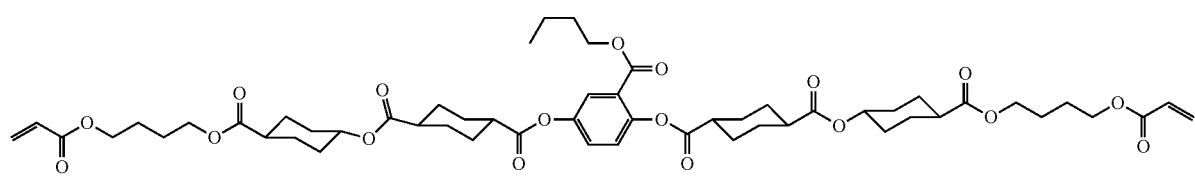

I-1-58

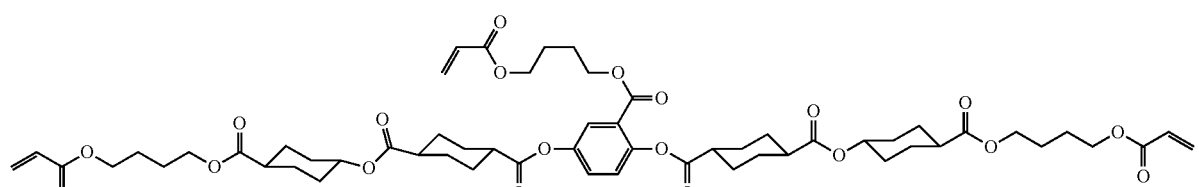

I-1-59

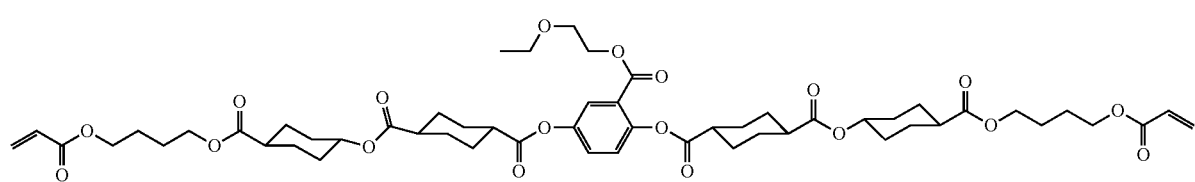

Two or more liquid crystal compounds may be used in combination. For example, two or more liquid crystal compounds represented by Formula (I) may be used in combination.

Among these, it is preferable to use a liquid crystal compound which is a liquid crystal compound represented by Formula (I) and satisfies 0.1<mc<0.3, together with the liquid crystal compound which is a liquid crystal compound represented by Formula (I) and satisfies 0.4≤mc≤0.8.

The following compounds are exemplified as the liquid crystal compound which is a liquid crystal compound represented by Formula (I) and satisfies 0.1<mc<0.3.

2-1

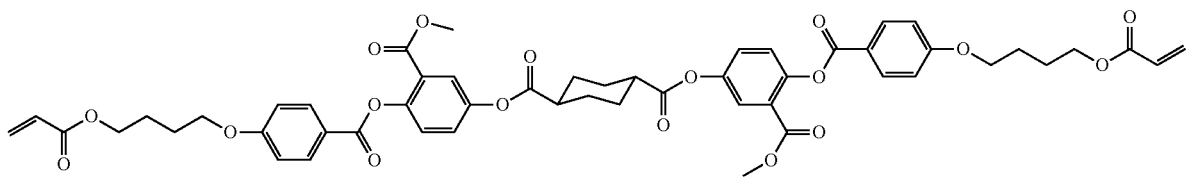

2-2

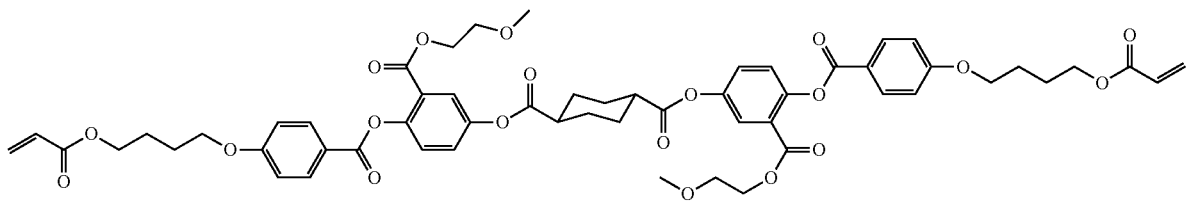

-continued
2-3
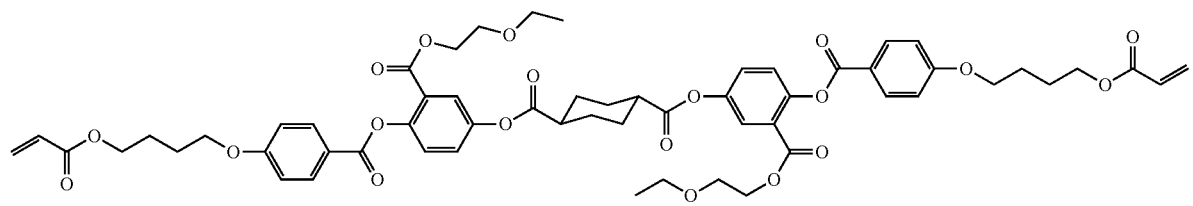
2-4
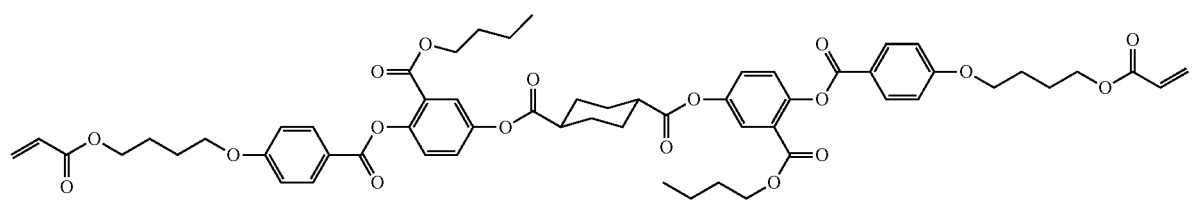
2-5
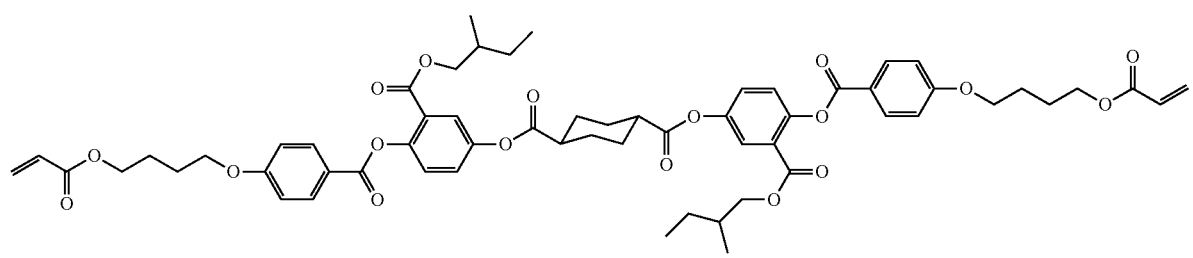
2-6
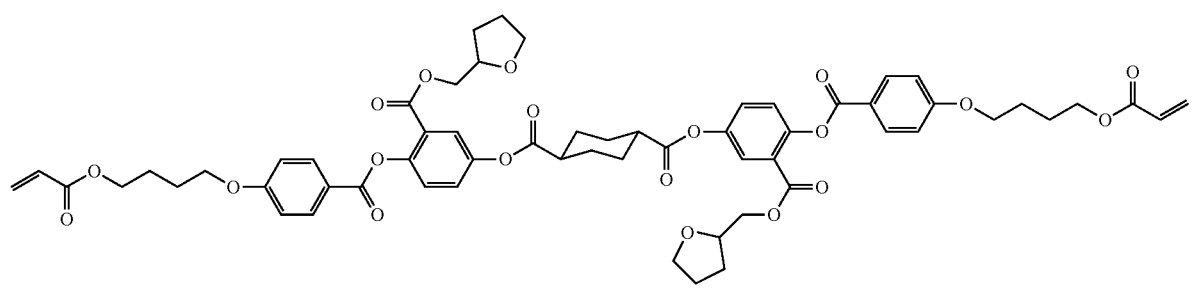
2-7
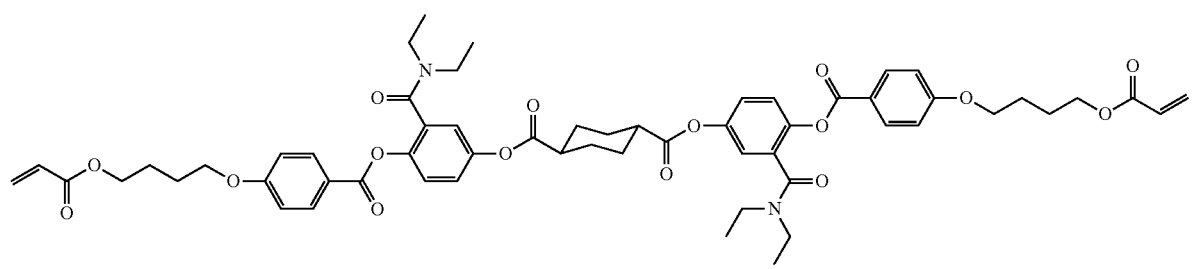
2-8
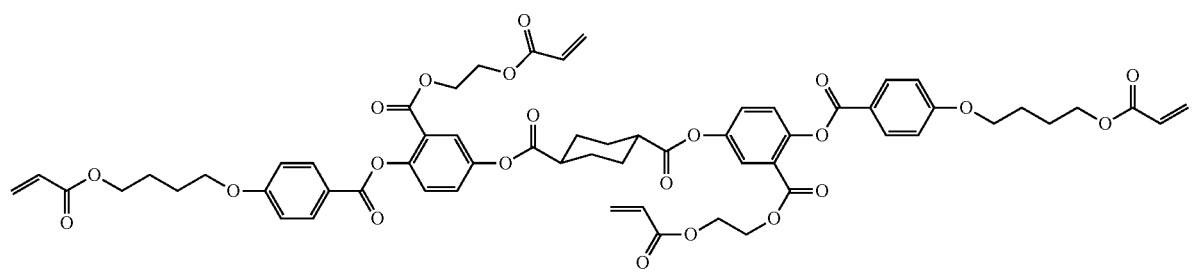

2-9
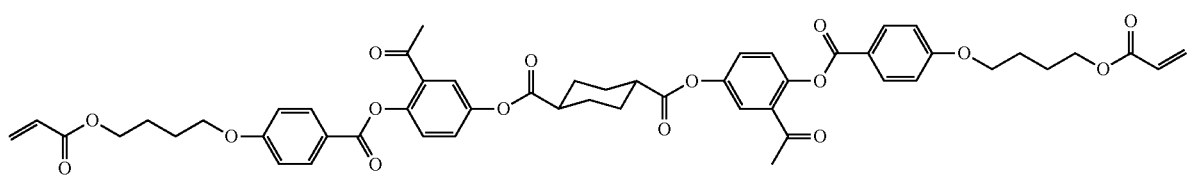
2-10
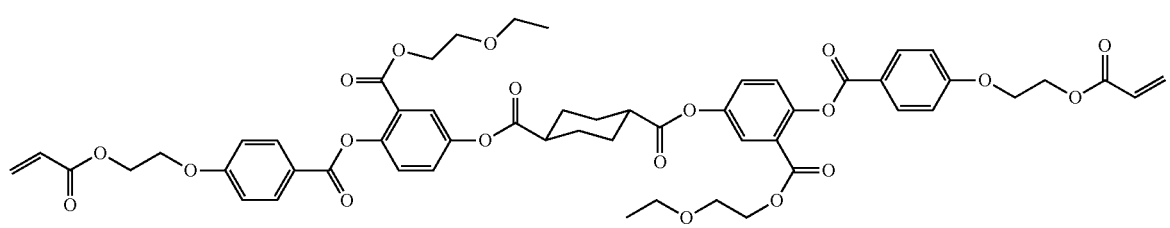
2-11
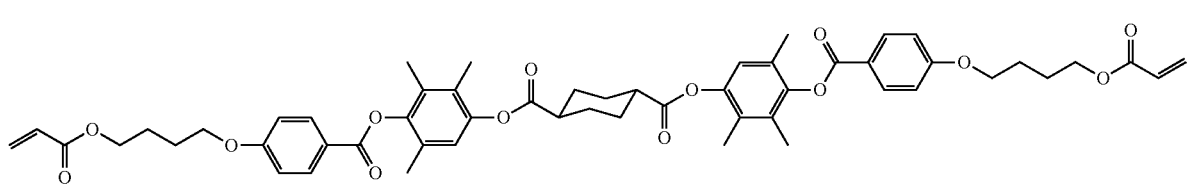
2-12
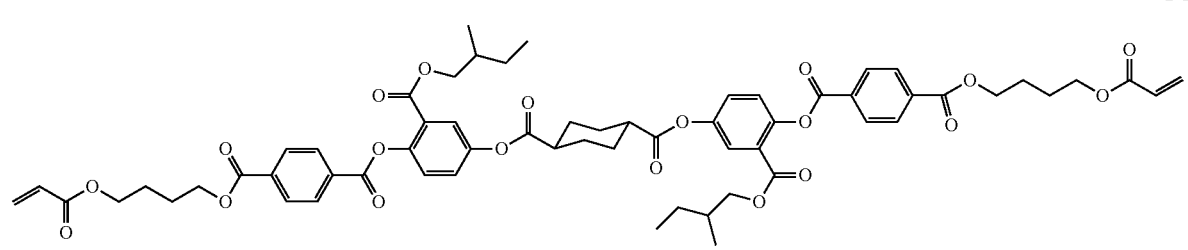
2-13
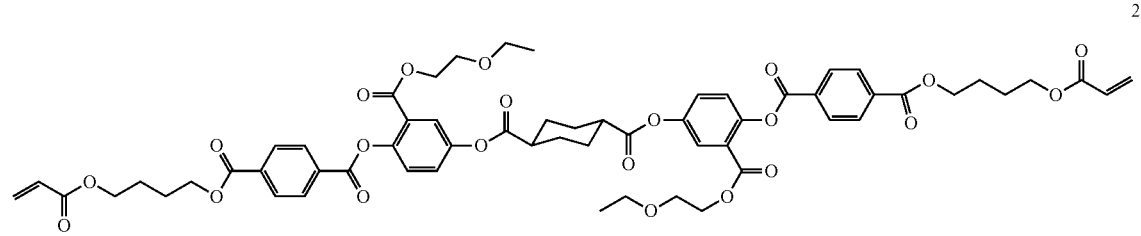
2-14
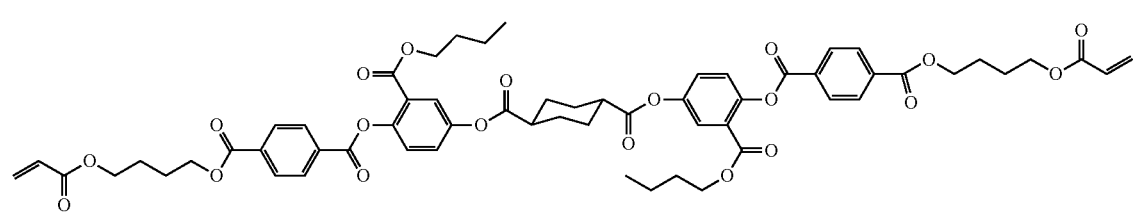
2-15
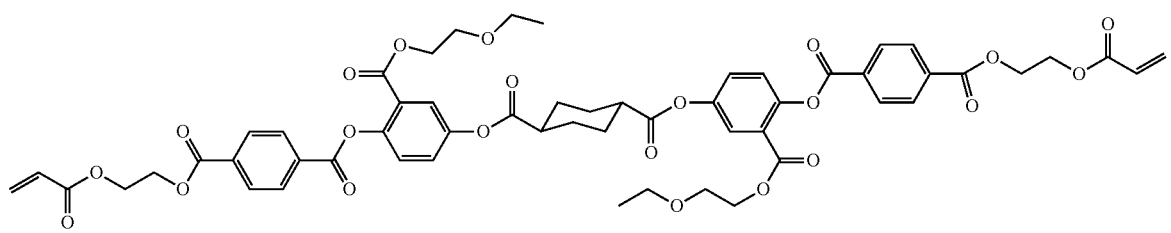

2-16
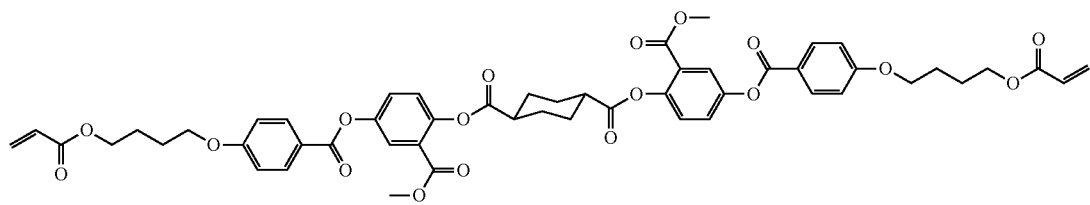
2-17
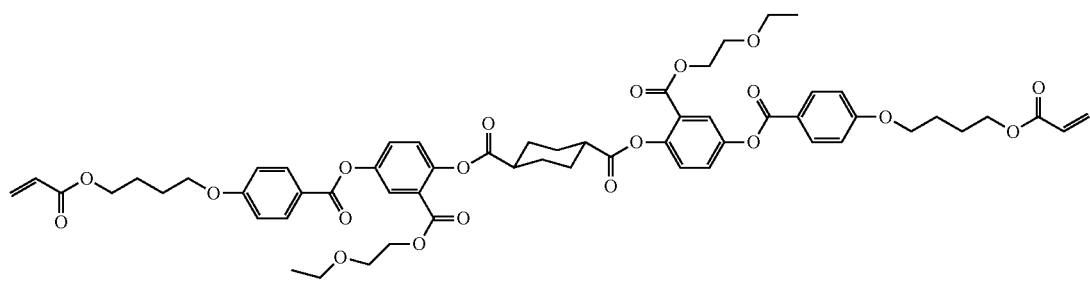
2-18
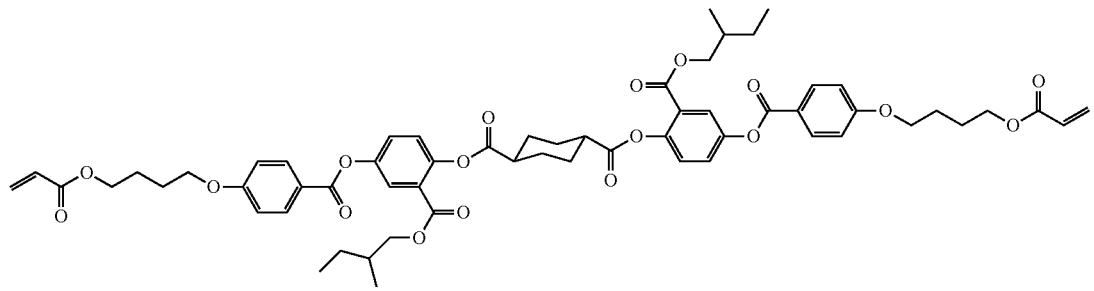
2-19
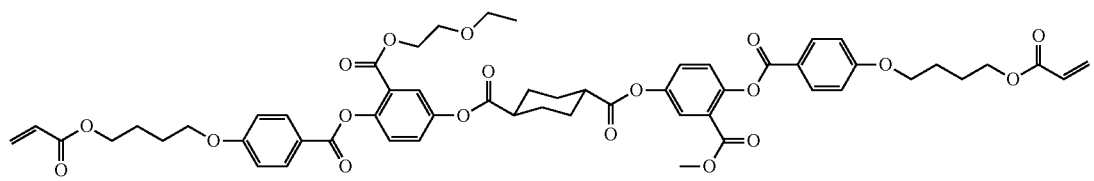
2-20
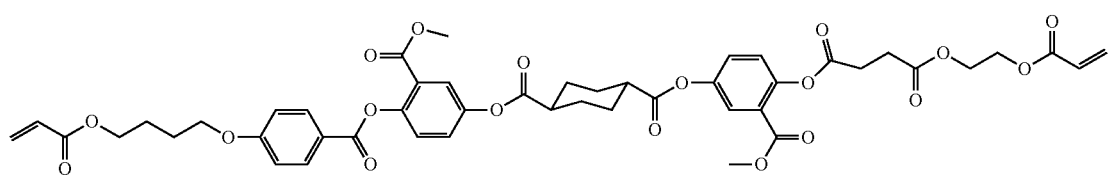
2-21
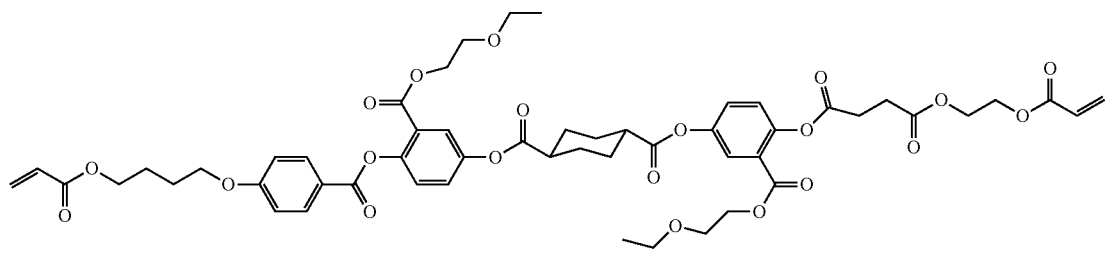
2-22
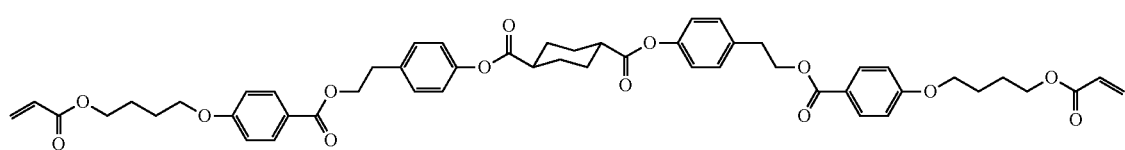

-continued
2-23
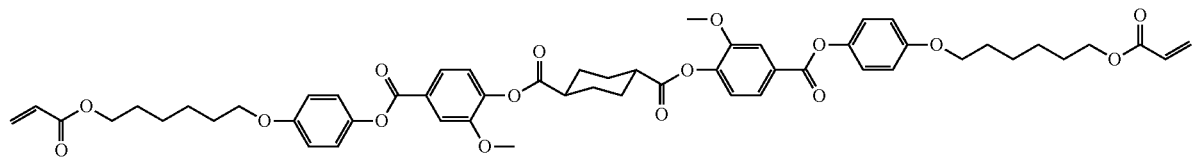
2-24
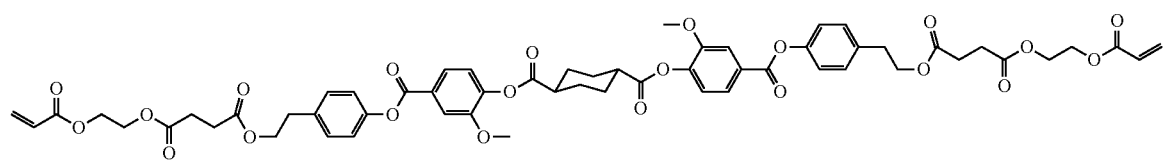
2-28
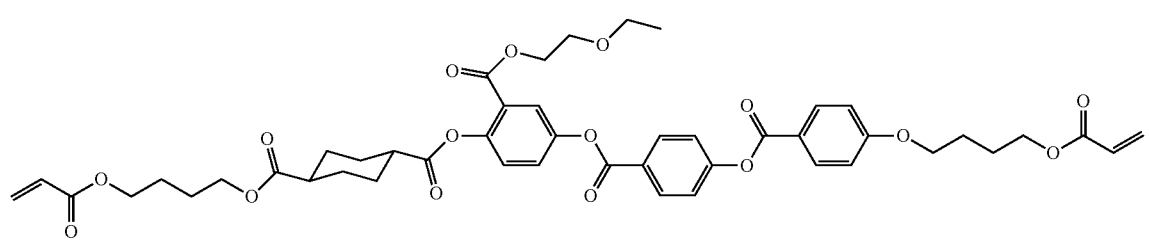
2-29
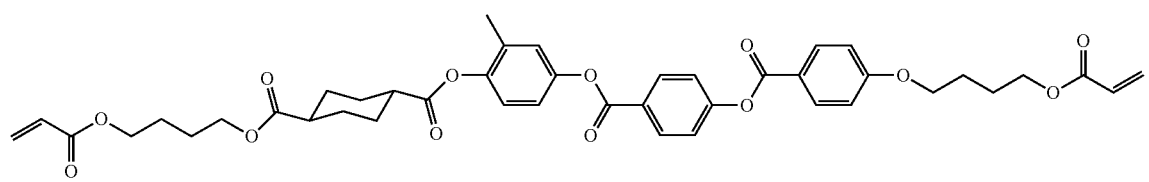
2-30
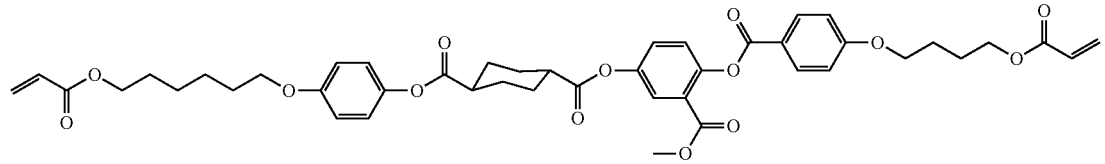
2-31
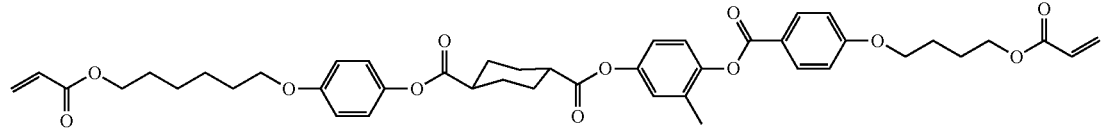
2-32
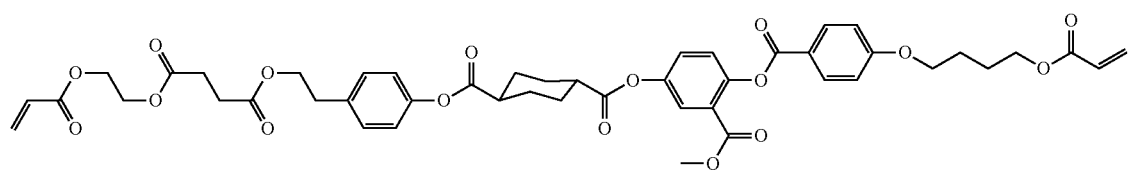
2-33
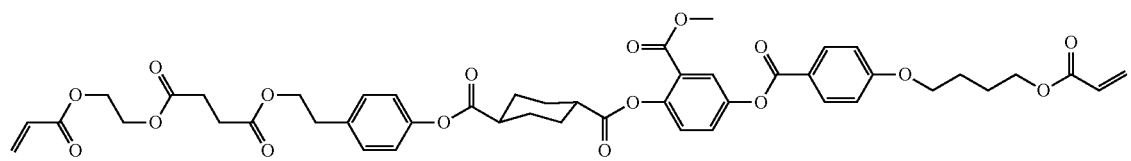

As the liquid crystal compound for use in the present invention, a compound represented by Formula (IV) and described in JP2014-198814A, in particular, a polymerizable liquid crystal compound having one (meth)acrylate group represented by Formula (IV) is also suitably used.

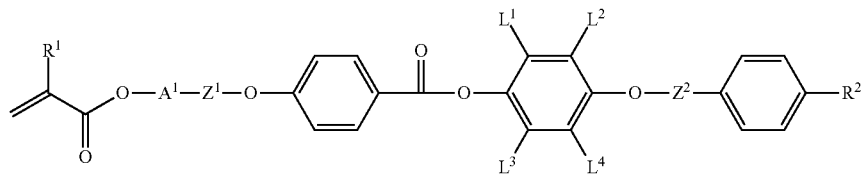

Formula (IV)

In Formula (IV), $A^1$ represents an alkylene group having 2 to 18 carbon atoms, in which one $CH_2$ in the alkylene group or two or more non-adjacent $CH_2$ may be substituted with —O—;

$Z^1$ represents —C(=O)—, —O—C(=O)—, or a single bond;

$Z^2$ represents —C(=O)— or C(=O)—CH=CH—;

$R^1$ represents a hydrogen atom or a methyl group;

$R^2$ represents a hydrogen atom, a halogen atom, a linear alkyl group having 1 to 4 carbon atoms, a methoxy group, an ethoxy group, a phenyl group which may have a substituent, a vinyl group, a formyl group, a nitro group, a cyano group, an acetyl group, an acetoxy group, an N-acetylamide group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to 4 carbon atoms, an N-(2-methacryloyloxyethyl)carbamoyloxy group, an N-(2-acryloyloxyethyl)carbamoyloxy group, or a structure represented by Formula (IV-2); and $L^1$, $L^2$, $L^3$, and $L^4$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^1$, $L^2$, $L^3$, or $L^4$ represents a group other than a hydrogen atom.

—$Z^5$-T-Sp-P    Formula (IV-2)

In Formula (IV-2), P represents an acryloyl group, a methacryl group, or a hydrogen atom, and $Z^5$ represents a single bond, C(=O)O—, —OC(=O)—, —C(=O)NR$^1$— (where $R^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent, in which one $CH_2$ in the aliphatic group or two or more non-adjacent $CH_2$ may be substituted with —O—, —S—, —OC(=O)—, —C(=O)O—, or OC(=O)O—.

The compound represented by Formula (IV) is preferably a compound represented by Formula (V).

In Formula (V), n1 represents an integer of 3 to 6;

$R^{11}$ represents a hydrogen atom or a methyl group;

$Z^{12}$ represents —C(=O)— or C(=O)—CH=CH—; and $R^{12}$ represents a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).

—$Z^{51}$-T-Sp-P    Formula (IV-3)

In Formula (IV-3), P represents an acryloyl group or a methacryl group;

$Z^{51}$ represents —C(=O)O— or —OC(=O)—; T represents 1,4-phenylene; and

Sp represents a divalent aliphatic group having 2 to 6 carbon atoms which may have a substituent. One $CH_2$ in this aliphatic group or two or more non-adjacent $CH_2$ may be substituted with —O—, —OC(=O)—, —C(=O)O—, or OC(=O)O—.

n1 represents an integer of 3 to 6, preferably 3 or 4.

$Z^{12}$ represents —C(=O)— or C(=O)—CH=CH— and preferably represents —C(=O)—.

$R^{12}$ is a hydrogen atom, a linear alkyl group having 1 to 4 carbon atoms, a methoxy group, an ethoxy group, a phenyl group, an acryloylamino group, a methacryloylamino group, an allyloxy group, or a group represented by Formula (IV-3), preferably represents a methyl group, an ethyl group, a propyl group, a methoxy group, an ethoxy group, a phenyl group, an acryloylamino group, a methacryloylamino group, or a group represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

Specific examples of the compound represented by Formula (IV) are shown below. However, in the present invention, the compound represented by Formula (IV) is not limited thereto.

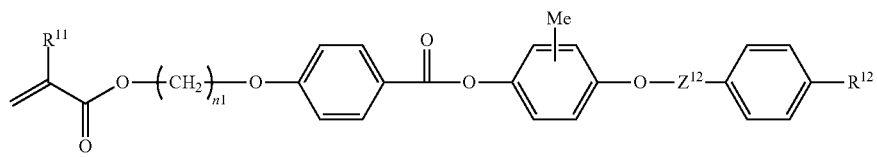

Formula (V)

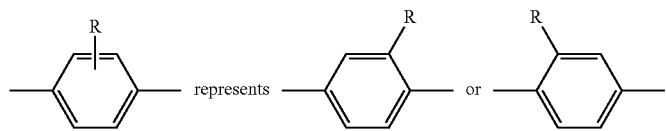
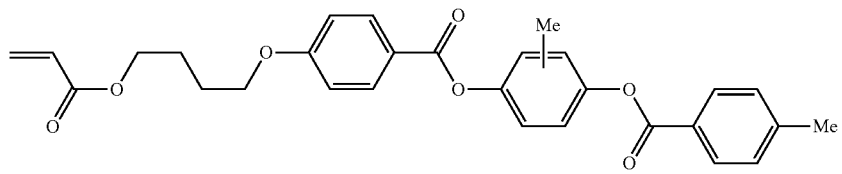
(1)
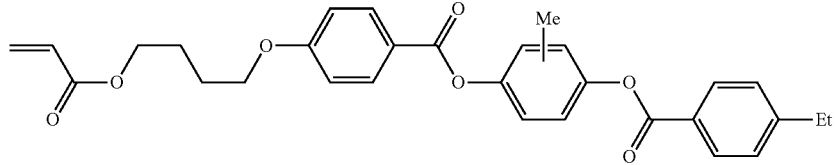
(2)
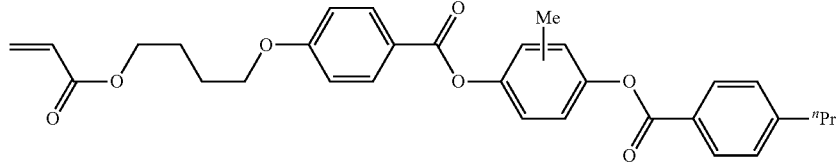
(3)
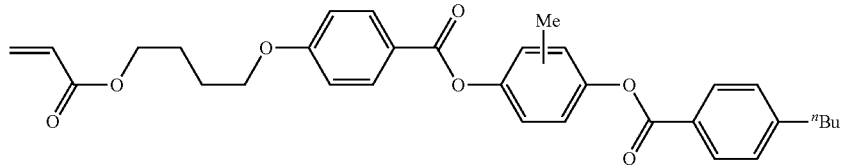
(4)
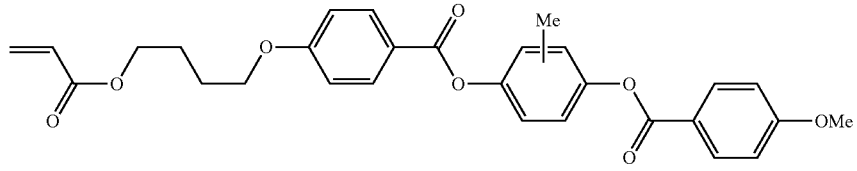
(5)
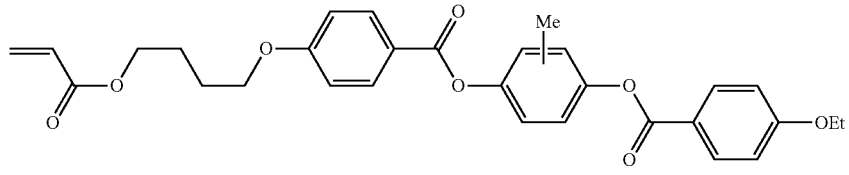
(6)
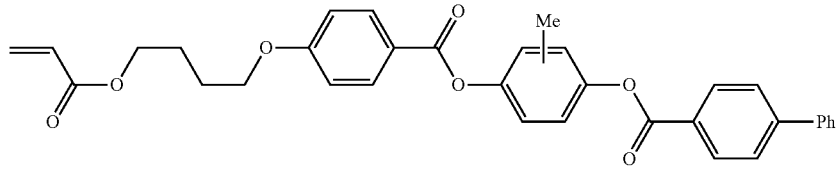
(7)
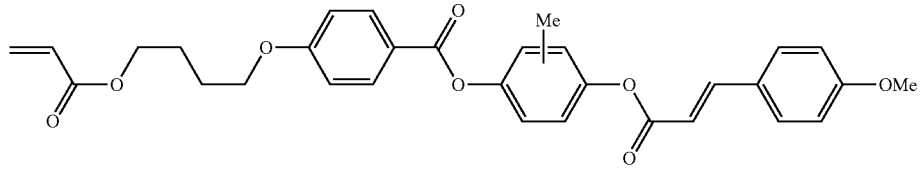
(8)

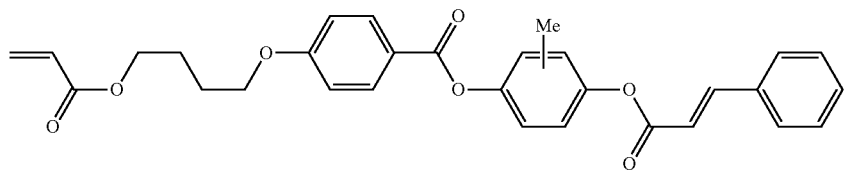
(9)
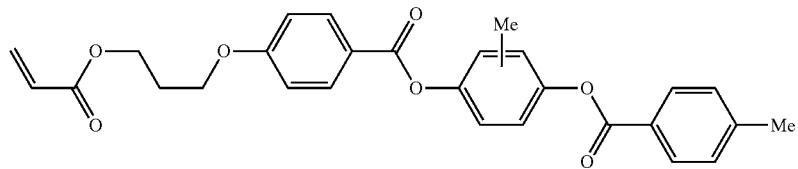
(1A)
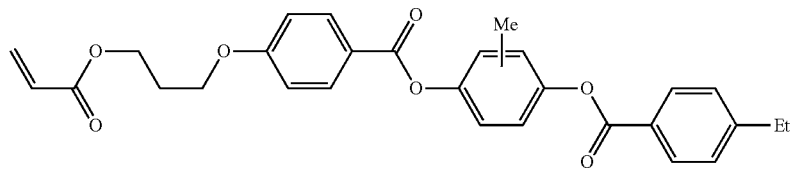
(2A)
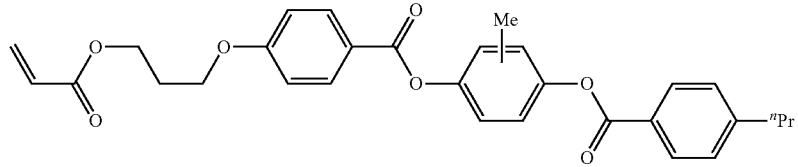
(3A)
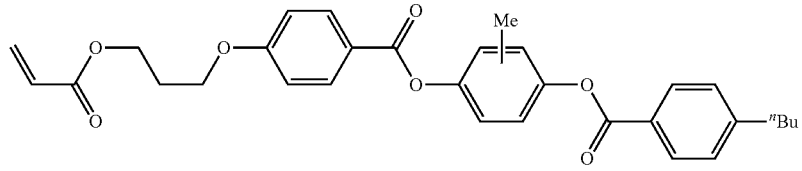
(4A)
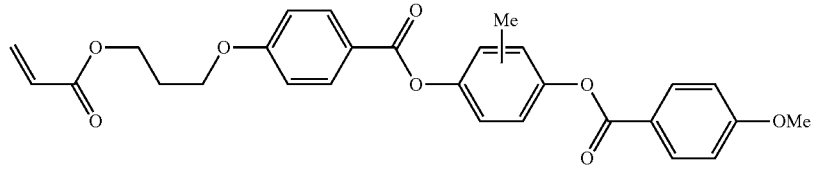
(5A)
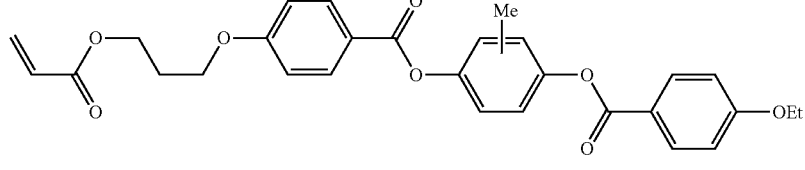
(6A)
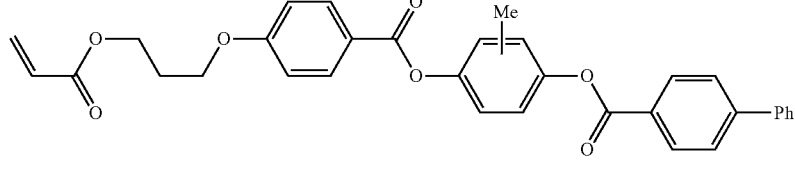
(7A)
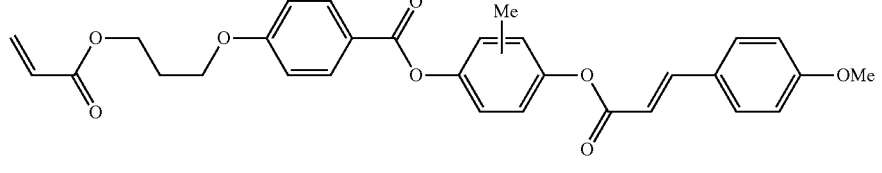
(8A)

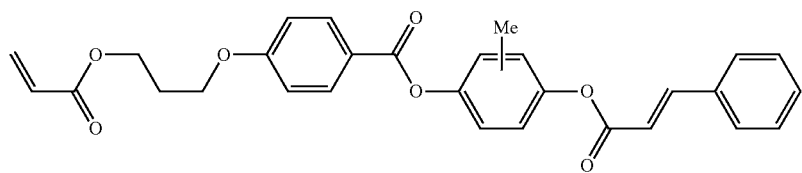 (9A)
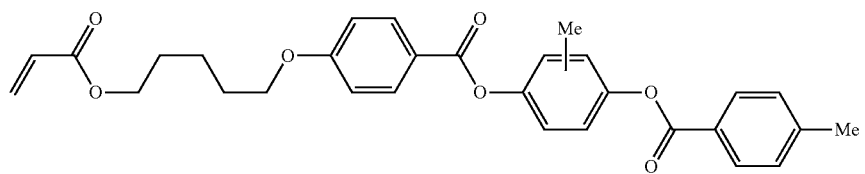 (1B)
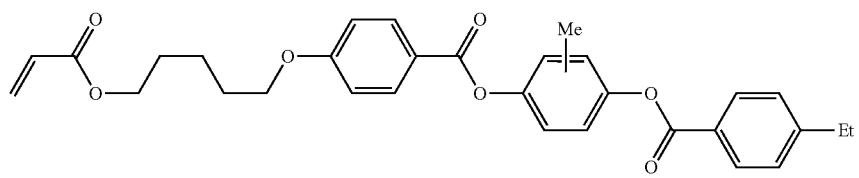 (2B)
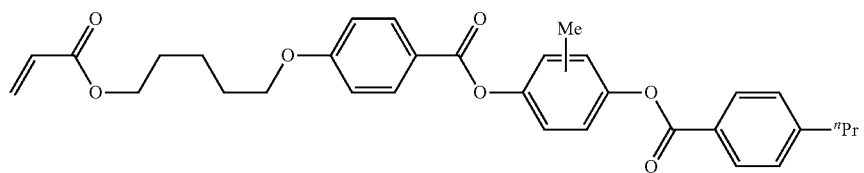 (3B)
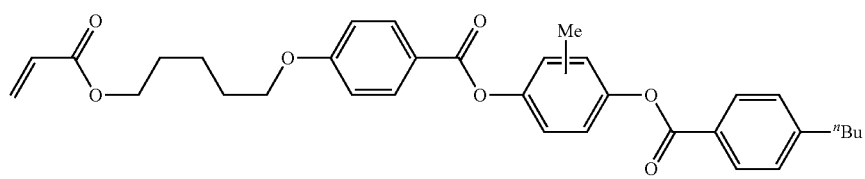 (4B)
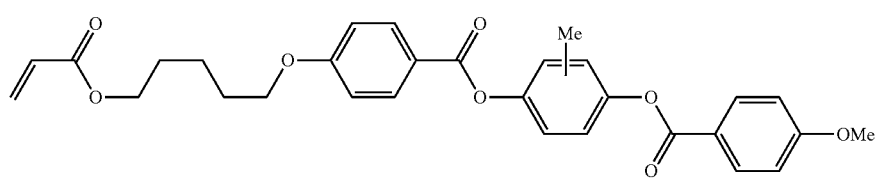 (5B)
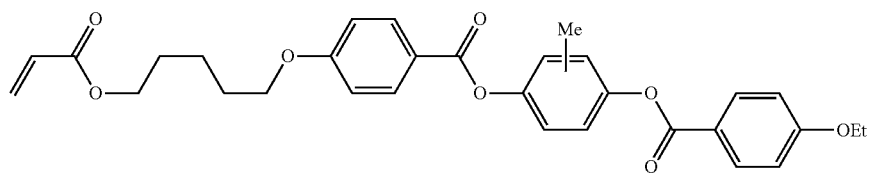 (6B)
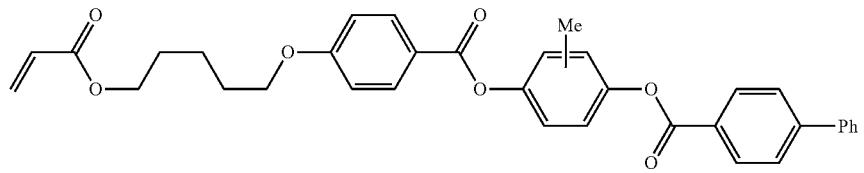 (7B)

-continued
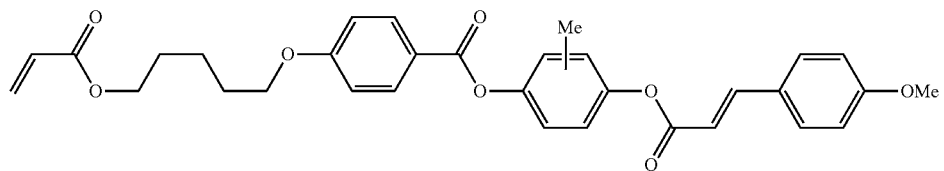
(8B)
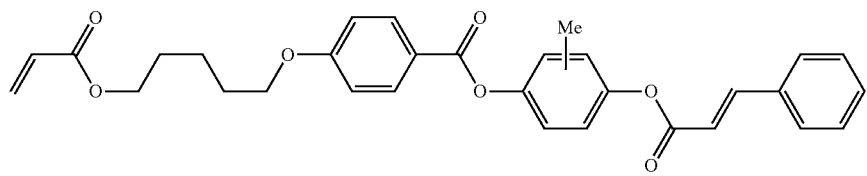
(9B)
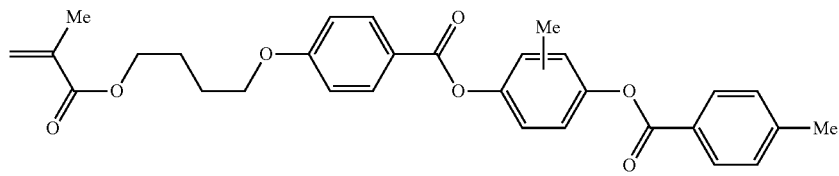
(1C)
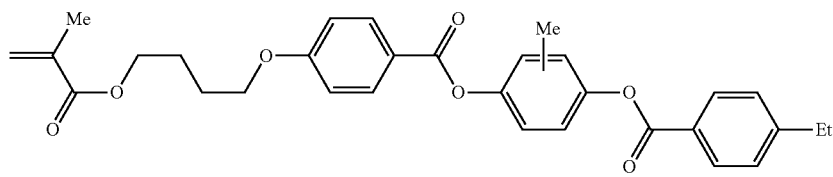
(2C)
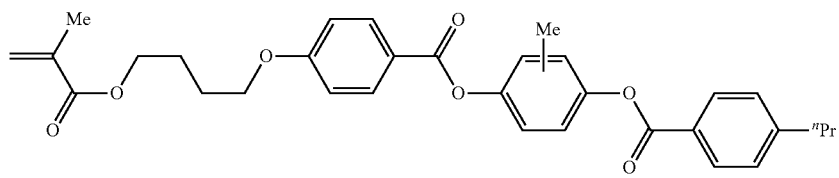
(3C)
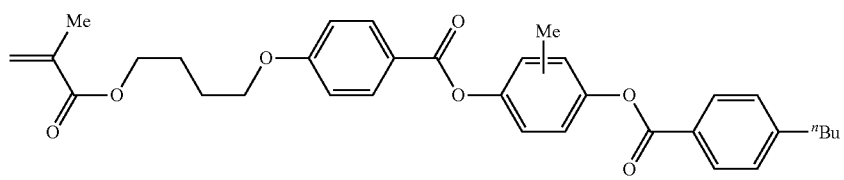
(4C)
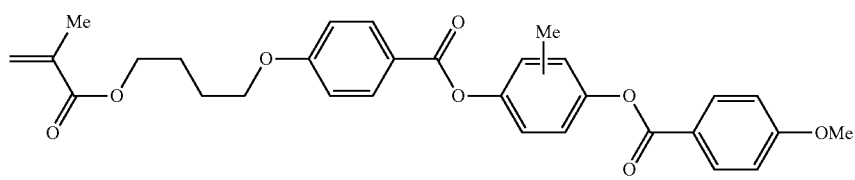
(5C)
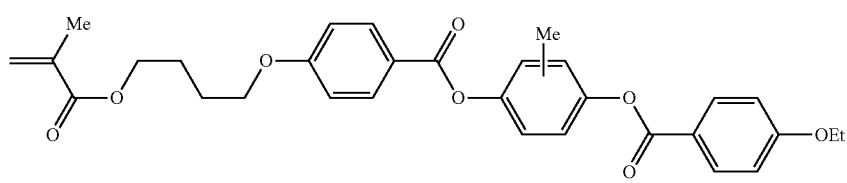
(6C)
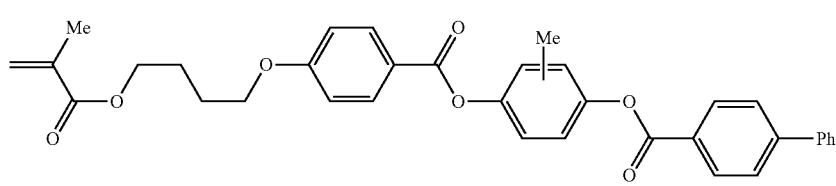
(7C)

-continued
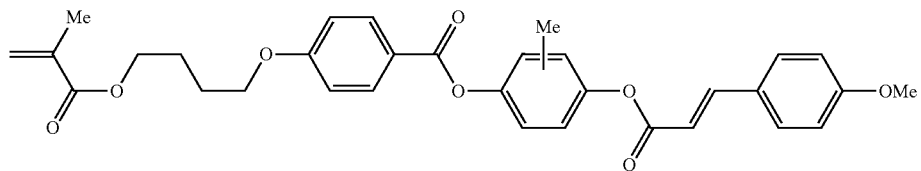
(8C)
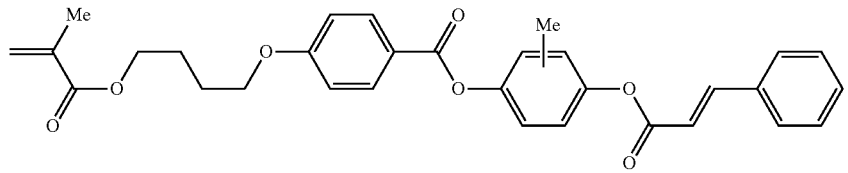
(9C)
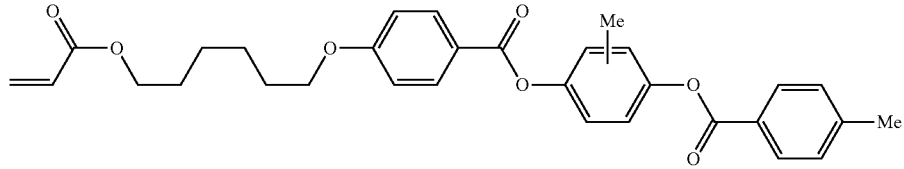
(1D)
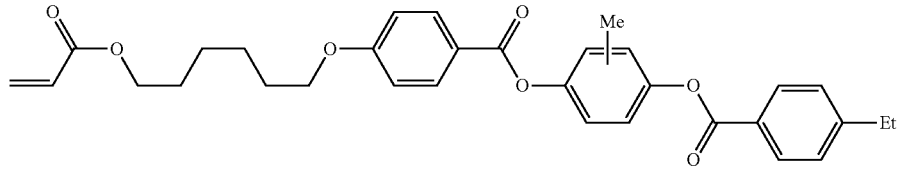
(2D)
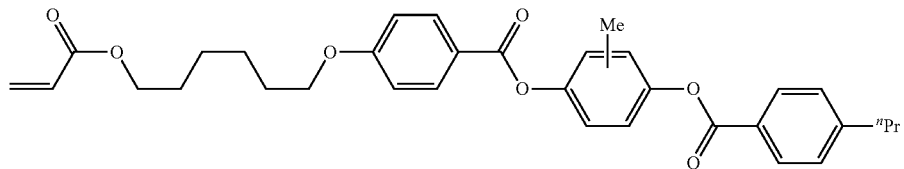
(3D)
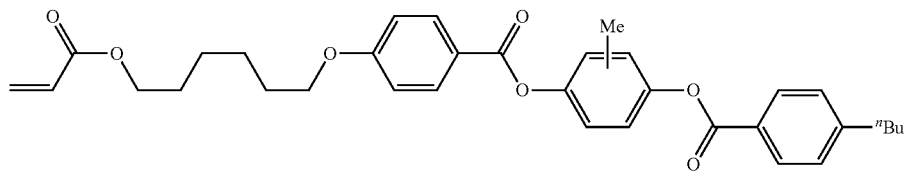
(4D)
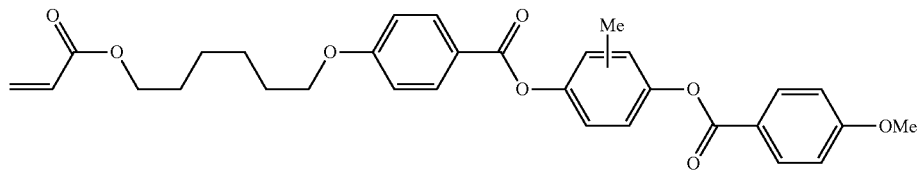
(5D)
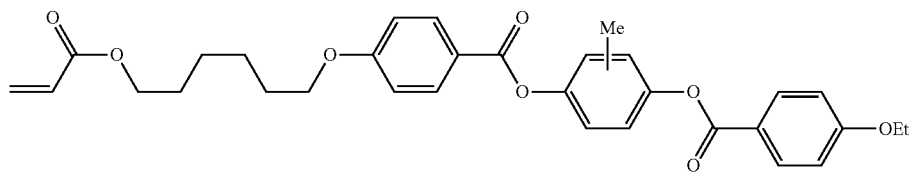
(6D)
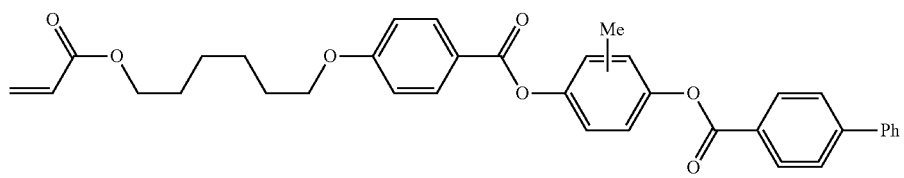
(7D)

-continued
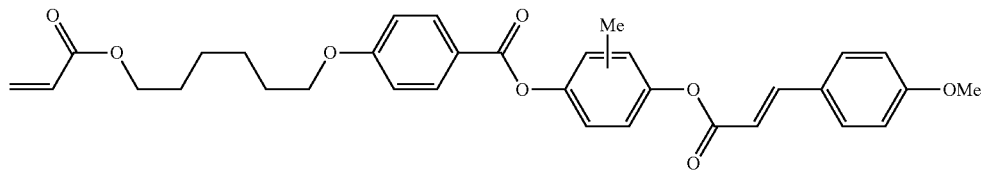
(8D)
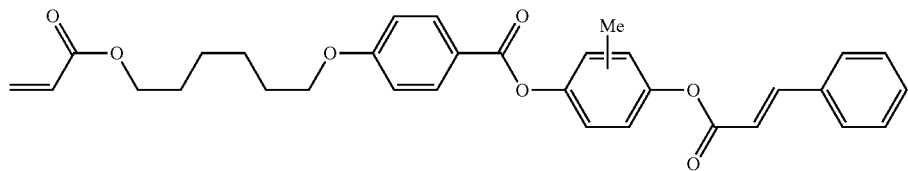
(9D)
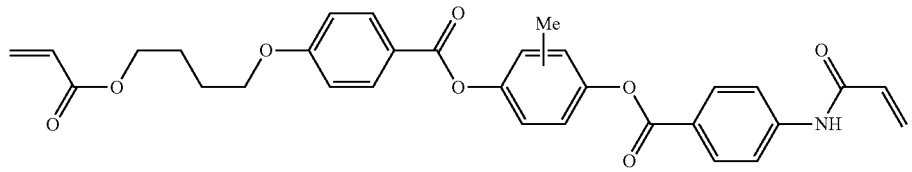
(1L)
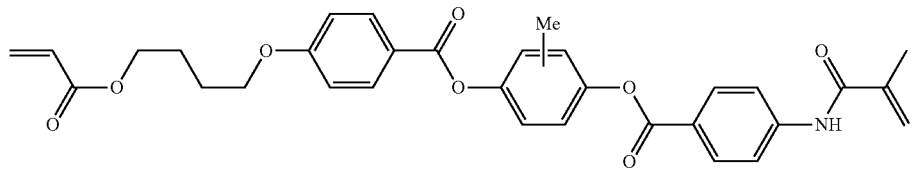
(2L)
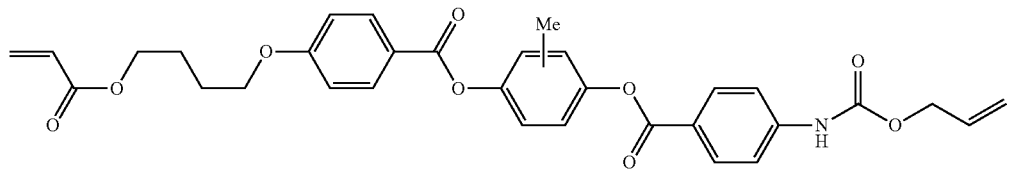
(3L)
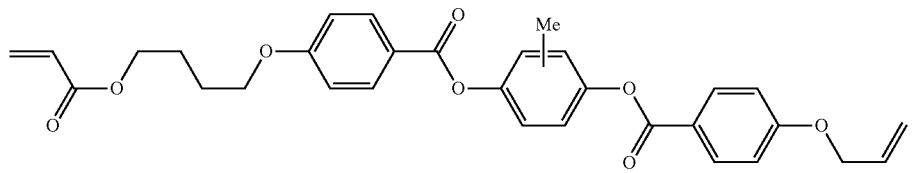
(4L)
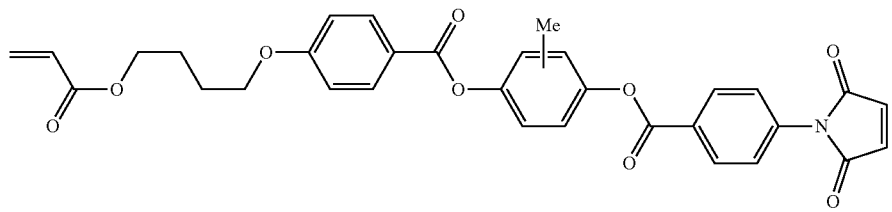
(5L)
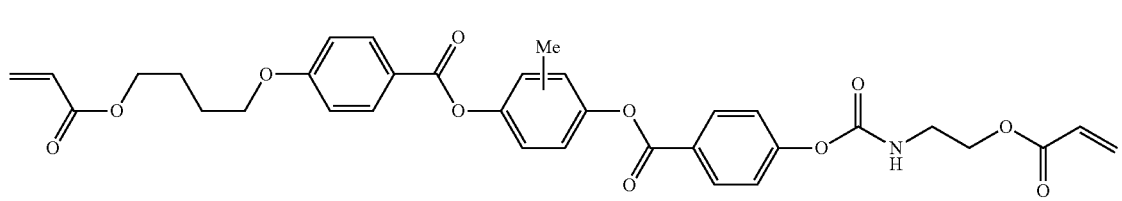
(6L)

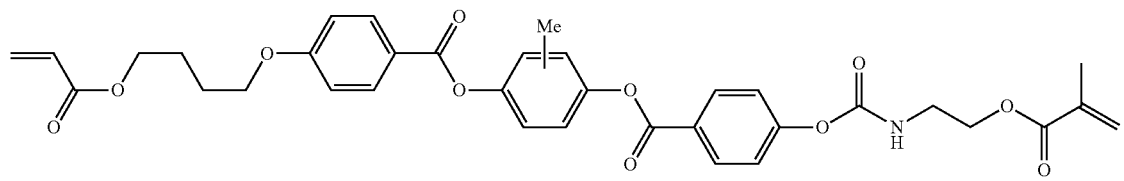 (7L)
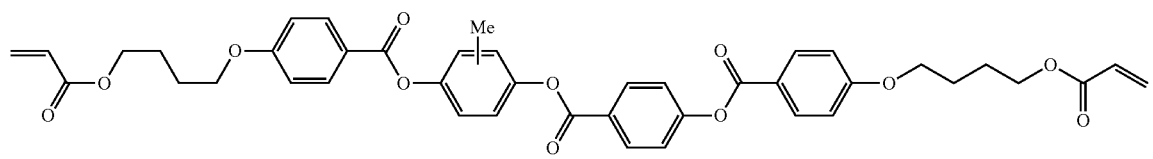 (8L)
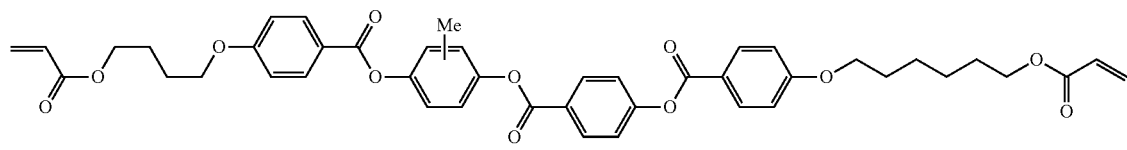 (9L)
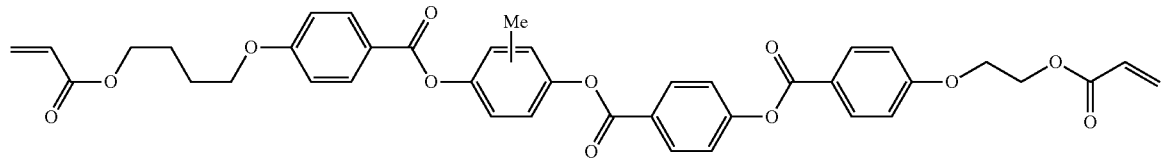 (10L)
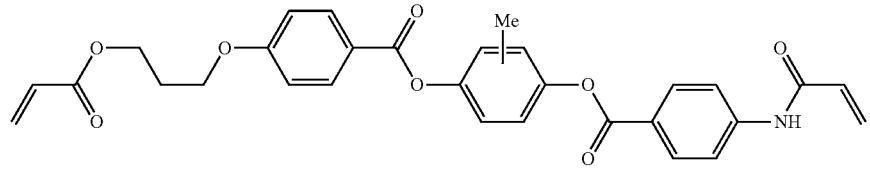 (1M)
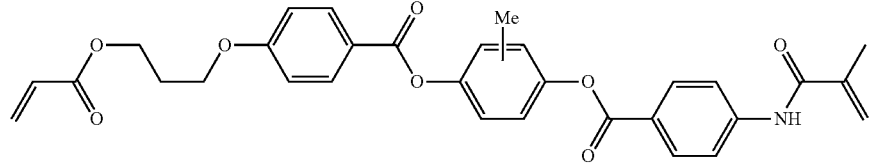 (2M)
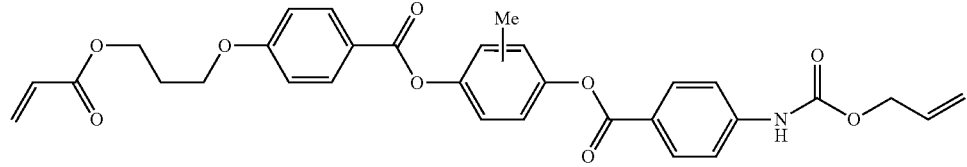 (3M)
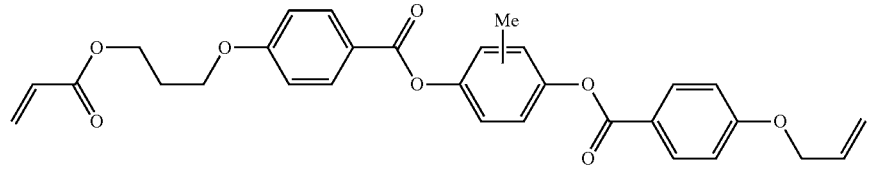 (4M)

-continued
(5M)
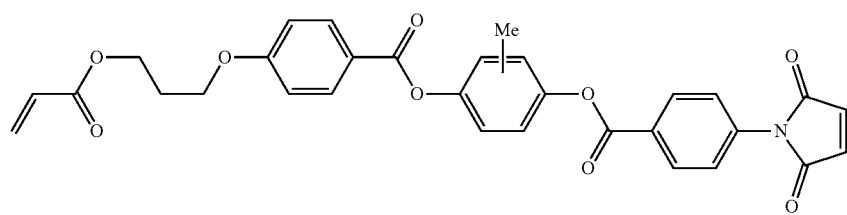
(6M)
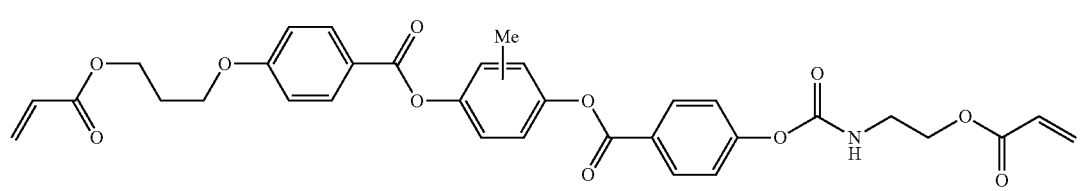
(7M)
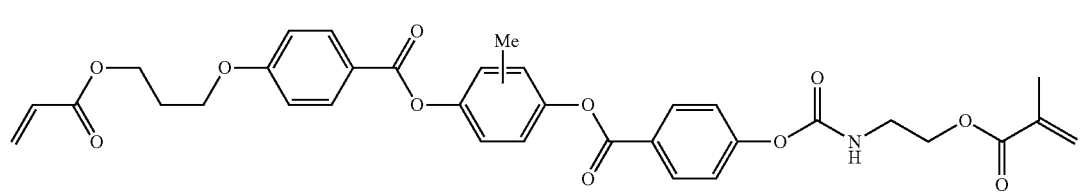
(8M)
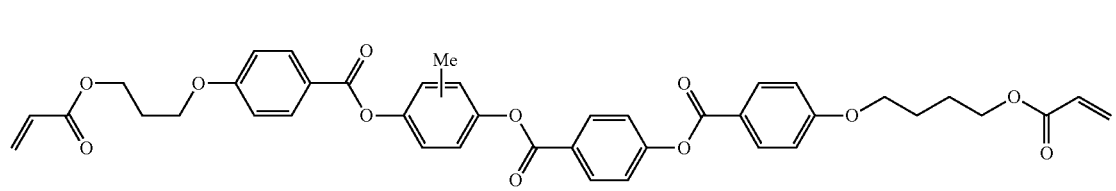
(9M)
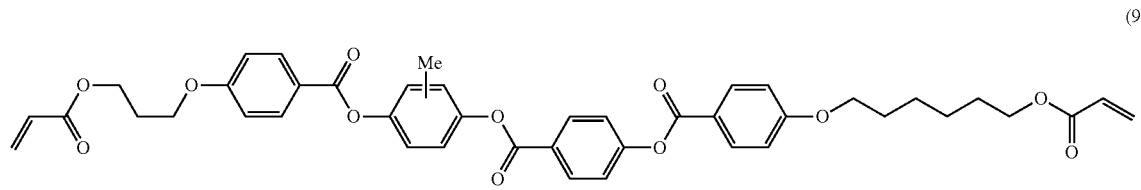
(10M)
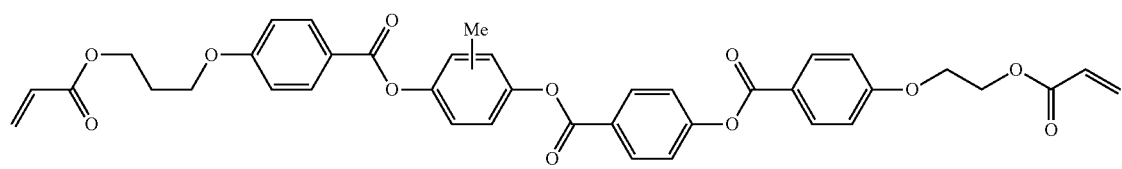
(1N)
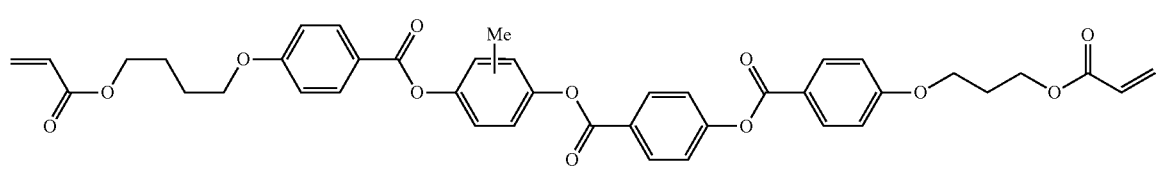
(2N)
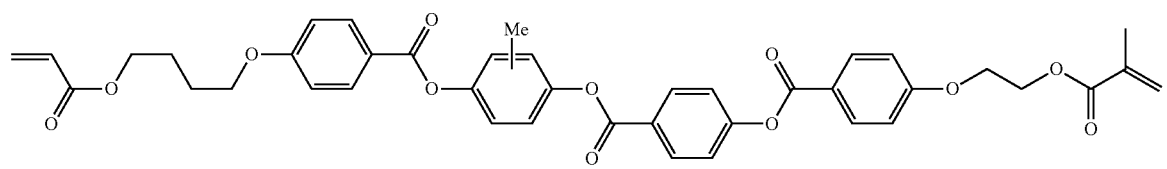

(3N)
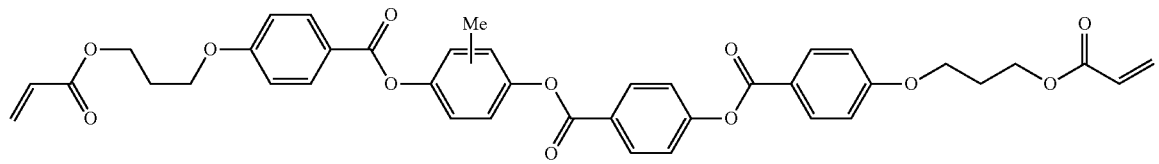
(4N)
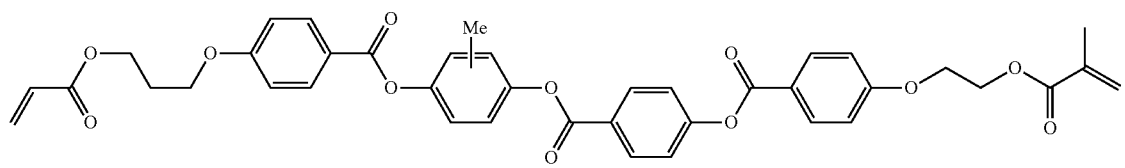
(5N)
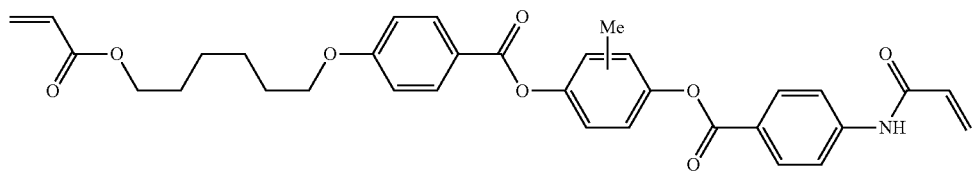
(6N)
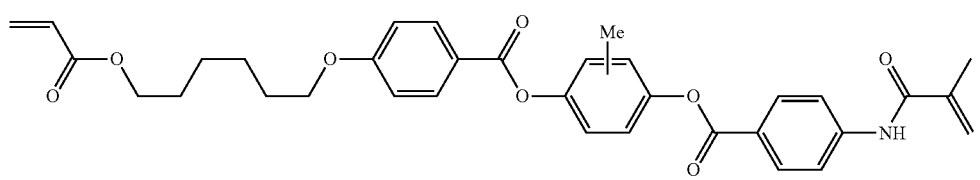
(7N)
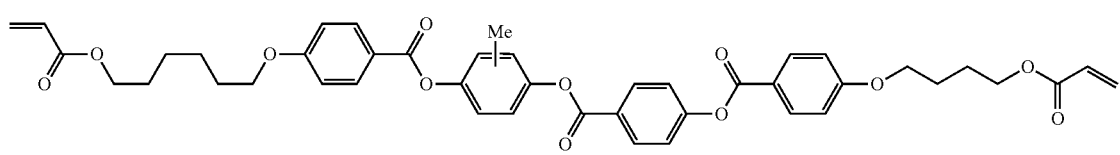
(8N)
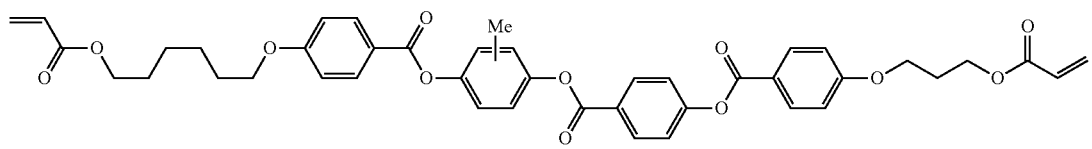
(9N)
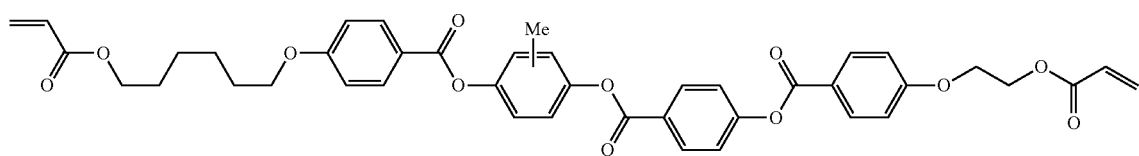
(10N)
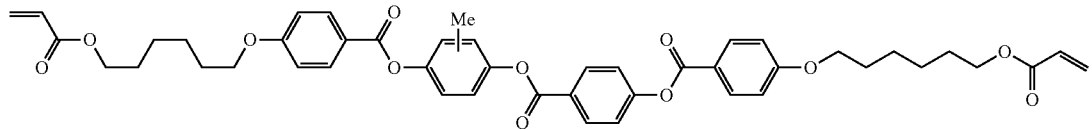

As the liquid crystal compound for use in the present invention, a compound represented by Formula (VI) and described in JP2014-198814A, in particular, a liquid crystal compound having no (meth)acrylate group represented by Formula (VI) is also suitably used.

Formula (VI)

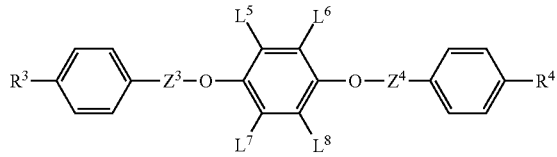

In Formula (VI), $Z^3$ represents —C(=O)— or —CH=CH—C(=O)—;
$Z^4$ represents —C(=O)— or C(=O)—CH=CH—;
$R^3$ and $R^4$ each independently represent a hydrogen atom, a halogen atom, a linear alkyl group having 1 to 4 carbon atoms, a methoxy group, an ethoxy group, an aromatic ring which may have a substituent, a cyclohexyl group, a vinyl group, a formyl group, a nitro group, a cyano group, an acetyl group, an acetoxy group, an acryloylamino group, an N,N-dimethylamino group, a maleimide group, a methacryloylamino group, an allyloxy group, an allyloxycarbamoyl group, an N-alkyloxycarbamoyl group in which the alkyl group has 1 to carbon atoms, an N-(2-methacryloyloxyethyl) carbamoyloxy group, an N-(2-acryloyloxyethyl)carbamoyloxy group, or a structure represented by Formula (VI-2); and
$L^5$, $L^6$, $L^7$, and $L^8$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^5$, $L^6$, $L^7$, or $L^8$ represents a group other than a hydrogen atom.

—$Z^5$-T-Sp-P    Formula (VI-2)

In Formula (VI-2), P represents an acryloyl group, a methacryl group, or a hydrogen atom, $Z^5$ represents —C(=O)O—, —OC(=O)—, —C(=O)NR$^1$— (where R$^1$ represents a hydrogen atom or a methyl group), —NR$^1$C(=O)—, —C(=O)S—, or —SC(=O)—, T represents 1,4-phenylene, and Sp represents a divalent aliphatic group having 1 to 12 carbon atoms which may have a substituent. However, one $CH_2$ in this aliphatic group or two or more non-adjacent $CH_2$ may be substituted with —O—, —S—, —OC(=O)—, —C(=O)O—, or —OC(=O)O—.

The compound represented by Formula (VI) is preferably a compound represented by Formula (VII).

Formula (VII)

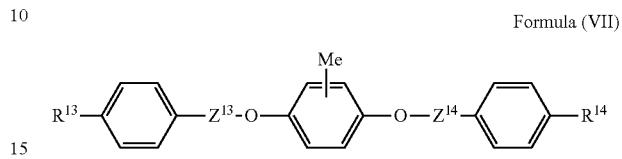

In Formula (VII), $Z^{13}$ represents —C(=O)— or C(=O)—CH=CH—;
$Z^{14}$ represents —C(=O)— or —CH=CH—C(=O)—; and
$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3).
$Z^{13}$ represents —C(=O)— or C(=O)—CH=CH— and is preferably —C(=O)—.
$R^{13}$ and $R^{14}$ each independently represent a hydrogen atom, a linear alkyl group having 1 to 4 carbon atoms, a methoxy group, an ethoxy group, a phenyl group, an acryloylamino group, a methacryloylamino group, an allyloxy group, or a structure represented by Formula (IV-3), preferably represents a methyl group, an ethyl group, a propyl group, a methoxy group, an ethoxy group, a phenyl group, an acryloylamino group, a methacryloylamino group, or a structure represented by Formula (IV-3), and more preferably represents a methyl group, an ethyl group, a methoxy group, an ethoxy group, a phenyl group, an acryloylamino group, a methacryloylamino group, or a structure represented by Formula (IV-3).

Specific examples of the compound represented by Formula (VI) are shown below. However, in the present invention, the compound represented by Formula (VI) is not limited thereto.

(11L)

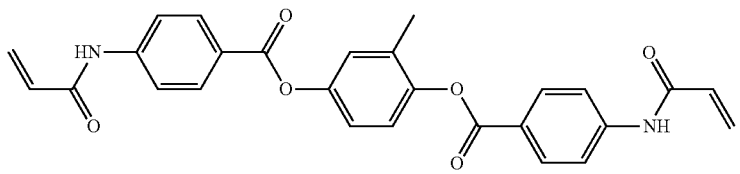

(12L)

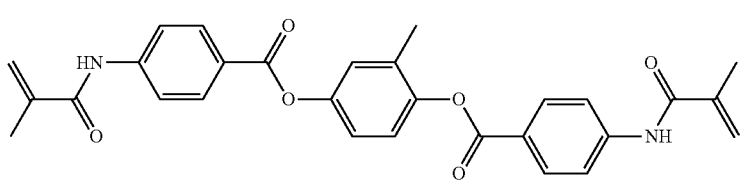

(13L)
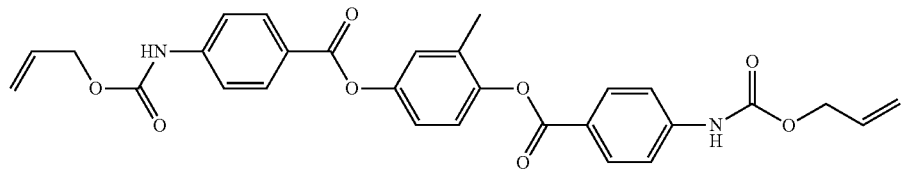
(14L)
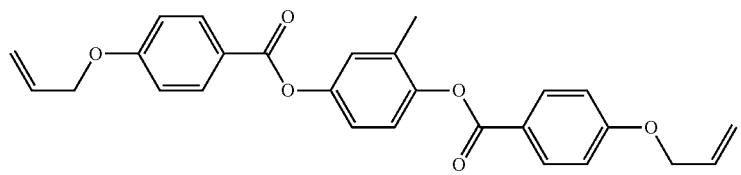
(15L)
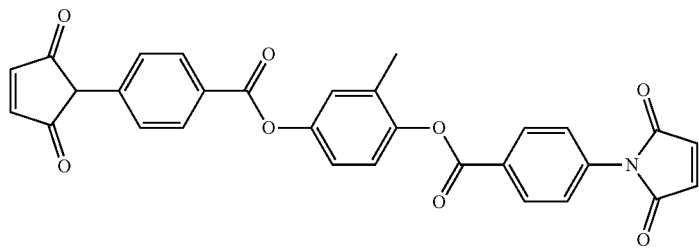
(16L)
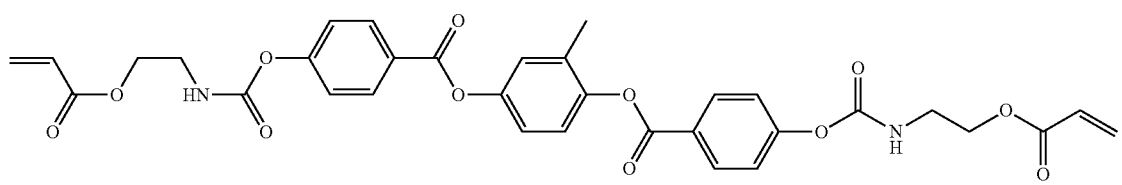
(17L)
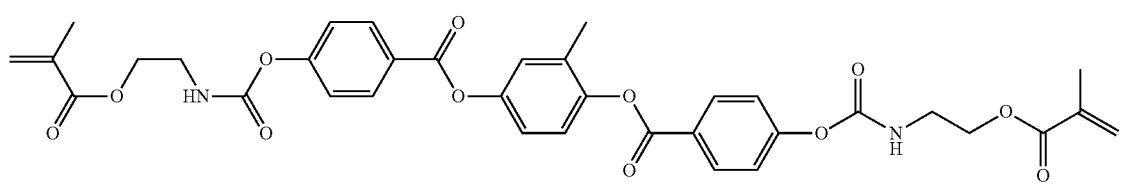
(18L)
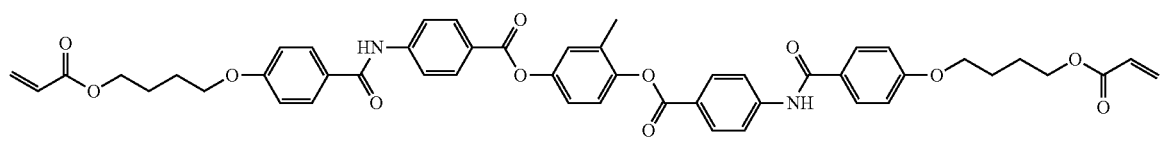
(19L)
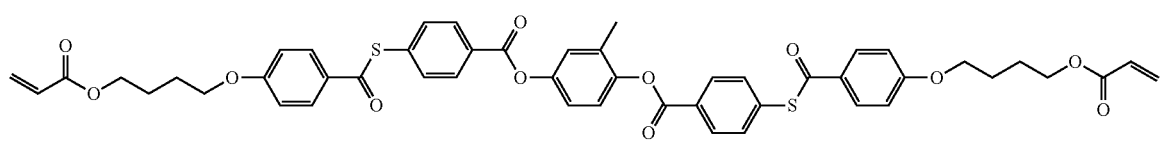
(11M)
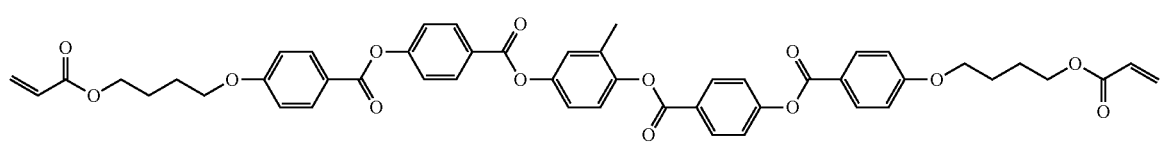

-continued
(12M)
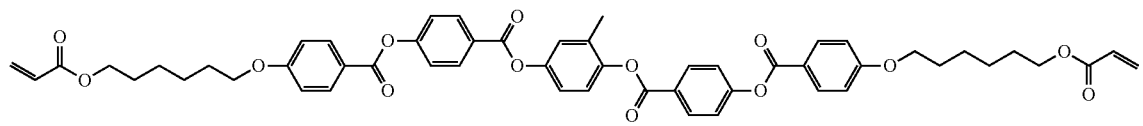
(13M)
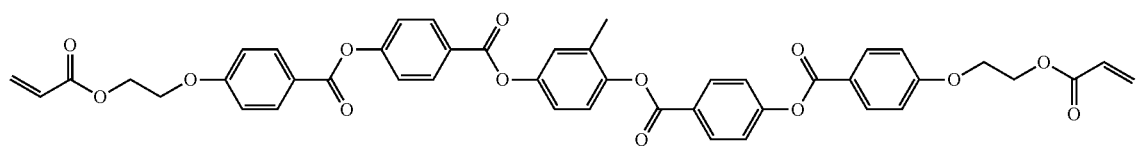
(14M)
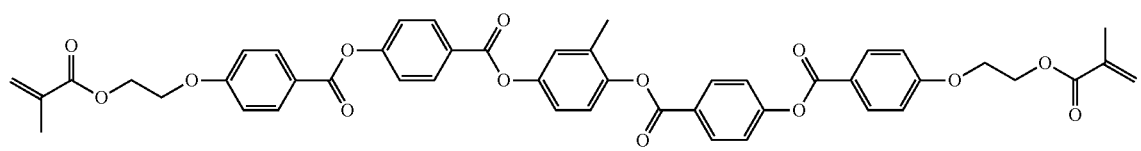
(15M)
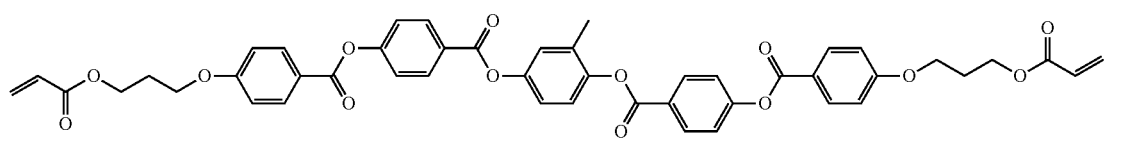
(16M)
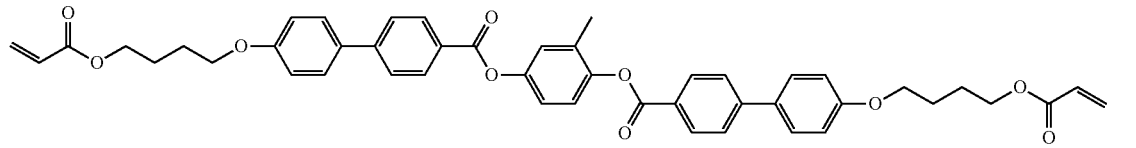
(17M)
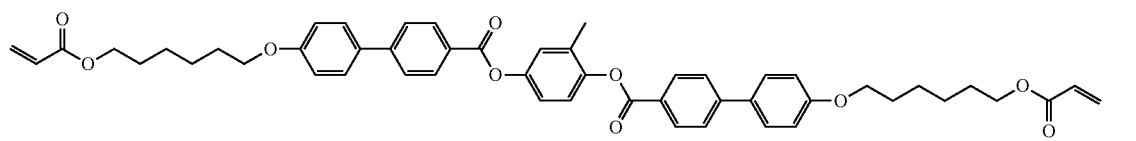
(18M)
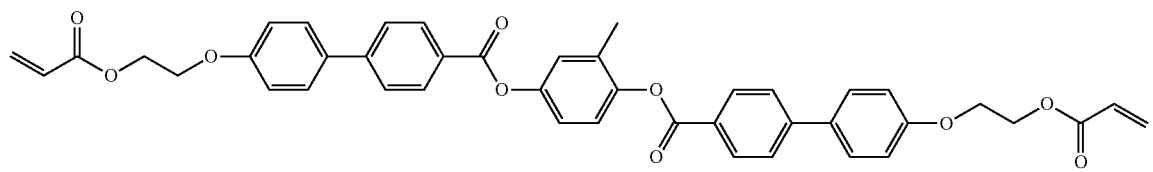
(19M)
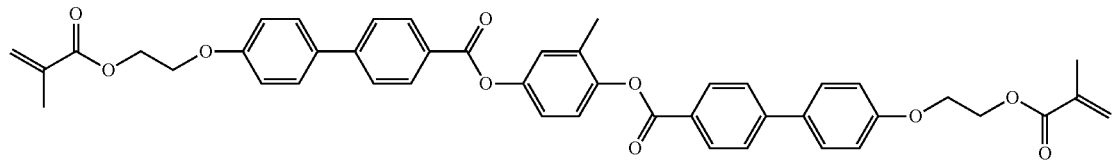

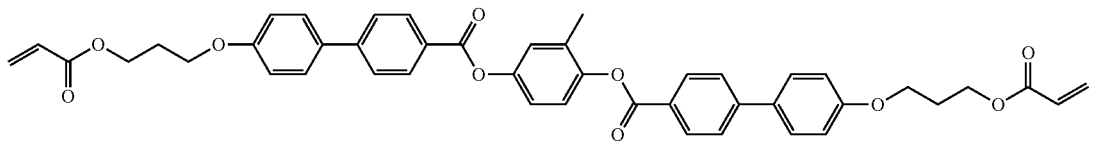

(20M)

As the liquid crystal compound for use in the present invention, a compound represented by Formula (VIII) and described in JP2014-198814A, in particular, a polymerizable liquid crystal compound having two (meth)acrylate groups represented by Formula (VIII) is also suitably used.

Formula (VIII)

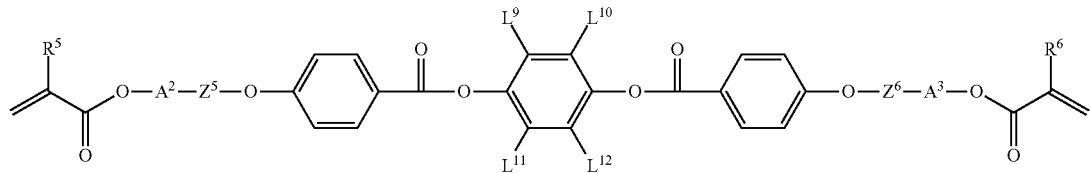

In Formula (VIII), $A^2$ and $A^3$ each independently represent an alkylene group having 2 to 18 carbon atoms, and one $CH_2$ in the alkylene group or two or more non-adjacent $CH_2$ may be substituted with —O—;

$Z^5$ represents —C(=O)—, —OC(=O)—, or a single bond;

$Z^6$ represents —C(=O)—, —C(=O)O—, or a single bond;

$R^5$ and $R^6$ each independently represent a hydrogen atom or a methyl group; and $L^9$, $L^{10}$, $L^{11}$, and $L^{12}$ each independently represent an alkyl group having 1 to 4 carbon atoms, an alkoxy group having 1 to 4 carbon atoms, an alkoxycarbonyl group having 2 to 5 carbon atoms, an acyl group having 2 to 4 carbon atoms, a halogen atom, or a hydrogen atom, and at least one of $L^9$, $L^{10}$, $L^{11}$, or $L^{12}$ represents a group other than a hydrogen atom.

The compound represented by Formula (VIII) is preferably a compound represented by Formula (IX).

Formula (IX)

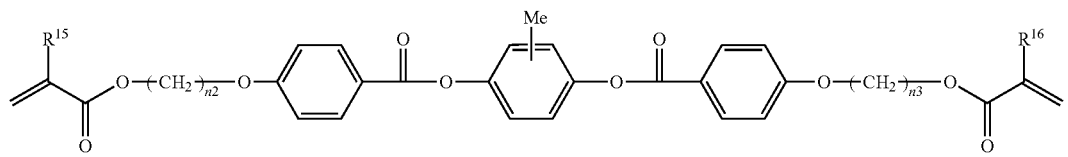

In Formula (IX), n2 and n3 each independently represent an integer of 3 to 6; and $R^{15}$ and $R^{16}$ each independently represent a hydrogen atom or a methyl group.

In Formula (IX), it is preferred that n2 and n3 each independently represent an integer of 3 to 6, and n2 and n3 are 4.

In Formula (IX), it is preferred that $R^{15}$ and $R^{16}$ each independently represent a hydrogen atom or a methyl group, and $R^{15}$ and $R^{16}$ each represent a hydrogen atom.

Specific examples of the compound represented by Formula (VIII) are shown below. However, in the present invention, the compound represented by Formula (VIII) is not limited thereto.

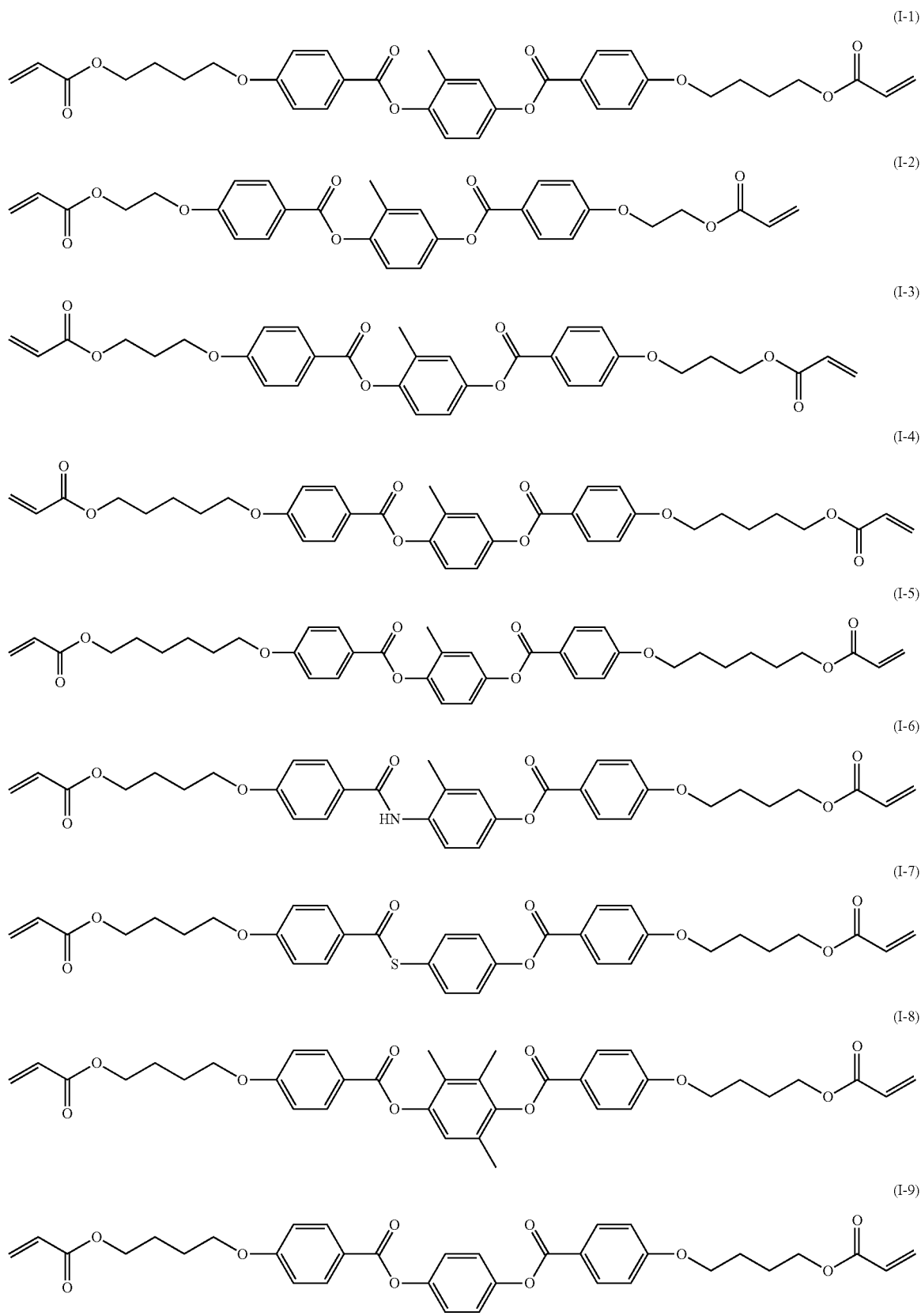

(I-10)
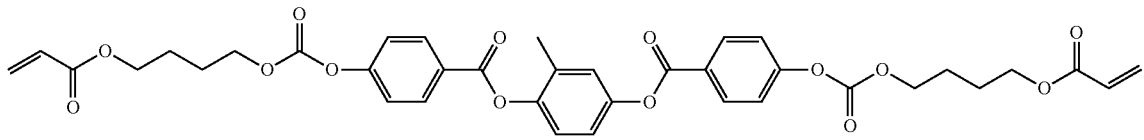

(I-11)
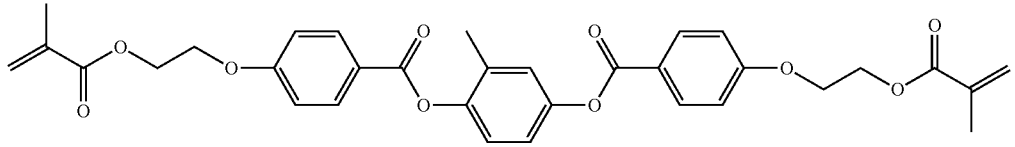

(I-12)
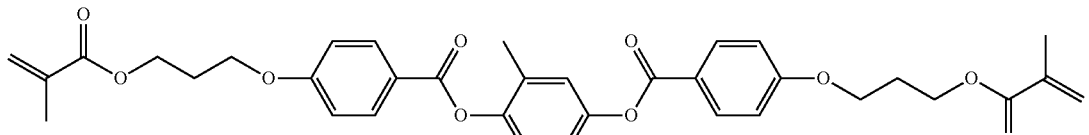

(I-13)
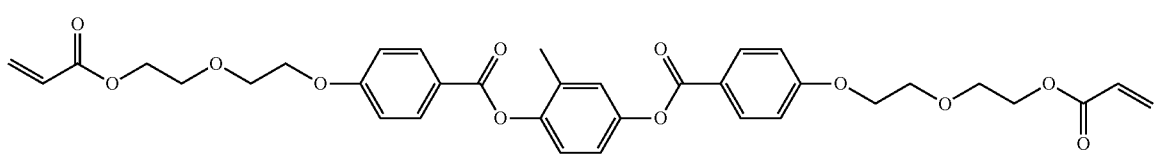

(I-14)
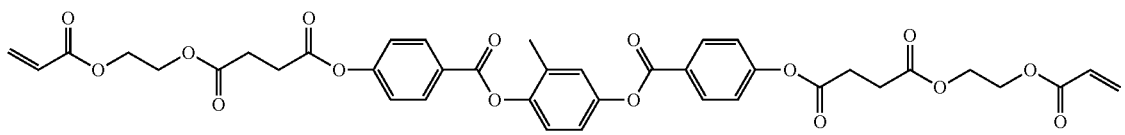

Such liquid crystal compounds can be produced by a known method.

<Optional Components>

The composition may contain components other than the liquid crystal compound and the chiral agent.

(Polymerization Initiator)

The composition may contain a polymerization initiator. In particular, in a case where the liquid crystal compound has a polymerizable group, the composition preferably contains a polymerization initiator.

The polymerization initiator is preferably a photopolymerization initiator capable of initiating a polymerization reaction upon irradiation with ultraviolet rays. Examples of the photopolymerization initiator include α-carbonyl compounds (as described in U.S. Pat. Nos. 2,367,661A and 2,367,670A), acyloin ethers (as described in U.S. Pat. No. 2,448,828A), α-hydrocarbon-substituted aromatic acyloin compounds (as described in U.S. Pat. No. 2,722,512A), polynuclear quinone compounds (as described in U.S. Pat. Nos. 3,046,127A and 2,951,758A), combinations of tri-arylimidazole dimer and p-aminophenyl ketone (as described in U.S. Pat. No. 3,549,367A), acridine and phenazine compounds (as described in JP1985-105667A (JP-S60-105667A) and U.S. Pat. No. 4,239,850A), and oxadiazole compounds (as described in U.S. Pat. No. 4,212,970A).

As the polymerization initiator, it is preferable to select a polymerization initiator that is sensitive in a wavelength range different from that of the light irradiation wavelength in a case where the helical twisting power of the chiral agent A is reduced. For example, there is an aspect in which the wavelength at the time of light irradiation in a case where the helical twisting power of the chiral agent A is reduced is 310 nm and the polymerization initiator having a photosensitive wavelength of about 365 nm is used.

The content of the polymerization initiator in the composition is not particularly limited, but it is preferably 0.1% to 20% by mass and more preferably 1% to 8.0% by mass, with respect to the total mass of the liquid crystal compound.

(Alignment Control Agent (Alignment Agent))

The composition may contain an alignment control agent. The inclusion of the alignment control agent in the composition makes it possible to achieve stable or rapid formation of a cholesteric liquid crystalline phase.

Examples of the alignment control agent include fluorine-containing (meth)acrylate-based polymers, compounds represented by General Formulae (X1) to (X3) described in WO2011/162291A, compounds described in paragraphs [0007] to [0029] of JP2012-211306A, compounds described in paragraphs [0020] to [0031] of JP2013-047204A, compounds described in paragraphs [0165] to [0170] of WO2016/009648A, the compounds described in paragraphs [0077] to [0081] of WO2016/092844, and General Formulae (Cy201) to (Cy211) described in JP4592225B. The composition may contain two or more selected from these compounds. These compounds can reduce the tilt angle of the molecules of the liquid crystal compound at the air interface of the layer, or align the molecules substantially horizontally. In the present specification, the term "horizontal alignment" refers to that the long axis of the liquid crystal molecule is parallel to the film surface, but does not require strict parallelism. In the present specification, the "horizontal alignment" means an alignment in which the tilt angle to the horizontal plane is less than 20°.

The alignment control agents may be used alone or in combination of two or more thereof.

The content of the alignment control agent in the composition is not particularly limited, but it is preferably 0.01% to 10% by mass, more preferably 0.01% to 5.0% by mass, and still more preferably 0.01% to 1.0% by mass, with respect to the total mass of the liquid crystal compound.

(Solvent)

The composition may contain a solvent.

The solvent may be, for example, water or an organic solvent. Examples of the organic solvent include amides such as N,N-dimethylformamide; sulfoxides such as dimethylsulfoxide; heterocyclic compounds such as pyridine; hydrocarbons such as benzene and hexane; alkyl halides such as chloroform and dichloromethane; esters such as methyl acetate, butyl acetate, and propylene glycol monoethyl ether acetate; ketones such as acetone, methyl ethyl ketone, cyclohexanone, and cyclopentanone; ethers such as tetrahydrofuran and 1,2-dimethoxyethane; and 1,4-butanediol diacetate. These solvents may be used alone or in combination of two or more thereof.

(Other Additives)

The composition may contain one or two or more other additives such as an antioxidant, an ultraviolet absorber, a sensitizer, a stabilizer, a plasticizer, a chain transfer agent, a polymerization inhibitor, an antifoaming agent, a leveling agent, a thickener, a flame retardant, a surface-active substance, a dispersant, and a color material such as a dye and a pigment.

<Uses>

The liquid crystal composition can be applied to various uses. For example, an optically anisotropic body or a reflective layer can be formed using the liquid crystal composition. In addition, for example, in a case where the liquid crystal composition contains a liquid crystal compound having a polymerizable group, a cured product is obtained by subjecting the composition in a cholesteric liquid crystalline phase state to a curing treatment (light irradiation treatment or heat treatment), and the cured product can be suitably applied to an optically anisotropic body or a reflective layer.

In addition, the optically anisotropic body is intended to refer to a substance which has optical anisotropy.

In addition, the reflective layer corresponds to a layer obtained by immobilizing a cholesteric liquid crystalline phase and can reflect light in a predetermined reflection band. The reflective layer will be described later.

[Method for Producing Reflective Layer]

Hereinafter, a method for producing a reflective layer according to the embodiment of the present invention will be described.

The method for producing a reflective layer according to the embodiment of the present invention has at least the following steps 1 to 3.

Step 1: a step of forming a composition layer using the liquid crystal composition.

Step 2: a step of aligning the liquid crystal compound contained in the composition layer into a cholesteric liquid crystalline phase state.

Step 3: a step of irradiating at least a partial region of the composition layer with light to reduce a helical twisting power of chiral agent A contained in the composition layer in the light irradiation region, such that a helical pitch of the cholesteric liquid crystalline phase is reduced by 5% or more.

Hereinafter, the materials used in each step and the procedure of each step will be described in detail.

<Step 1>

The step 1 is a step of forming a composition layer using the liquid crystal composition. Specifically, the step 1 is a step of applying the liquid crystal composition onto a substrate to form a composition layer.

(Substrate)

The substrate is a plate that supports a layer of the composition described below. Among others, a transparent substrate is preferable. The transparent substrate is intended to refer to a substrate having a transmittance of visible light of 60% or more, and the transmittance thereof is preferably 80% or more and more preferably 90% or more.

The material constituting the substrate is not particularly limited, and examples thereof include a cellulose-based polymer, a polycarbonate-based polymer, a polyester-based polymer, a (meth)acrylic polymer, a styrene-based polymer, a polyolefin-based polymer, a vinyl chloride-based polymer, an amide-based polymer, an imide-based polymer, a sulfone-based polymer, a polyether sulfone-based polymer, and a polyether ether ketone-based polymer.

The substrate may contain various additives such as an ultraviolet (UV) absorber, a matting agent fine particle, a plasticizer, a deterioration inhibitor, and a release agent.

In addition, the substrate preferably has low birefringence in the visible light region. For example, the phase difference at a wavelength of 550 nm of the substrate is preferably 50 nm or less and more preferably 20 nm or less.

The thickness of the substrate is not particularly limited, but it is preferably 10 to 200 µm and more preferably 20 to 100 µm from the viewpoint of thinning and handleability.

The thickness is intended to refer to an average thickness, and is obtained by measuring thicknesses at any five places of the substrate and arithmetically averaging the measured values. Regarding the method of measuring the thickness, the same applies to the thickness of a reflective layer to be described later.

(Procedure of Step 1)

In the step 1, the liquid crystal composition described above is first applied onto a substrate. The application method is not particularly limited, and examples thereof include a wire bar coating method, an extrusion coating method, a direct gravure coating method, a reverse gravure coating method, and a die-coating method. Prior to application of the liquid crystal composition, a known rubbing treatment may be applied to the substrate.

If necessary, a treatment for drying the liquid crystal composition applied onto the substrate may be carried out after application. By carrying out the drying treatment, the solvent can be removed from the applied liquid crystal composition.

The film thickness of the composition (composition layer) applied onto the substrate is not particularly limited, but is preferably 0.1 to 20 µm, more preferably 0.2 to 15 µm, and still more preferably 0.5 to 10 µm from the viewpoint of superior diffuse reflectivity of the reflective layer.

<Step 2>

The step 2 is a step in which the liquid crystal compound contained in the composition layer obtained through the step 1 is aligned into a cholesteric liquid crystalline phase state.

The method of aligning the liquid crystal compound may be, for example, a method of heating the composition layer. Specifically, the composition (composition layer) applied onto the substrate is heated to align the liquid crystal compound in the composition layer into a cholesteric liquid crystalline phase state.

The liquid crystalline phase transition temperature of the composition layer is preferably in the range of 10° C. to 250° C. and more preferably in the range of 10° C. to 150° C., from the viewpoint of manufacturing suitability.

As to preferred heating conditions, it is preferable to heat the composition layer at 40° C. to 100° C. (preferably 60° C. to 100° C.) for 0.5 to 5 minutes (preferably 0.5 to 2 minutes).

In a case of heating the composition layer, it is preferable not to heat the composition layer to a temperature at which the liquid crystal compound becomes an isotropic phase (Iso). In a case where the composition layer is heated above the temperature at which the liquid crystal compound becomes an isotropic phase, defects of the cholesteric liquid crystalline phase are increased, which is not preferable.

<Step 3>

The step 3 is a step of irradiating at least a partial region of the composition layer obtained through the step 2 with light to reduce a helical twisting power of chiral agent A contained in the composition layer in the light irradiation region, such that the helical pitch of a cholesteric liquid crystalline phase is reduced.

As described above, by carrying out the present step, the twist of the liquid crystal compound in the light irradiation region is further increased, and as a result, the alignment of the cholesteric liquid crystalline phase (inclination of the helical axis) is changed, whereby the bright portions 14 and the dark portions 16 parallel to the substrate 10 are changed to form a reflective layer (a layer 12b of a composition in a cholesteric liquid crystalline phase state) having bright portions 14 and dark portions 16 having a wave-like structure (uneven structure) as shown in FIG. 2.

The phrase "helical pitch of the cholesteric liquid crystalline phase is reduced" is intended to mean that the percentage reduction Z expressed by Expression (1C) is larger than zero in a case where the central reflection wavelength of the cholesteric liquid crystalline phase before irradiating the composition layer with light is X (nm), and the central reflection wavelength of the cholesteric liquid crystalline phase after irradiating the composition layer with light is Y (nm).

Percentage reduction $Z (\%) = \{(X-Y)/X\} \times 100$    Expression (1C):

From the viewpoint of more pronounced diffuse reflectivity, the percentage reduction Z of the helical pitch of the cholesteric liquid crystalline phase is preferably 5% or more, more preferably 10% or more, and still more preferably 20% or more. The upper limit of the percentage reduction Z is not particularly limited, but is often 50% or less.

In the step 3, light may be applied to at least a partial region of the composition layer. In other words, the light irradiation may be for the entire surface of the composition layer or for a partial region of the composition layer.

Figure 5:
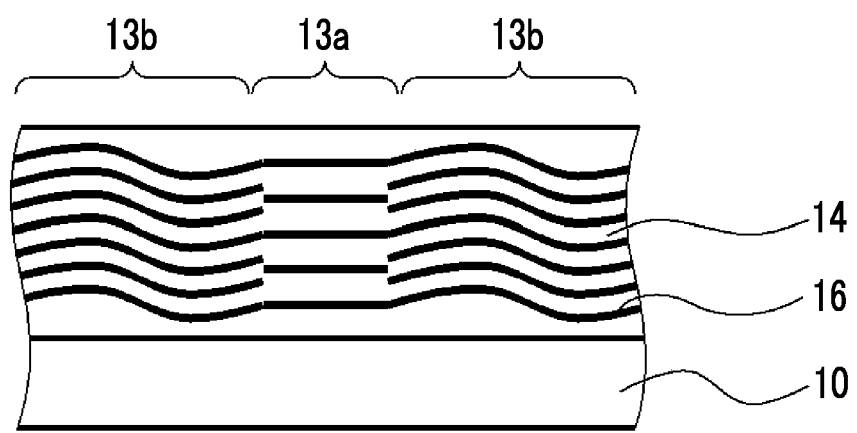
FIG. 5 is a schematic diagram of a cross section of the reflective layer observed by SEM, which is obtained in a case where an exposure step is carried out in a pattern-wise manner as a light irradiation step of step 3.

In a case where the light irradiation is carried out for a partial region of the composition layer, pattern-wise exposure is preferable. As a result, the bright portions 14 and the dark portions 16 parallel to the substrate 10 change only in the light irradiation region, which results in the formation of a reflective layer having a region A (light irradiation region: 13b in FIG. 5) having bright portions 14 and dark portions 16 having a wave-like structure (uneven structure) as shown in FIG. 5 and a region B in which bright portions 14 and dark portions 16 are linear and parallel to each other (unexposed region: 13a in FIG. 5. This corresponds to the alignment state of the liquid crystal compound in the layer 12a of the composition in a cholesteric liquid crystalline phase state).

Examples of the method of pattern-wise exposure include a method of exposing the composition layer through a mask, a method of pattern-wise exposure of the composition layer by a laser beam, and a method of pattern-wise exposure of the composition layer by light interference.

The irradiation intensity of light irradiation in the step 3 is not particularly limited, but generally it is preferably about 0.1 to 10 mW/cm². The time for light irradiation is not particularly limited, but may be appropriately determined from the viewpoints of both sufficient strength and productivity of the layer to be obtained.

In addition, the temperature of the composition layer at the time of light irradiation is, for example, 0° C. to 100° C., and preferably 10° C. to 40° C.

The irradiation intensity, irradiation time, irradiation light quantity, and the like of light irradiation in the step 3 may be appropriately selected according to the type of chiral agent to be used.

The light used for the light irradiation is not particularly limited as long as it is an actinic ray or radiation that changes the helical twisting power of the chiral agent A, which refers to, for example, an emission line spectrum of a mercury lamp, far ultraviolet rays represented by an excimer laser, extreme ultraviolet rays (EUV light), X-rays, ultraviolet rays, and electron beams (EB). Of these, ultraviolet rays are preferable.

<Curing Treatment>

In addition, in a case where the liquid crystal compound has a polymerizable group, a curing treatment may be carried out in the step 3 or after the step 3.

More specifically, the method for producing a reflective layer according to the embodiment of the present invention may further include a step 4 of subjecting the composition layer to a curing treatment in the step 3 to immobilize a cholesteric liquid crystalline phase, or subjecting the composition layer to a curing treatment after the step 3 to immobilize a cholesteric liquid crystalline phase. The reflective layer obtained by carrying out this treatment corresponds to a layer obtained by immobilizing the cholesteric liquid crystalline phase.

Here, as the state where the cholesteric liquid crystalline phase is "immobilized", the most typical and preferred aspect is a state in which the alignment of the liquid crystal compound brought into a cholesteric liquid crystalline phase is retained. The state where the liquid crystalline phase is "immobilized" is not limited thereto, and specifically, it refers to a state in which, in a temperature range of usually 0° C. to 50° C. and in a temperature range of −30° C. to 70° C. under more severe conditions, this layer has no fluidity and can keep an immobilized alignment state stably without causing changes in alignment state due to external field or external force. In the present invention, as will be described later, it is preferable to immobilize the alignment state of a cholesteric liquid crystalline phase by a curing reaction proceeding upon irradiation with ultraviolet rays.

In the layer obtained by immobilizing a cholesteric liquid crystalline phase, it is sufficient that the optical properties of the cholesteric liquid crystalline phase are retained in the layer, and finally the composition in the layer no longer needs to show liquid crystallinity.

In addition, the immobilization of the cholesteric liquid crystalline phase is preferably to immobilize the structure (alignment state) of the cholesteric liquid crystalline phase after the helical twisting power of the chiral agent A is reduced upon light irradiation.

The method of the curing treatment is not particularly limited, and examples thereof include a photo curing treatment and a thermal curing treatment. Among them, a light irradiation treatment is preferable, and an ultraviolet irradiation treatment is more preferable. Further, as described above, the liquid crystal compound is preferably a liquid crystal compound having a polymerizable group. In a case where the liquid crystal compound has a polymerizable group, the curing treatment is preferably a polymerization reaction upon light irradiation (particularly ultraviolet irradiation), and more preferably a radical polymerization reaction upon light irradiation (particularly ultraviolet irradiation).

For ultraviolet irradiation, a light source such as an ultraviolet lamp is used.

The irradiation energy quantity of ultraviolet rays is not particularly limited, but it is generally preferably about 0.1 to 0.8 J/cm². The irradiation time of the ultraviolet rays is not particularly limited, but it may be determined as appropriate from the viewpoint of both sufficient strength and productivity of the obtained layer.

[Reflective Layer]

The reflective layer according to the embodiment of the present invention is a reflective layer obtained by immobilizing a cholesteric liquid crystalline phase, and has a region A in which bright portions and dark portions derived from a cholesteric liquid crystalline phase observed in a cross section with a scanning electron microscope are wave-like; and a region B in which bright portions and dark portions derived from a cholesteric liquid crystalline phase observed in a cross section with a scanning electron microscope are linear and parallel to each other.

That is, specifically, as shown in FIG. 5, the reflective layer according to the embodiment of the present invention has, in the cross-sectional SEM observation view, the region A in which the bright portions and the dark portions have a wave-like structure, and the region B in which the bright portions and the dark portions are linear and parallel to each other.

As described above, by the step of producing a reflective layer (steps 3), the helical pitch derived from the cholesteric liquid crystalline phase in the region A is smaller than the helical pitch derived from the cholesteric liquid crystalline phase in the region B (that is, the twist of the cholesteric liquid crystalline phase is stronger).

Further, the region A of the reflective layer has a cholesteric liquid crystal structure, and has a structure (region) in which the angle formed between the helical axis and the surface of the reflective layer periodically changes. In other words, the region A of the reflective layer is a region having a cholesteric liquid crystal structure, in which the cholesteric liquid crystal structure gives a stripe pattern of bright portions and dark portions in a cross-sectional view of the reflective layer observed by a scanning electron microscope, and therefore the angle formed between the normal of the line formed by at least one dark portion and the surface of the reflective layer periodically changes. Therefore, in the region A of the reflective layer according to the embodiment of the present invention, light can be diffusely reflected in substantially any direction, not in a limited direction.

Therefore, for example, in a case where the reflective layer is applied to a projected image display member such as a projection screen, arrangement of the region A in the frame portion can contribute to a further improvement of visibility.

Further, in a case where the region A and the region B are present within a radius of 1 mm at any position in the in-plane direction, it is more excellent in diffuse reflectivity over the entire region of the reflective layer.

From the viewpoint that the reflection wavelength range is further expanded, the reflective layer preferably further has a plurality of regions having helical pitches of the cholesteric liquid crystalline phase different from each other (in other words, regions having central reflection wavelengths different from each other) in the region A.

In addition, a plurality of the reflective layers may be formed on the substrate.

For example, after forming the reflective layer X having a predetermined selective reflection wavelength on the substrate by the above-described method, the reflective layer Y having a selective reflection wavelength different from that of the reflective layer X may be formed by the same procedure. In a case of forming a plurality of reflective layers as described above, it is preferable to laminate a plurality of layers in which a cholesteric liquid crystalline phase is immobilized using a liquid crystal compound having a polymerizable group.

<Uses>

The reflective layer is a layer having a cholesteric liquid crystalline phase (cholesteric liquid crystal structure) having a predetermined wave-like structure (hereinafter, the reflective layer is also referred to as "cholesteric liquid crystal layer"), and is preferably a layer obtained by immobilizing this cholesteric liquid crystalline phase.

The cholesteric liquid crystal layer is a layer showing selective reflection properties with respect to light in a predetermined wavelength range. The cholesteric liquid crystal layer functions as a circularly polarized selective reflective layer that selectively reflects either the dextrorotatory circularly polarized light or the levorotatory circularly polarized light in the selective reflection wavelength range and transmits the other sense circularly polarized light. A film including one or two or more cholesteric liquid crystal layers can be used for various purposes. In a film including two or more layers of a cholesteric liquid crystal layer, the senses of circularly polarized light reflected by the cholesteric liquid crystal layers may be the same or opposite to each other depending on the application. In addition, the center wavelengths of selective reflection of the cholesteric liquid crystal layers, which will be described later, may be the same as or different from each other depending on the application.

In the present specification, the term "sense" for circularly polarized light means dextrorotatory circularly polarized light or levorotatory circularly polarized light. The sense of circularly polarized light is defined such that, in a case where light is viewed as it proceeds toward an observer and in a case where the distal end of the electric field vector rotates clockwise as time increases, the sense is dextrorotatory circularly polarized light, and in a case where it rotates counterclockwise, the sense is levorotatory circularly polarized light. In the present specification, the term "sense" may be used for the twist direction of the helix of the cholesteric liquid crystal. Selective reflection by the cholesteric liquid crystal reflects dextrorotatory circularly polarized light and transmits levorotatory circularly polarized light in a case where the twist direction (sense) of the helix of the cholesteric liquid crystal is right-handed, whereas it reflects levorotatory circularly polarized light and transmits dextrorotatory circularly polarized light in a case where the sense is left-handed.

For example, a film including a cholesteric liquid crystal layer exhibiting selective reflection properties in the visible light wavelength range (wavelength of 400 to 750 nm) can be used as a screen for projected image display and a half mirror. Further, by controlling the reflection band, such a film can be used as a filter that improves the color purity of display light of a color filter or a display (for example, see JP2003-294948A).

In addition, the reflective layer can be used for various purposes such as a polarizing element, a reflective film, an anti-reflection film, a viewing angle compensating film, holography, and an alignment film, which are constituent elements of an optical element.

Hereinafter, the application as a projected image display member which is a particularly preferable application will be described.

By the above-mentioned function of the cholesteric liquid crystal layer, a projected image can be formed by reflecting circularly polarized light of either sense at the wavelength showing selective reflection among the projected light. The projected image may be visually recognized as such by being displayed on the surface of the projected image display member or may be a virtual image which appears to float above the projected image display member as viewed from an observer.

The center wavelength of the selective reflection depends on the pitch P of the helical structure (=the period of the helix) in a cholesteric liquid crystalline phase and follows the relationship of the average refractive index n of the cholesteric liquid crystal layer and $\lambda = n \times P$. Here, the center wavelength $\lambda$ of the selective reflection of the cholesteric liquid crystal layer means a wavelength at the center position of the reflection peak of the circularly polarized reflection spectrum measured from the normal direction of the cholesteric liquid crystal layer. As can be seen from the above Expression, the center wavelength of the selective reflection can be adjusted by adjusting the pitch of the helical structure. That is, by adjusting the n value and the P value, for example, in order to selectively reflect either the dextrorotatory circularly polarized light or the levorotatory circularly polarized light with respect to the blue light, the center wavelength $\lambda$ is adjusted so that an apparent center wavelength of the selective reflection can be set to a wavelength range of 450 to 495 nm. Incidentally, the apparent center wavelength of the selective reflection means a wavelength at the center position of the reflection peak of the circularly polarized reflection spectrum of the cholesteric liquid crystal layer measured from the observation direction in practical use (in a case of being used as a projected image display member). Since the pitch of the cholesteric liquid crystalline phase depends on the type of the chiral agent to be used together with the liquid crystal compound or the addition concentration thereof, a desired pitch can be obtained by adjusting these factors. As a method for measuring sense or pitch of helix, methods described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

In addition, a projected image display member capable of displaying full color projected images can be produced by preparing and laminating cholesteric liquid crystal layers having an apparent center wavelength of the selective reflection in the red light wavelength range, the green light wavelength range, and the blue light wavelength range, respectively.

By adjusting the center wavelength of the selective reflection of each cholesteric liquid crystal layer according to the emission wavelength range of the light source used for projection and the mode of use of the projected image display member, a clear projected image can be displayed with high efficiency of light utilization. In particular, by adjusting the center wavelengths of the selective reflection of the cholesteric liquid crystal layer respectively according to the light emission wavelength range of the light source used for projection or the like, a clear color projected image can be displayed with high efficiency of light utilization.

In addition, for example, in a case where the projected image display member is configured to be transmissive to light in the visible light region, a half mirror that can be used as a combiner for a head-up display can be obtained. The projected image display half mirror can display the image projected from the projector so as to be visible, and in a case where the projected image display half mirror is observed from the same surface side where the image is displayed, the information or scenery on the opposite surface side can be observed at the same time.

EXAMPLES

Hereinafter, the present invention will be described in more detail with reference to Examples. The materials, the used amount, the ratio, the contents of a treatment, and the procedures of a treatment described in Examples below may be suitably modified without departing from the spirit of the present invention. Accordingly, the scope of the present invention should not be limitatively interpreted by Examples described below.

[Synthesis and Evaluation of Chiral Agents]
<Synthesis of Compound CD-1>
Compound CD-1 was synthesized according to the following scheme.

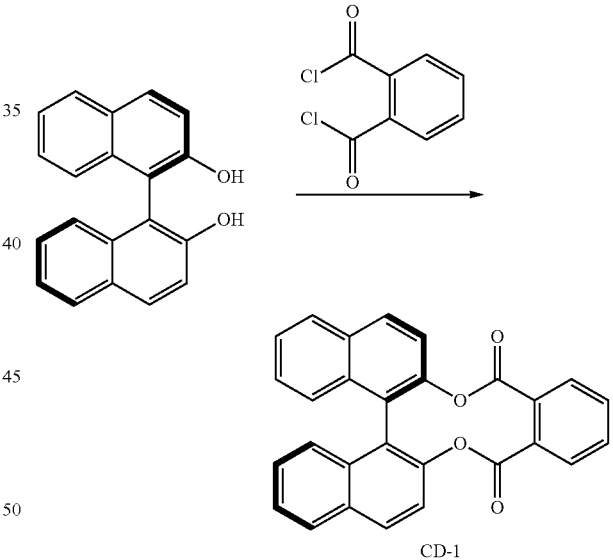

CD-1

1.4 g of (R)-(+)-1,1'-bi-2-naphthol (manufactured by Wako Pure Chemical Industries, Ltd.), 40 mL of tetrahydrofuran (manufactured by Wako Pure Chemical Industries, Ltd.), and 1.0 g of phthaloyl chloride (manufactured by Tokyo Chemical Industry Co., Ltd.) were placed in a 100 mL three-neck flask, and then 1.0 mL of triethylamine (manufactured by Wako Pure Chemical Industries, Ltd.) was further added to the three-neck flask. Next, the resulting reaction liquid was reacted at 40° C. for 2 hours. Subsequently, 100 mL of methanol (manufactured by Wako Pure Chemical Industries, Ltd.) was added to the reaction liquid, and the resulting solid was collected by filtration and blast dried at 40° C. for 12 hours to obtain Compound CD-1 (1.0 g, yield: 50%).

<Synthesis of Compound CD-2>
Compound CD-2 was synthesized by the method described in Examples 1 and 2 of JP2002-338575A.

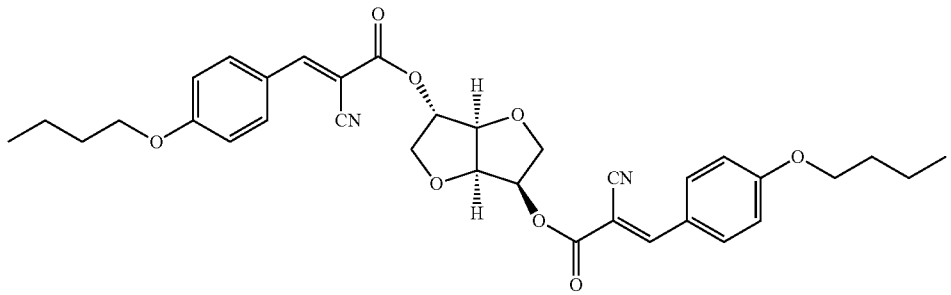

CD-2

<Compound CD-3>
Paliocolor LC 756 (manufactured by BASF Corporation) was used as Compound CD-3.

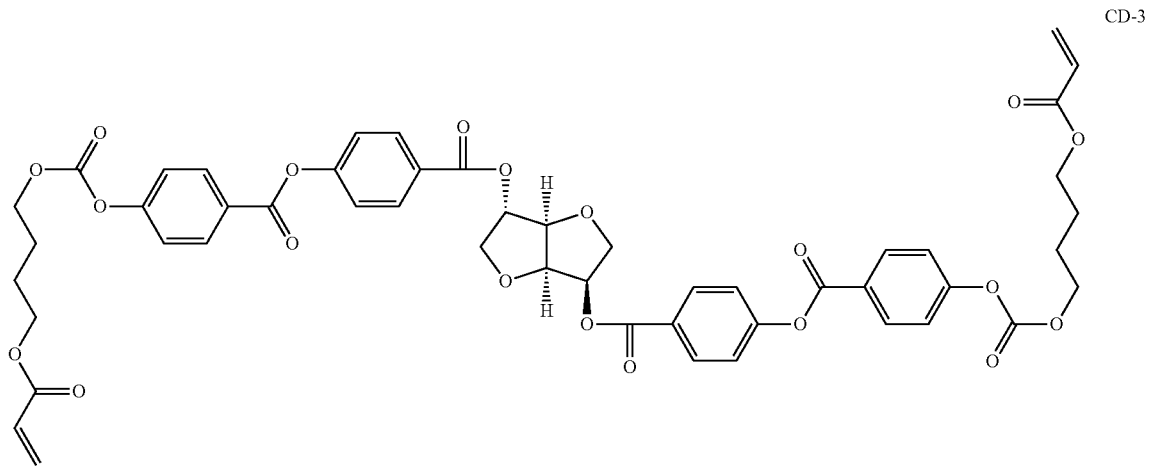 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

CD-3

<Compound CD-4>
The enantiomer of chiral agent 1 described in Example 1 of JP 2016-508817 was prepared as CD-4.

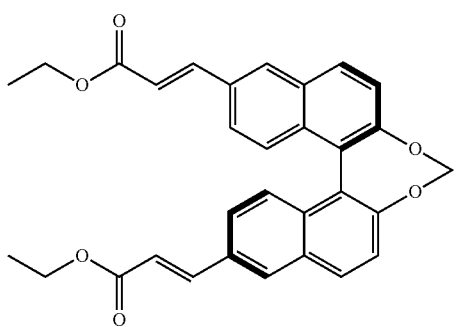

CD-4

<Evaluation of Helical Twisting Power (HTP) and Light-Dependent Percentage Change Thereof>

(Evaluation of HTP of Compound CD-1 and Light-Dependent Percentage Change Thereof)

The HTP of Compound CD-1 (HTP here is intended to refer to HTP in a liquid crystal layer (cholesteric liquid crystalline phase state) obtained by planar alignment of a liquid crystal compound by heating (90° C.)) and the percentage change of HTP upon light irradiation (hereinafter, also referred to as "light-dependent percentage change") were evaluated according to the following method.

Incidentally, the liquid crystal compound LC-1 described later was used for the evaluation of the HTP of Compound CD-1 and the light-dependent percentage change thereof.

<<Preparation of Sample Solution>>

The liquid crystal compound LC-1 represented by the following structure and Compound CD-1 were mixed, and then a solvent was added to the resulting mixture to prepare a sample solution having the following composition.

| | |
|---|---|
| Liquid crystal compound LC-1 represented by the following structure: | 100 parts by mass |
| Compound CD-1 | 5 parts by mass |
| Solvent (methyl ethyl ketone (MEK)/cyclohexanone = 90/10 (mass ratio)) | an amount that makes the solute concentration 30% by mass |

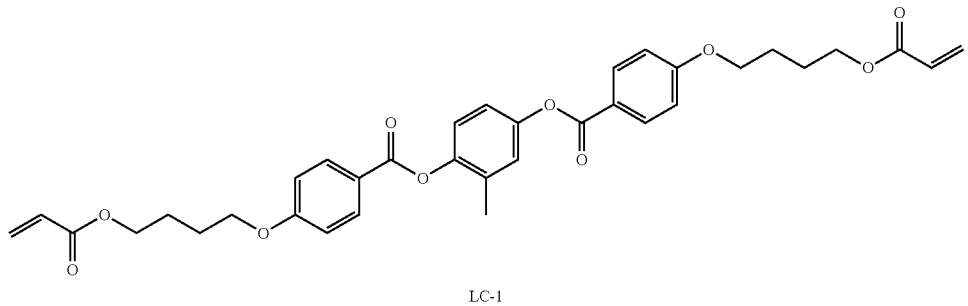 [SMILES: C=CC(=O)OCCCCOc1ccc(C(=O)Oc2ccc(OC(=O)c3ccc(OCCCCOC(=O)C=C)cc3)c(C)c2)cc1]

LC-1

<<Production of Liquid Crystal Layer 1-1>>

Next, a polyimide alignment film forming composition SE-130 (manufactured by Nissan Chemical Industries, Ltd.) was applied onto a cleaned glass substrate to form a coating film. The resulting coating film was baked and then rubbed to produce a substrate with an alignment film. 30 μL of the sample solution was spin-coated on the rubbing-treated surface of this alignment film under the conditions of a rotation speed of 1000 rpm for 10 seconds, followed by aging at 90° C. for 1 minute to form a liquid crystal layer.

<<Calculation of HTP>>

The helical twisting power (HTP) of the obtained liquid crystal layer was measured. Specifically, the central reflection wavelength of the liquid crystal layer was measured using a spectrophotometer (UV-3100, manufactured by Shimadzu Corporation), and the HTP before light irradiation was calculated in accordance with Expression (1D).

HTP=(average refractive index of liquid crystal compound)/{(content of chiral agent with respect to liquid crystal compound (% by mass))×(central reflection wavelength (nm))}[μm$^{-1}$]   Expression (1D):

In Expression (1D), the calculation was made on the assumption that the "average refractive index of liquid crystal compound" was 1.55.

Next, the liquid crystal layer was ultraviolet-irradiated with 365 nm light from a light source (2UV TRANSILLUMINATOR, manufactured by UVP, LLC) at an irradiation intensity of 0.4 mW/cm$^2$ for 1 minute. The central reflection wavelength of the liquid crystal layer after light irradiation was measured using a spectrophotometer (UV-3100, manufactured by Shimadzu Corporation), and the HTP after light irradiation was calculated in accordance with Expression (1D).

The results are shown in Table 1.

<<Confirmation of Helical Sense>>

In the measurement of the central reflection wavelengths before and after the light irradiation, the measurement was carried out with a circularly polarizing plate sandwiched between the sample and the light source. The helical sense of the cholesteric liquid crystalline phase was confirmed from the presence or absence of the reflection peak.

The results are shown in Table 1.

<<Calculation of Light-Dependent Percentage Change of HTP>>

The light-dependent percentage change of HTP was calculated in accordance with Expression (1E).

Light-dependent percentage change=[{(HTP before 365 nm light irradiation)−(HTP after 365 nm light irradiation)}/(HTP before 365 nm light irradiation)]×100[%]   Expression (1E):

The results are shown in Table 1.

(Evaluation of HTP of Compounds CD-2 to 4 and Light-Dependent Percentage Change Thereof)

The liquid crystal layers using Compounds CD-2 to 4 were evaluated as described above in the same manner as in a case of using Compound CD-1, and therefore the HTP of Compounds CD-2 to 4 and the light-dependent percentage change thereof were evaluated.

The HTP of Compound CD-2, which is a chiral agent, after light irradiation corresponds to 36×(100-44)/100=20.2 μm$^{-1}$. The HTP of Compound CD-4 after light irradiation corresponds to 64×(100-40)/100=38.4 μm$^{-1}$.

TABLE 1

| Type of chiral agent | HTP before light irradiation (μm$^{-1}$) | Light-dependent percentage change of HTP | Helical sense Before light irradiation | Helical sense After light irradiation |
|---|---|---|---|---|
| CD-1 | 60 | 0% | Left-handed | Left-handed |
| CD-2 | 36 | 44% | Right-handed | Right-handed |
| CD-3 | 50 | 0% | Right-handed | Right-handed |
| CD-4 | 64 | 40% | Left-handed | Left-handed |

From Table 1 above, it is clear that the chiral agents CD-2 and CD-4 exhibit reduced helical twisting power (HTP) upon light irradiation. In addition, it can be confirmed that the chiral agents CD-1 and CD-3 exhibit no change in helical twisting power upon light irradiation, and the chiral agent CD-1 induces a helix in the direction opposite to that of the chiral agent CD-2 and the chiral agent CD-3 induces a helix in the direction opposite to that of the chiral agent CD-4.

Preparation and Evaluation of Liquid Crystal Composition

Example 1

The liquid crystal composition shown below was prepared using the above-mentioned Compound CD-2 as the "chiral agent A whose helical twisting power is reduced upon light irradiation", and the above-mentioned Compound CD-1 as the "chiral agent B that induces a helix in the direction opposite to that of the chiral agent A".

(Preparation of Liquid Crystal Composition)

The liquid crystal compound LC-1, Compound CD-1 and Compound CD-2 were mixed, and then a solvent was added to the resulting mixture to prepare a sample solution having the following composition.

| | |
|---|---|
| Liquid crystal compound LC-1 | 100 parts by mass |
| Compound CD-1 | 5.0 parts by mass |
| Compound CD-2 | 3.3 parts by mass |
| Alignment agent (1) | 0.1 parts by mass |
| Polymerization initiator | 3.0 parts by mass |
| (Irg-907, manufactured by BASF Corporation) | |
| Solvent | an amount that makes the solute |
| (MEK/cyclohexanone = 90/10 (mass ratio)) | concentration 30% by mass |

Alignment agent (1)

(Production of Reflective Layer)

Next, a polyimide alignment film forming composition SE-130 (manufactured by Nissan Chemical Industries, Ltd.) was applied onto a cleaned glass substrate to form a coating film. The resulting coating film was baked and then rubbed to produce a substrate with an alignment film. 30 µL of the above liquid crystal composition was spin-coated on the rubbing-treated surface of this alignment film under the conditions of a rotation speed of 1000 rpm for 10 seconds to form a composition layer, which is then dried (aged) at 90° C. for 1 minute to align the liquid crystal compound (in other words, being brought into a cholesteric liquid crystalline phase state).

Next, the composition layer in which the liquid crystal compound was aligned was ultraviolet-irradiated with 365 nm light from a light source (2UV TRANSILLUMINATOR, manufactured by UVP, LLC) at an irradiation intensity of 0.4 mW/cm² for 1 minute. Subsequently, the composition layer after the ultraviolet irradiation was subjected to a curing treatment by irradiation with ultraviolet rays (310 nm light) at an irradiation quantity of 500 mJ/cm² in a nitrogen atmosphere at 25° C., thereby obtaining a reflective layer (which corresponds to a layer obtained by immobilizing the cholesteric liquid crystalline phase).

In the above procedure, the composition layer in which the liquid crystal compound was aligned was ultraviolet-irradiated with 365 nm light at an irradiation intensity of 0.4 mW/cm² for 1 minute, and this treatment corresponds to a treatment for reducing the helical twisting power of the chiral agent A contained in the composition layer. In addition, details of the light-dependent percentage change of the helical twisting power of the chiral agent A by ultraviolet irradiation with 365 nm light from a light source (2UV TRANSILLUMINATOR, manufactured by UVP, LLC) at an irradiation intensity of 0.4 mW/cm² for 1 minute are as shown in Table 1.

In addition, the column "Percentage reduction of helical pitch upon light irradiation" shown in Table 2 indicates the percentage reduction of the helical pitch of the cholesteric liquid crystalline phase which is generated as a result of the treatment for reducing the helical twisting power of the chiral agent A. A method for evaluating the percentage reduction of the helical pitch upon light irradiation will be described below.

(Evaluation of Percentage Reduction of Helical Pitch Upon Light Irradiation and Helical Sense)

The "Percentage reduction of helical pitch upon light irradiation" in Table 2 was measured by the following method using the liquid crystal composition.

<<Production of Liquid Crystal Layer 2-1>>

A polyimide alignment film forming composition SE-130 (manufactured by Nissan Chemical Industries, Ltd.) was applied onto a cleaned glass substrate to form a coating film. The resulting coating film was baked and then rubbed to produce a substrate with an alignment film. 30 µL of the liquid crystal composition was spin-coated on the rubbing-treated surface of this alignment film under the conditions of a rotation speed of 1000 rpm for 10 seconds, followed by aging at 90° C. for 1 minute to form a liquid crystal layer.

<<Calculation of Helical Pitch Percentage Reduction>>

The central reflection wavelength of the obtained liquid crystal layer was measured using a spectrophotometer (UV-3100, manufactured by Shimadzu Corporation).

Next, the liquid crystal layer was ultraviolet-irradiated with 365 nm light from a light source (2UV TRANSILLUMINATOR, manufactured by UVP, LLC) at an irradiation intensity of 0.4 mW/cm² for 1 minute. The central reflection wavelength of the obtained liquid crystal layer was measured using a spectrophotometer (UV-3100, manufactured by Shimadzu Corporation).

The helical pitch percentage reduction was calculated in accordance with Expression (1F) using the measured central reflection wavelengths before and after light irradiation. The results are shown in Table 2.

Helical pitch percentage reduction=[{(central reflection wavelength before 365 nm light irradiation)−(central reflection wavelength after 365 nm light irradiation)}/(central reflection wavelength before 365 nm light irradiation)]× 100[%]           Expression (1F):

<<Confirmation of Helical Sense>>

In the measurement of the helical pitch percentage reduction, the helical sense of the cholesteric liquid crystalline phase was also confirmed.

Specifically, in the measurement of the central reflection wavelengths before and after the light irradiation, the measurement was carried out with a circularly polarizing plate sandwiched between the sample and the light source. The helical sense of the cholesteric liquid crystalline phase was confirmed from the presence or absence of the reflection peak. The results are shown in Table 2.

Using the obtained reflective layer, the following evaluation of diffuse reflectivity (wide-angle reflectivity) was carried out.

(Evaluation of Diffuse Reflectivity)

The measurement of absolute reflectivity at 0° incidence and 10° or 45° detection of the reflective layer was carried out. A reflection ratio was calculated from Expression (1G) using the obtained measured values and the diffuse reflectivity was evaluated based on the following evaluation standards. The results are shown in Table 2.

Reflection ratio=(absolute reflection $Y$ value at 10° detection)/(absolute reflection $Y$ value at 45° detection)  Expression (1G):

mentioned Compound CD-3 was used as the "chiral agent B that induces a helix in the direction opposite to that of the chiral agent A".

Comparative Examples 1 to 3

Liquid crystal compositions of Comparative Examples 1 to 3 were prepared in the same manner as in Example 1, except that the content (parts by mass) of the chiral compound contained in the liquid crystal composition was changed to the formulation shown in Table 2. In addition, the obtained liquid crystal compositions were evaluated in the same manner as in Example 1 for the percentage reduction of the helical pitch upon light irradiation, the helical sense, and the wide-angle reflectivity. The results are shown in Table 2.

In the liquid crystal composition of Comparative Example 2, it was confirmed that the percentage reduction of the helical pitch upon light irradiation was −44%, in other words, the helical pitch was increased by 44%. In the liquid crystal composition of Comparative Example 3, it was confirmed that the percentage reduction of the helical pitch upon light irradiation was −12%, in other words, the helical pitch was increased by 12%.

TABLE 2

| | Chiral agent A | | Chiral agent B | | Percentage reduction of helical pitch upon light irradiation | Helical sense | | Wide-angle reflection performance |
| --- | --- | --- | --- | --- | --- | --- | --- | --- |
| | Type | Addition amount (parts by mass) | Type | Addition amount (parts by mass) | | Before light irradiation | After light irradiation | |
| Example 1 | CD-2 | 3.3 | CD-1 | 5.0 | 29% | Left-handed | Left-handed | A |
| Example 2 | CD-2 | 2.2 | CD-1 | 6.0 | 13% | Left-handed | Left-handed | B |
| Example 3 | CD-2 | 1.1 | CD-1 | 7.0 | 5% | Left-handed | Left-handed | C |
| Example 4 | CD-4 | 1.2 | CD-3 | 6.5 | 13% | Right-handed | Right-handed | B |
| Example 5 | CD-4 | 0.8 | CD-3 | 5.5 | 9% | Left-handed | Left-handed | C |
| Comparative Example 1 | — | — | CD-1 | 8.0 | 0% | Left-handed | Left-handed | D |
| Comparative Example 2 | CD-2 | 8 | — | — | −44% | Right-handed | Right-handed | D |
| Comparative Example 3 | CD-2 | 3.3 | CD-3 | 5.0 | −12% | Right-handed | Right-handed | D |

<<Evaluation Standards>>

"A": The reflection ratio is less than 2.
"B": The reflection ratio is 2 or more and less than 3.
"C": the reflection ratio is 3 or more and less than 10.
"D": The reflection ratio is 10 or more.

Examples 2 to 5

The liquid crystal compositions of Examples 2 to 5 were prepared in the same manner as in Example 1, except that the chiral compound contained in the liquid crystal composition and the content thereof (parts by mass) were changed to the formulations shown in Table 2. In addition, the obtained liquid crystal compositions were evaluated in the same manner as in Example 1 for the percentage reduction of the helical pitch upon light irradiation, the helical sense, and the wide-angle reflectivity. The results are shown in Table 2.

In Examples 4 and 5, the above-mentioned Compound CD-4 was used as the "chiral agent A whose helical twisting power is reduced upon light irradiation", and the above- The cross-sectional SEM observations (cross-sectional SEM micrographs) of the reflective layers obtained in Examples 1 to 5 confirmed that the layered structure of the cholesteric liquid crystalline phase was wave-like (having an undulating structure: see FIG. 2).

On the other hand, the cross-sectional SEM observations (cross-sectional SEM micrographs) of the reflective layers obtained in Comparative Examples 1 to 3 did not confirm that the layered structure of the cholesteric liquid crystalline phase was wave-like.

As shown in Table 2, it can be seen that the reflective layers of Examples 1 to 5 having an undulating structure are superior in diffuse reflectivity as compared with the reflective layers of Comparative Examples 1 to 3 having no undulating structure. In particular, from the comparison of Examples 1 to 5, it was confirmed that the larger the percentage reduction of the helical pitch of the cholesteric liquid crystalline phase (the percentage reduction is preferably 10% or more, more preferably 20% or more), the better the diffuse reflectivity.

Example 6

A reflective layer was prepared by the following procedure using the liquid crystal composition of Example 1.

(Preparation of Reflective Layer 2)

A polyimide alignment film forming composition SE-130 (manufactured by Nissan Chemical Industries, Ltd.) was applied onto a cleaned glass substrate to form a coating film. The resulting coating film was baked and then rubbed to prepare a substrate with an alignment film. 30 μL of the above liquid crystal composition was spin-coated on the rubbing-treated surface of this alignment film under the conditions of a rotation speed of 1000 rpm for 10 seconds to form a composition layer, which is then dried (aged) at 90° C. for 1 minute to align the liquid crystal compound (in other words, being brought into a cholesteric liquid crystalline phase state).

Next, the composition layer in which the liquid crystal compound was aligned was ultraviolet-irradiated with 365 nm light from a light source (2UV TRANSILLUMINATOR, manufactured by UVP, LLC) at an irradiation intensity of 0.4 mW/cm$^2$ for 1 minute through a mask having an opening (which corresponds to a treatment for reducing the helical twisting power of the chiral agent A). Subsequently, the composition layer after the ultraviolet irradiation with the mask removed was subjected to a curing treatment by irradiation with ultraviolet rays (310 nm light) at an irradiation quantity of 500 mJ/cm$^2$ in a nitrogen atmosphere at 25° C., thereby obtaining a reflective layer (which corresponds to a layer obtained by immobilizing the cholesteric liquid crystalline phase).

The cross-sectional SEM observation (cross-sectional SEM micrograph) of the reflective layer obtained in Example 6 confirmed that a region A in which the layered structure of the cholesteric liquid crystalline phase is undulated, and a region B in which the bright portions and dark portions of the cholesteric liquid crystalline phase are linear and parallel to each other were formed in accordance with the mask pattern (in other words, in a pattern) (it was confirmed that the region A and the region B were present within a radius of 1 mm at any position in the in-plane direction). Further, it was confirmed that the helical pitch in the region A was smaller than the helical pitch in the region B.

Example 7

In Example 6 above, a region having different twist strength of the liquid crystal compound could be further formed in the region A by changing the light irradiation time in a case of reducing the helical twisting power of the chiral agent A contained in the composition layer. As a result, a plurality of regions having helical pitches of the cholesteric liquid crystalline phase different from each other (in other words, regions having central reflection wavelengths different from each other) could be formed in the region A.

EXPLANATION OF REFERENCES

10: substrate
12a: layer of a composition in a cholesteric liquid crystalline phase state
12b: layer having a wave-like structure
13a: region A
13b: region B
14: bright portion
16: dark portion

What is claimed is:

1. A liquid crystal composition, comprising:
   a liquid crystal compound;
   a chiral agent A whose helical twisting power is reduced upon light irradiation; and
   a chiral agent B which induces a helix in a direction opposite to that of the chiral agent A,
   wherein the liquid crystal compound is cholesterically aligned in the direction of the helix induced by the chiral agent B in a case where the liquid crystal compound is aligned into a cholesteric liquid crystalline phase state, and
   wherein the chiral agent A comprises a cinnamoyl moiety or a chalcone moiety.

2. The liquid crystal composition according to claim 1, satisfying a relationship of Expression (1A),
   wherein each unit of the helical twisting power of the chiral agent A and the helical twisting power of the chiral agent B in Expression (1A) is $\mu m^{-1}$, and each unit of a content of the chiral agent A with respect to the liquid crystal compound and a content of the chiral agent B with respect to the liquid crystal compound in Expression (1A) is % by mass,
   Expression (1A): helical twisting power of chiral agent A×content of chiral agent A with respect to liquid crystal compound<helical twisting power of chiral agent B×content of chiral agent B with respect to liquid crystal compound.

3. The liquid crystal composition according to claim 1,
   wherein a content of the chiral agent A is 1.0% to 6.0% by mass with respect to a total mass of the liquid crystal compound, and a content of the chiral agent B is 1.0% to 10% by mass with respect to the total mass of the liquid crystal compound.

4. The liquid crystal composition according to claim 1,
   wherein the helical twisting power of the chiral agent A is 10 to 100 and a helical twisting power of the chiral agent B is 30 to 200 $\mu m^{-1}$.

5. The liquid crystal composition according to claim 1,
   wherein the liquid crystal compound has at least one or more polymerizable groups.

6. A method for producing a reflective layer, comprising:
   a step 1 of forming a composition layer using a liquid crystal composition comprising:
     a liquid crystal compound;
     a chiral agent A whose helical twisting power is reduced upon light irradiation; and
     a chiral agent B which induces a helix in a direction opposite to that of the chiral agent A,
     wherein the liquid crystal compound is cholesterically aligned in the direction of the helix induced by the chiral agent B in a case where the liquid crystal compound is aligned into a cholesteric liquid crystalline phase state;
   a step 2 of aligning the liquid crystal compound contained in the composition layer into a cholesteric liquid crystalline phase state; and
   a step 3 of irradiating at least a partial region of the composition layer with light to reduce a helical twisting power of chiral agent A contained in the composition layer in a light irradiation region, such that a helical pitch of the cholesteric liquid crystalline phase is reduced by 5% or more.

7. A method for producing a reflective layer, comprising:
   a step 1 of forming a composition layer using a liquid crystal composition comprising:

a liquid crystal compound having at least one or more polymerizable groups;

a chiral agent A whose helical twisting power is reduced upon light irradiation; and a chiral agent B which induces a helix in a direction opposite to that of the chiral agent A, wherein the liquid crystal compound is cholesterically aligned in the direction of the helix induced by the chiral agent B in a case where the liquid crystal compound is aligned into a cholesteric liquid crystalline phase state;

a step 2 of aligning the liquid crystal compound contained in the composition layer into a cholesteric liquid crystalline phase state; and a step 3 of irradiating at least a partial region of the composition layer with light to reduce a helical twisting power of chiral agent A contained in the composition layer in a light irradiation region, such that a helical pitch of the cholesteric liquid crystalline phase is reduced by 5% or more, and further comprising a step 4 of subjecting the composition layer to a curing treatment during the step 3 to immobilize the cholesteric liquid crystalline phase or subjecting the composition layer to a curing treatment after the step 3 to immobilize the cholesteric liquid crystalline phase.

8. The method for producing a reflective layer according to claim 7, wherein the cholesteric liquid crystalline phase is immobilized by a polymerization reaction upon light irradiation.

9. The method for producing a reflective layer according to claim 6, wherein the light irradiation in the step 3 is a step of exposing the composition layer in a pattern-wise manner.

10. A reflective layer obtained by immobilizing a cholesteric liquid crystalline phase, the reflective layer comprising:

a region A in which bright portions and dark portions derived from a cholesteric liquid crystalline phase observed in a cross section of the reflective layer with a scanning electron microscope are wave-like, and a region B in which bright portions and dark portions derived from a cholesteric liquid crystalline phase observed in a cross section of the reflective layer with a scanning electron microscope are linear and parallel to each other.

11. The reflective layer according to claim 10, wherein a helical pitch derived from the cholesteric liquid crystalline phase in the region A is smaller than a helical pitch derived from the cholesteric liquid crystalline phase in the region B.

12. The reflective layer according to claim 10, wherein the region A and the region B are present within a radius of 1 mm at any position in an in-plane direction of the reflective layer.

13. The reflective layer according to claim 10, wherein the region A further includes a plurality of regions having central reflection wavelengths different from each other.

14. A cured product obtained by curing a liquid crystal composition comprising:

a liquid crystal compound having at least one or more polymerizable groups;

a chiral agent A whose helical twisting power is reduced upon light irradiation; and a chiral agent B which induces a helix in a direction opposite to that of the chiral agent A, wherein the liquid crystal compound is cholesterically aligned in the direction of the helix induced by the chiral agent B in a case where the liquid crystal compound is aligned into a cholesteric liquid crystalline phase state.

15. An optically anisotropic body obtained by curing the liquid crystal composition according to claim 5.

* * * * *